(12) United States Patent
Wieneke et al.

(10) Patent No.: US 9,845,414 B2
(45) Date of Patent: Dec. 19, 2017

(54) MULTILAYER PRESSURE SENSITIVE ADHESIVE ASSEMBLY

(71) Applicant: 3M INNOVATIVE PROPERTIES COMPANY, St. Paul, MN (US)

(72) Inventors: Jan U. Wieneke, Dusseldorf (DE);
Frank Kuester, Dusseldorf (DE);
Zhong Chen, Woodbury, MN (US);
Jingjing Ma, Cottage Grove, MN (US);
Kerstin Unverhau, Neuss (DE);
Doreen Eckhardt, Dormagen (DE);
Claudia Torre, Dusseldorf (DE);
Jonathan E. Janoski, Woodbury, MN (US); Jayshree Seth, Woodbury, MN (US); Arlin L. Weikel, Mansfield, PA (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 82 days.

(21) Appl. No.: 14/889,289

(22) PCT Filed: May 12, 2014

(86) PCT No.: PCT/US2014/037654
§ 371 (c)(1),
(2) Date: Nov. 5, 2015

(87) PCT Pub. No.: WO2014/186265
PCT Pub. Date: Nov. 20, 2014

(65) Prior Publication Data
US 2016/0096980 A1    Apr. 7, 2016

Related U.S. Application Data

(60) Provisional application No. 61/824,536, filed on May 17, 2013.

(30) Foreign Application Priority Data

May 30, 2013  (EP) .................................. 13169915

(51) Int. Cl.
C09J 7/02      (2006.01)
C09J 133/08    (2006.01)
(Continued)

(52) U.S. Cl.
CPC ............ *C09J 7/0217* (2013.01); *B05D 3/067* (2013.01); *B05D 7/04* (2013.01); *B05D 7/14* (2013.01);
(Continued)

(58) Field of Classification Search
CPC ....................................................... C09J 7/0217
See application file for complete search history.

(56) References Cited

U.S. PATENT DOCUMENTS 3,691,140 A    9/1972    Silver
4,152,189 A    5/1979    Guerin
(Continued)

FOREIGN PATENT DOCUMENTS

CN        101864248       10/2010
DE        202009013255 U1  3/2010
(Continued)

OTHER PUBLICATIONS

Rauwendaal, "Chapter 4, 'Mixing in Single-Screw Extruders'", Mixing in Polymer Processing, 1991, Marcel Dekker, Inc., (New York, NY, USA), pp. 129-240.
(Continued)

*Primary Examiner* — Daniel Lee
(74) *Attorney, Agent, or Firm* — Jean A. Lown

(57) ABSTRACT

The present disclosure relates to a multilayer pressure sensitive adhesive assembly comprising at least a first pressure
(Continued)

sensitive adhesive layer superimposed to a second polymer layer, wherein a curable liquid precursor of the first pressure sensitive adhesive polymer layer comprises a low Tg (meth) acrylate copolymer and a high Tg (meth)acrylate copolymer having a weight average molecular weight (Mw) of above 20,000 Daltons. The present disclosure also relates to a method of manufacturing such a pressure sensitive adhesive assembly and uses thereof.

14 Claims, 2 Drawing Sheets

(51) Int. Cl.
  *B05D 3/06* (2006.01)
  *B05D 7/04* (2006.01)
  *B05D 7/14* (2006.01)
  *B05D 7/00* (2006.01)
  *B32B 37/26* (2006.01)

(52) U.S. Cl.
  CPC ............ *B05D 7/5423* (2013.01); *B32B 37/26* (2013.01); *C09J 133/08* (2013.01); *B32B 2037/268* (2013.01); *B32B 2333/12* (2013.01); *C08L 2312/00* (2013.01); *C09J 2201/36* (2013.01); *C09J 2205/31* (2013.01)

(56) References Cited

U.S. PATENT DOCUMENTS

| | | | |
|---|---|---|---|
| 4,166,152 | A | 8/1979 | Baker |
| 4,255,489 | A | 3/1981 | Nielsen |
| 4,415,615 | A | 11/1983 | Esmay |
| 4,503,169 | A | 3/1985 | Randklev |
| 4,619,979 | A | 10/1986 | Kotnour |
| 4,636,432 | A | 1/1987 | Shibano |
| 4,656,218 | A | 4/1987 | Kinoshita |
| 4,737,559 | A | 4/1988 | Kellen |
| 4,843,134 | A | 6/1989 | Kotnour |
| 5,045,569 | A | 9/1991 | Delgado |
| 5,114,617 | A | 5/1992 | Smetana |
| 5,637,646 | A | 6/1997 | Ellis |
| 5,695,837 | A | 12/1997 | Everaerts |
| 5,804,610 | A | 9/1998 | Hamer |
| 6,103,152 | A | 8/2000 | Gehlsen |
| 6,436,530 | B1 | 8/2002 | Szonn |
| 6,608,143 | B1 | 8/2003 | Fukuoka |
| 6,657,011 | B2 | 12/2003 | Lau |
| 6,777,079 | B2 | 8/2004 | Zhou |
| 7,090,721 | B2 | 8/2006 | Craig |
| 7,090,722 | B2 | 8/2006 | Budd |
| 7,156,911 | B2 | 1/2007 | Kangas |
| 7,385,020 | B2 | 6/2008 | Anderson |
| 7,649,029 | B2 | 1/2010 | Kolb |
| 7,910,163 | B2 | 3/2011 | Zollner |
| 7,935,383 | B2 | 5/2011 | Zollner |
| 8,258,240 | B2 | 9/2012 | Suzuki |
| 8,318,970 | B2 | 11/2012 | Meisenburg |
| 8,449,962 | B2 | 5/2013 | Prenzel |
| 8,802,777 | B2 | 8/2014 | Zollner |
| 2003/0008140 | A1 | 1/2003 | Takizawa |
| 2003/0143409 | A1 | 7/2003 | Di Stefano |
| 2004/0099184 | A1 | 5/2004 | Palm |
| 2005/0182150 | A1 | 8/2005 | Bamborough |
| 2005/0182186 | A1 | 8/2005 | Gielens |
| 2006/0042515 | A1 | 3/2006 | Bodycomb |
| 2006/0075930 | A1 | 4/2006 | Wang |
| 2006/0188711 | A1 | 8/2006 | Kishioka |
| 2007/0005241 | A1 | 1/2007 | Sumizawa |
| 2008/0096034 | A1 | 4/2008 | Theelen |
| 2009/0053447 | A1 | 2/2009 | Zollner |
| 2009/0270577 | A1 | 10/2009 | Beyers |
| 2010/0137524 | A1 | 6/2010 | Grittner |
| 2011/0165402 | A1 | 7/2011 | Zollner |
| 2011/0274843 | A1 | 11/2011 | Grittner |
| 2011/0281964 | A1 | 11/2011 | Zmarsly |
| 2012/0029105 | A1 | 2/2012 | Czerwonatis |
| 2012/0329898 | A1 | 12/2012 | Weikel |

FOREIGN PATENT DOCUMENTS

| | | | |
|---|---|---|---|
| EP | 0259094 | 3/1988 | |
| EP | 0752435 | 1/1997 | |
| EP | 0913443 | 5/1999 | |
| EP | 1574557 | 9/2005 | |
| EP | 2557132 | 2/2013 | |
| JP | 05070403 | 3/1993 | |
| JP | 05070404 | 3/1993 | |
| KR | 100906168 | 7/2009 | |
| WO | WO 2004/094549 | 11/2004 | |
| WO | WO 2008/073669 | 6/2008 | |
| WO | WO 2008073669 A1 * | 6/2008 | ............... B32B 7/12 |
| WO | WO 2011/094385 | 8/2011 | |
| WO | WO 2011/119363 | 9/2011 | |
| WO | WO 2013/022941 | 2/2013 | |
| WO | WO 2013/048945 | 4/2013 | |
| WO | WO 2013/074446 | 5/2013 | |
| WO | WO 2014/081623 | 5/2014 | |
| WO | WO 2014/186316 | 11/2014 | |
| WO | WO 2015/143649 | 10/2015 | |

OTHER PUBLICATIONS

Sward, Chapter 2.7, 'Solvents', by W. H. Ellis, "Paint Testing Manual: Physical and Chemical Examination of Paints, Varnishes, Lacquers, and Colors", 13th edition, American Society for Testing and Materials, Philadelphia, Pennsylvania, (1972), pp. 130-149.
European Search Report for EP Application No. 13169915, date of completion of the search, Aug. 20, 2013, 9 pages.
International Search Report for PCT International Application No. PCT/US2014/037654 dated Sep. 3, 2014, 5 pages.
Schawe, "Modulated temperature DSC measurements: the influence of the experimental conditions", Thermochimica Acta, Jan. 10, 1996, vol. 127, pp. 127-140.

* cited by examiner

MULTILAYER PRESSURE SENSITIVE ADHESIVE ASSEMBLY

CROSS REFERENCE TO RELATED APPLICATIONS

This application is a national stage filing under 35 U.S.C. 371 of PCT/US2014/037654, filed May 12, 2014, which claims priority to EP Patent Application No. 13169915.9, filed May 30, 2013 and U.S. Provisional Application No. 61/824,536, filed May 17, 2013, the disclosures of which are incorporated by reference in their entireties herein.

TECHNICAL FIELD

The present disclosure relates generally to the field of adhesives, more specifically to the field of pressure sensitive adhesive (PSA) assemblies. The present disclosure also relates to a method of manufacturing such pressure sensitive adhesive assemblies and uses thereof.

BACKGROUND

Adhesives have been used for a variety of marking, holding, protecting, sealing and masking purposes. Adhesive tapes generally comprise a backing, or substrate, and an adhesive. One type of adhesive which is particularly preferred for many applications is represented by pressure sensitive adhesives. Pressure sensitive adhesives (PSAs) are well known to one of ordinary skill in the art to possess certain properties including the following: (1) aggressive and permanent tack, (2) adherence with no more than finger pressure, (3) sufficient ability to hold onto an adhered, and (4) sufficient cohesive strength. As applications for pressure-sensitive adhesives have increased substantially in recent years, performance requirements have become increasingly demanding.

Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are various (meth)acrylate based copolymers, natural rubber, synthetic rubbers, and silicones.

The pressure sensitive adhesive materials known from the prior art do not often provide sufficient tack to various types of substrate, including the so-called LSE and MSE substrates, i.e. substrates having respectively a low surface energy and a medium surface energy. In particular, the peel force or shear resistance on these challenging-to-bond substrates, particularly the LSE and MSE substrates, do not often fulfill the requirements, especially under environmental stress like altering temperatures and humidity.

This deficiency may partly be overcome by the addition of higher amounts of tackifiers. However, the excessive use of tackifiers may often detrimentally affect critical characteristics of pressure sensitive adhesives such as e.g. shear resistance and cohesive strength, and may raise the glass transition temperature of the corresponding adhesive. Furthermore, tackifiers may migrate into the substrate to which the adhesive tape is bonded and may lead to an undesired color change or stability reduction.

Without contesting the technical advantages associated with the pressure sensitive adhesive films known in the art, there is still a need for a stable and cost-effective pressure sensitive adhesive assembly having improved and versatile adhesion characteristics, in particular with respect to peel forces and shear resistance on various types of difficult to adhere surfaces, such as in particular LSE and MSE substrates.

Other advantages of the multilayer pressure sensitive adhesive (PSA) assembly and methods of the disclosure will be apparent from the following description.

SUMMARY

According to one aspect, the present disclosure relates to a method for manufacturing a multilayer pressure sensitive adhesive assembly comprising at least a first pressure sensitive adhesive polymer layer superimposed to a second polymer layer, the method comprising the steps of:
  a) providing a substrate;
  b) providing a curable liquid precursor of the first pressure sensitive adhesive polymer layer and a curable liquid precursor of the second polymer layer as superimposed layers onto the substrate;
  c) optionally, providing one or more solid films and applying these essentially simultaneously with the formation of the adjacent lower polymer layer; and
  d) curing the precursor of the multilayer pressure sensitive adhesive assembly thus obtained;
wherein the curable liquid precursor of the first pressure sensitive adhesive polymer layer comprises:
  a) 60 parts by weight or greater of a low Tg (meth)acrylate copolymer comprising:
    i. $C_1$-$C_{32}$ (meth)acrylic acid ester monomer units;
    ii. optionally, acid functional ethylenically unsaturated monomer units;
    iii. optionally, non-acid functional, ethylenically unsaturated polar monomer units;
    iv. optionally, vinyl monomer units; and
    v. optionally, multifunctional (meth)acrylate monomer units, and
  b) up to 40 parts by weight of a high Tg (meth)acrylate copolymer having a weight average molecular weight (Mw) of above 20,000 Daltons, and comprising:
    i. high Tg (meth)acrylic acid ester monomer units;
    ii) optionally, acid functional ethylenically unsaturated monomer units;
    iii) optionally, low Tg (meth)acrylic acid ester monomer units;
    iv) optionally, non-acid functional, ethylenically unsaturated polar monomer units;
    v) optionally, vinyl monomer units; and
  c) optionally, up to 20 parts by weight of a hydrogenated hydrocarbon tackifier, based on 100 parts by weight of copolymers a) and b).

In another aspect, the present disclosure is directed to a multilayer pressure sensitive adhesive assembly obtainable by the method as described above. The multilayer pressure sensitive adhesive assemblies of the present disclosure are particularly useful in the bonding of low surface energy (LSE) substrates, and provide high peel values, particularly at elevated temperatures. The multilayer PSA assemblies described herein additionally provide an overall balance of adhesive and cohesive characteristics, in particular with respect to peel forces and static shear resistance on various types of difficult to adhere surfaces, such as in particular LSE and MSE substrates.

According to still another aspect, the present disclosure relates to the use of a pressure sensitive adhesive assembly as above-described for the bonding to a low surface energy substrate and/or a medium surface energy substrate and/or a high surface energy substrate.

DETAILED DESCRIPTION

Figure 1:
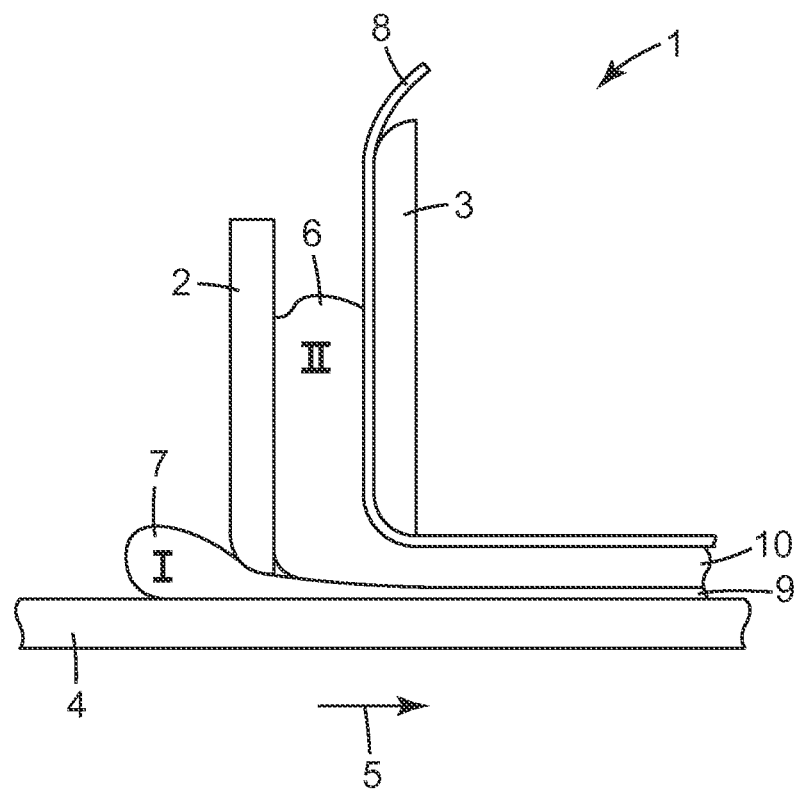
FIG. 1 is a schematic cross-sectional representation of a coating apparatus to carry out one exemplary embodiment of the method for manufacturing a multilayer pressure sensitive adhesive assembly according to one aspect of the present disclosure.

According to a first aspect, the present disclosure relates to a method for manufacturing a multilayer pressure sensitive adhesive assembly comprising at least a first pressure sensitive adhesive polymer layer superimposed to a second polymer layer, the method comprising the steps of:
 a) providing a substrate;
 b) providing a curable liquid precursor of the first pressure sensitive adhesive polymer layer and a curable liquid precursor of the second polymer layer as superimposed layers onto the substrate;
 c) optionally, providing one or more solid films and applying these essentially simultaneously with the formation of the adjacent lower polymer layer; and
 d) curing the precursor of the multilayer pressure sensitive adhesive assembly thus obtained;
wherein the curable liquid precursor of the first pressure sensitive adhesive polymer layer comprises:
 a) 60 parts by weight or greater of a low Tg (meth)acrylate copolymer (component) comprising:
  i. $C_1$-$C_{32}$ (meth)acrylic acid ester monomer units;
  ii. optionally, acid functional ethylenically unsaturated monomer units;
  iii. optionally, non-acid functional, ethylenically unsaturated polar monomer units;
  iv. optionally, vinyl monomer units; and
  v. optionally, multifunctional (meth)acrylate monomer units, and
 b) up to 40 parts by weight of a high Tg (meth)acrylate copolymer having a weight average molecular weight (Mw) of above 20,000 Daltons, and comprising:
  i. high Tg (meth)acrylic acid ester monomer units;
  ii) optionally, acid functional ethylenically unsaturated monomer units;
  iii) optionally, low Tg (meth)acrylic acid ester monomer units;
  iv) optionally, non-acid functional, ethylenically unsaturated polar monomer units;
  v) optionally, vinyl monomer units; and
 c) optionally, up to 20 parts by weight of a hydrogenated hydrocarbon tackifier, based on 100 parts by weight of copolymers a) and b).

It has surprisingly been found that a multilayer PSA assembly obtainable by the method as described above, combines high peel forces with high shear force resistance on various types of substrates. In particular, such advantageous properties may be obtained on substrates as diverse as low surface energy, medium surface energy and/or high surface energy substrates. This is particularly surprising finding as LSE, MSE and HSE substrates typically exhibit completely different surface chemistry and energy.

The multilayer pressure sensitive adhesive assembly according to the disclosure may find particular use for adhering e.g. automotive body side mouldings, weather strips, road signs, commercial signs, constructions, electrical cabinets, shell moulds, machine parts, junction boxes or backsheet solutions for photovoltaic modules. The multilayer pressure sensitive adhesive assembly according to the disclosure is particularly suited for bonding to low energy surfaces, such as polyolefin surfaces and clear coat surfaces. More particularly, the multilayer PSA assembly disclosed herein may be advantageously bonded to automotive clear coat surfaces.

Multilayer PSA assemblies according to the present disclosure, are particularly advantageous when compared to single-layer pressure sensitive adhesives, in that adhesion (quick adhesion) can be adjusted by the formulation of the pressure sensitive adhesive layer (also commonly referred to as the skin layer), while other properties/requirements of the overall assembly such as application issues, deforming issues, energy distribution and mechanical stress compensation capabilities may be addressed by appropriate formulation of the second polymer layer, in particular when such second polymer layer is a foam layer.

The properties of multilayer PSA assemblies according to the present disclosure may be varied broadly by varying, for example, the composition of the layers, the sequence of the layers in the multilayer assembly or the respective thickness of the layers. Multilayer PSA assemblies according to the present disclosure can therefore be tailor-made for a broad variety of applications in different technical fields.

In contrast to known multilayer assemblies which are obtained by e.g. lamination of the corresponding single layers using conventional lamination equipment, the multilayer PSA assemblies according to the present disclosure do not tend to delaminate in particular at the interfaces between the laminated layers when subjected to peel and/or shear forces, especially at elevated temperatures. In some aspects, the multilayer PSA assemblies as disclosed herein are smooth, homogenous and consist of layers which are chemically bond to each other, without any delamination occurring.

The present disclosure provides a cost-effective and stable method of manufacturing a multilayer pressure sensitive adhesive assembly comprising at least a first pressure sensitive adhesive polymer layer superimposed to a second polymer layer which is versatile and flexible and allows for the easy manufacture of complex structures comprising at least two polymer layers and having tailor-made properties. Additionally, the present disclosure provides multilayer pressure sensitive adhesive assemblies with advantageous optical properties as evaluated, for example, by the extent of transmission of visible light through the multilayer film.

In the context of the present disclosure, the expression "low surface energy substrates" is meant to refer to those substrates having a surface energy of less than 34 dynes per centimeter. Included among such materials are polypropylene, polyethylene (e.g., high density polyethylene or HDPE), and blends of polypropylene (e.g. PP/EPDM, TPO).

In the context of the present disclosure, the expression "medium surface energy substrates" is meant to refer to those substrates having a surface energy comprised between 34 and 70 dynes per centimeter, typically between 34 and 60 dynes per centimeter, and more typically between 34 and 50 dynes per centimeter. Included among such materials are polyamide 6 (PA6), acrylonitrile butadiene styrene (ABS), PC/ABS blends, PC, PVC, PA, PUR, TPE, POM, polystyrene, poly(methyl methacrylate) (PMMA), clear coat surfaces, in particular clear coats for vehicles like a car or coated surfaces for industrial applications and composite materials like fiber reinforced plastics.

In the context of the present disclosure, the expression "high surface energy substrates" is meant to refer to those substrates having a surface energy of more than 350 dynes per centimeter, typically more than 400 dynes per centimeter, and more typically to those substrates having a surface energy comprised between 400 and 1100 dynes per centimeter. Included among such materials are metal substrates (e.g. aluminum, stainless steel), and glass.

The surface energy is typically determined from contact angle measurements as described, for example, in ASTM D7490-08.

The method for manufacturing a multilayer pressure sensitive adhesive assembly according to the present disclosure is performed according to the principles of the so called "wet-in-wet" processes.

Exemplary "wet-in-wet" production processes for use herein are described in details in e.g. WO-A1-2011094385 (Hitschmann et al.) or in EP-A1-0259094 (Zimmerman et al.), the full disclosures of which are herewith incorporated by reference.

The term superimposed, as used throughout the description, means that two or more of the layers of the liquid precursors of the polymers or of the polymer layers of the multilayer pressure sensitive adhesive assembly, are arranged on top of each other. Superimposed liquid precursor layers may be arranged directly next to each other so that the upper surface of the lower layer is abutting the lower surface of the upper layer. In another arrangement, superimposed liquid precursor layers are not abutting each other but are separated from each other by one or more liquid precursor layers and/or one or more solid films or webs.

The term adjacent, as used as used throughout the description, refers to two superimposed layers within the precursor multilayer pressure sensitive adhesive assembly or the cured multilayer pressure sensitive adhesive assembly which are arranged directly next to each other, i.e. which are abutting each other.

The terms top (upper) and bottom (lower) layers, respectively, are used throughout the description to denote the position of a liquid precursor layer relative to the surface of the substrate bearing the precursor layer in the process of forming a multilayer pressure sensitive adhesive assembly. The precursor layer arranged next to the substrate surface is referred to as bottom (lower) layer whereas the precursor layer arranged most distantly from the substrate surface in a direction normal to the substrate surface is referred to as top (upper) layer. It should be noted that the terms top (upper) and bottom (lower) layer used throughout the description in conjunction with the description of the method of manufacturing the multilayer pressure sensitive adhesive assemblies do not have an unambiguous meaning in relation to the multilayer pressure sensitive adhesive assemblies as such. The term bottom (lower) layer is unambiguously defined in relation to the method of the present disclosure as the layer adjacent to the substrate of the coating apparatus. Likewise, the outer layer of the precursor of the multilayer pressure sensitive adhesive assembly which is opposite to the bottom (lower) layer and which is applied last during the method is unambiguously referred to throughout the description as top (upper) layer. Contrary to this, when referring to the cured multilayer pressure sensitive adhesive assembly as such, its two opposite outmost layers are termed throughout the description as outer layers, for clarity reasons.

The terms superimposed and adjacent likewise apply to the cured polymer layers and the cured multilayer pressure sensitive adhesive assembly, respectively.

In the context of the present disclosure, the term precursor is meant to refer to the material from which the polymers of the corresponding polymer layers of the multilayer pressure sensitive adhesive assembly can be obtained by curing. The term precursor is also used to denote the stack of layers comprising at least two layers of liquid precursors from which the multilayer pressure sensitive adhesive assembly of the present disclosure can be obtained by curing. Curing may typically be performed by actinic radiation such as UV, γ (gamma) or e-beam radiation or by thermal curing.

The substrate may be a temporary support from which the multilayer pressure sensitive adhesive assembly is separated and removed subsequent to curing. When used as a temporary support the substrate preferably has a release coated surface adapted to allow for a clean removal of the cured multilayer pressure sensitive adhesive assembly from the substrate. It may be desirable that the substrate when providing a temporary support remains attached to the multilayer pressure sensitive adhesive assembly when winding it up, for example, for storage. This is, for example, the case if the bottom layer of the multilayer pressure sensitive adhesive assembly is an adhesive layer such as a pressure-sensitive adhesive layer. The release-coated substrate protects the surface of the pressure-sensitive adhesive layer, for example, from contamination and allows the multilayer pressure sensitive adhesive assembly to be wound up into a roll. The temporary substrate will then only be removed from the multilayer pressure sensitive adhesive assembly by the final user when attaching the multilayer pressure sensitive adhesive assembly to a surface, for example. In other aspects where the surface of the first layer of the multilayer pressure sensitive adhesive assembly facing the substrate does not need to be protected, the substrate providing a temporary support may be removed and wound up subsequent to curing the precursor layers and prior to storing the multilayer pressure sensitive adhesive assembly. In another aspect, the substrate providing a temporary support may be provided by an endless belt preferably having an exposed release surface. The multilayer pressure sensitive adhesive assembly obtained after curing the stack of layers of liquid precursors separates from the endless belt and can be wound up, for example.

Alternatively, the substrate may be integrated as a layer into the resulting multilayer pressure sensitive adhesive assembly. In such case, the substrate is continuously fed as a film or web and collected as a part of the multilayer pressure sensitive adhesive assembly subsequent to the curing of the liquid precursor layers. The surface of the substrate may preferably be subjected, for example, to a corona treatment to enhance the anchoring of the cured bottom polymeric layer to the substrate. Anchoring of the bottom polymeric layer to the substrate may also be improved by applying a so-called tie layer onto the surface of the substrate prior to coating the bottom liquid precursor layer to the substrate. Tie layers which are suitable in the present disclosure include, for example, 3M Primer 4297, a polyamide based primer commercially available from 3M Co. or 3M Primer 4298, a primer comprising an acrylic polymer and a chlorinated polyolefin as active substances which is commercially available from 3M Co.

Substrates which are suitable both as temporary substrates or as substrates for incorporation into the multilayer film, respectively, may be selected from a group comprising polymeric films or webs, metal films or webs, woven or non-woven webs, glass fiber reinforced webs, carbon fiber webs, polymer fiber webs or webs comprising endless filaments of glass, polymer, metal, carbon fibers and/or natural fibers. Depending on the nature of the liquid precursor applied as a bottom layer onto the substrate and on whether the substrate is used as a temporary support or as an integral layer of the multilayer pressure sensitive adhesive assembly, the person skilled in the art may easily decide whether a treatment of the substrate surface is required or desirable. The method of the present disclosure is relatively insensitive to the roughness of the exposed surface of the substrate. The surface roughness can be characterized by the arithmetic average surface roughness Ra which can be measured, for example, by laser profilometry. Polymeric films suitable for use in the present disclosure may have Ra values of, for example, 1-20 μm or more preferably of 1-10 μm whereas non-woven webs may have Ra values of between 10 and 150 μm and more preferably between 15 and 100 μm. The multilayer pressure sensitive adhesive assemblies obtainable by the method of the present disclosure exhibit, essentially independent of the surface roughness Ra of the substrate, a bottom polymer layer with a homogenous thickness along the extension of the web in the downstream direction. The average deviation of the thickness of the bottom polymer layer in a direction normal to the downstream direction preferably is over an arbitrarily selected distance of 10 mm less than 10%, more preferably less than 5% and especially preferably less than 2.5%.

If the substrate is used as a temporary support its optionally release treated surface facing the coating knives preferably is essentially impermeable with respect to the liquid curable precursor applied to the substrate.

If the substrate forms an integral part of the multilayer pressure sensitive adhesive assembly subsequent to curing the precursor of the multilayer film, it is also desirable that the optionally treated surface of the substrate is essentially impermeable with respect to the bottom precursor layer or that the bottom liquid precursor does at least not migrate to the opposite surface of the substrate prior to curing, respectively. In case of substrates having a certain porosity such as, for example, non-woven substrates or paper it may be desirable that the liquid precursor penetrates into the surface area into the bulk of the substrate, respectively, so that the interfacial anchorage between the first polymer layer and the surface of the substrate is improved. The penetration or migration behavior of the liquid precursor relative to a given substrate can be influenced, for example, by the viscosity of the liquid precursor and/or the porosity of the substrates.

In a particular aspect of the method for manufacturing a multilayer pressure sensitive adhesive assembly, the substrate forms an integral part of the multilayer assembly subsequent to the curing step.

In some other aspects of the method for manufacturing a multilayer pressure sensitive adhesive assembly, a (lower) layer of a curable liquid precursor of the second polymer layer is covered by an adjacent (upper) layer of a curable liquid precursor of the first pressure sensitive adhesive polymer layer, respectively, essentially without exposing the (lower) layer of a curable liquid precursor of the second polymer layer.

In one preferred aspect, the method according to the present disclosure is a continuous and self-metered method for manufacturing a multilayer pressure sensitive adhesive assembly. According to this aspect, the method for manufacturing a multilayer pressure sensitive adhesive assembly may optionally comprise the steps of:
e) providing two or more coating knives which are offset, independently from each other, from the substrate to form a gap normal to the surface of the substrate;
f) moving the substrate relative to the coating knives in a downstream direction;
g) providing a curable liquid precursor of the first pressure sensitive adhesive polymer layer and a curable liquid precursor of the second polymer layer to the upstream side of the coating knives thereby coating the two or more curable liquid precursors through the respective gaps as superimposed layers onto the substrate.

Practicing the continuous and self-metered method for manufacturing a multilayer pressure sensitive adhesive assembly as above-described is well within the capabilities of the person skilled in the art, in the light of the present disclosure together with the disclosure of WO-A1-2011094385 (Hitschmann et al.), the content of which is incorporated herewith by reference. In particular, suitable settings and configurations for the coating apparatus, coating knives and coating stations, for use in this particular aspect of the method for manufacturing a multilayer pressure sensitive adhesive assembly, will be easily identified by those skilled in the art, in the light of the present disclosure together with the disclosure of WO-A1-2011094385 (Hitschmann et al.).

In a typical aspect of the method for manufacturing a multilayer pressure sensitive adhesive assembly according to the present disclosure, the curable liquid precursors are applied under ambient pressure or an over-pressure.

Typically, the curable liquid precursors are provided in one or more coating chambers essentially abutting each other and being bordered in downstream direction by a front wall, optionally one or more intermediate walls and a back wall, and, optionally, by a rolling bead positioned up-web relative to the front wall, whereas in particular the upstream intermediate walls, the back wall and, if a rolling bead is present upstream relative to the front wall, the front wall are formed by coating knives.

In a typical aspect of the method for manufacturing a multilayer pressure sensitive adhesive assembly, the curable liquid precursor layers are cured thermally and/or by exposing them to actinic radiation, in particular after they have passed the back wall of a coating apparatus.

A solid film is optionally applied essentially simultaneously with the formation of the adjacent lower polymer layer of a curable liquid precursor. The film is thus attached to the upper surface of the lower layer essentially during the formation of said layer and the lower layer is not exposed. Directly depositing an upper layer of a curable liquid precursor onto the upper surface of said lower layer without exposing such upper surface of the lower layer may be accomplished by appropriately arranging two coating knives forming the two layers. In one aspect, the curable liquid precursors are applied via two coating stations abutting each other in the downstream direction whereby the back walls of the coating chambers comprise or form, respectively, the coating knives. The lower layer when formed by the corresponding coating knife is thus directly covered with the curable liquid precursor of the upper layer contained in the corresponding coating chamber. Generally, the coating knife forming the upper layer needs to be arranged so that the lower layer, upon its formation at the corresponding coating knife, is essentially directly covered with the curable liquid precursor forming the upper layer.

In another aspect, a solid film such as, in particular, a release liner is applied to the exposed surface of the top layer essentially simultaneously with the formation of such top layer. In this aspect, the solid film is smoothly attached to the exposed surface of the top layer in a snug fit thereby avoiding a compression of the top layer or the multilayer pressure sensitive adhesive assembly, respectively, or the inclusion of air between the solid film and the exposed surface of the top layer.

Without wishing to be bound by theory, it is believed that the above deposition of a solid film or of the liquid precursor forming the adjacent upper layer, respectively, onto the lower curable liquid precursor layer essentially simultaneously with the formation of the lower layer by means of coating knives results in multilayer pressure sensitive adhesive assemblies with superior properties. The multilayer pressure sensitive adhesive assemblies of the present disclosure exhibit well-defined layers. Due to the wet-in-wet production, in which mostly uncured compositions are superimposed, diffusion of in particular smaller monomers like acrylic acid may occur at the interface between adjacent layers. It is further believed that the pressure sensitive adhesive assemblies of the present disclosure develop chemical bonds extending from one layer to the adjacent layer which might possibly be even more pronounced by monomer diffusion across the interface. This might be an explanation for the strong anchorage observed between adjacent layers so that the pressure sensitive adhesive assemblies of the present disclosure typically exhibit a higher T-peel strength than corresponding films obtained by e.g. co-extrusion of the corresponding layers and post-curing.

According to a particular aspect, the solid films which may optionally be used herein are attached to form the lowest layer and/or the topmost layer and/or an intermediate layer of the precursor of the multilayer pressure sensitive adhesive assembly.

In a typical execution, at least the exposed surface of the substrate and/or at least one surface of a solid film facing the precursor of the multilayer pressure sensitive adhesive assembly, is a release surface.

When manufacturing the multilayer pressure sensitive adhesive assembly of the present disclosure, the adhesive layer may preferably be coated as the top layer and covered, for example, with a release liner whereas the opposite outer layer is preferably coated as the bottom layer (which forms the outer layer of the assembly opposite to the adhesive layer). It is, however, also possible that the adhesive layer of the multilayer pressure sensitive adhesive assembly is coated as the bottom layer during the method. In such case, the substrate preferably is integrated into the multilayer pressure sensitive adhesive assembly and forms a release liner attached to the adhesive layer.

The method of the present disclosure furthermore allows for the incorporation of solid films such as polymeric films or webs, metal films or webs, woven or non-woven webs, glass fiber reinforced webs, carbon fiber webs, polymer fiber webs or webs comprising endless filaments of glass, polymers, metals, carbon fibers and/or natural fibers, and any combinations thereof.

In a coating apparatus containing one or more coating chambers, such solid films may be introduced along the upstream surface of the front wall, any intermediate wall and the back wall, respectively. Solid films other than release liners normally form an integral part of the cured multilayer pressure sensitive adhesive assembly. The solid films may also be referred to as backing in the cured multilayer pressure sensitive adhesive assembly.

The curable liquid precursors suitable for use herein the present disclosure comprise a broad range of precursors which can be cured by exposure to actinic radiation and, in particular, to UV-radiation, gamma-radiation and E-beam or by exposure to heat.

In one particular aspect, the curable liquid precursors for use herein are essentially solvent-free, i.e. they do essentially not comprise any non-reactive solvents such as, for example, methanol, acetone, dimethylsulfoxide, or toluene. It is, however, possible though not preferred that the precursor comprises small amounts of one or more of such non-reactive solvents of preferably less than 2 pph and more preferably of less than 1 pph with respect to the mass of the curable precursor in order to lower the viscosity of the curable liquid precursor.

The Brookfield viscosity of the curable liquid precursors at 25° C. is typically between 100 and 50,000 mPa·s, between 500 and 30,000 mPa·s, or even between 500 and 25,000 mPa·s. If the curable liquid precursor comprises solid particles such as, for example, pigments or thermally and/or electrically conducting particles, the viscosity of the liquid precursor is typically between 1,000 and 30,000 mPa·s or even between 3,000 and 25,000 mPa·s.

Unless otherwise indicated, the Brookfield viscosity of the curable liquid precursors is measured at 25° C. (spindle 4, 12 rpm) according to DIN EN ISO 2555:1999 using a Brookfield Digital Viscosimeter DV-II, commercially available from Brookfield Engineering Laboratories, Inc.

If the viscosity of the liquid precursor is less than about 100 mPa·s, the coated layer tends to get unstable and the thickness of the precursor layer may be difficult to control. If the viscosity of the liquid precursor is higher than about 50.000 mPa·s, coating of homogeneous films tends to get difficult due to high shear forces induced by the high viscosity.

If the curable liquid precursor comprises curable monomers and/or oligomers the viscosity of the curable liquid precursor may be increased in a controlled way within the ranges given above by partially polymerizing the curable liquid precursor to provide a desirable coatability. Alternatively, the viscosity of the curable liquid precursor may be increased and adjusted by adding thixotropic agents such as fumed silica and/or polymer adds such as block-copolymers (SBRs, EVAs, polyvinylether, polyalphaolefins), silicones or acrylics. The viscosity of the curable liquid precursor may also be decreased, for example, by increasing the amount of curable monomers and/or oligomers.

In a preferred aspect of the method for manufacturing a multilayer pressure sensitive adhesive assembly of the present disclosure, the curable liquid precursors for use herein have a Brookfield viscosity of at least 1,000 mPa·s at 25° C.

The curable liquid precursor of the first pressure sensitive adhesive polymer layer for use herein comprises a low Tg (meth)acrylate copolymer and a high Tg (meth)acrylate copolymer.

The low Tg (meth)acrylate copolymer (component), which may be a solution copolymer or a syrup copolymer, comprises:
  i. $C_1$-$C_{32}$ (meth)acrylic acid ester monomer units, $C_1$-$C_{24}$ (meth)acrylic acid ester monomer units, or even $C_1$-$C_{18}$ (meth)acrylic acid ester monomer units;
  ii. optionally, acid-functional ethylenically unsaturated monomer units;

iii. optionally, non-acid functional, ethylenically unsaturated polar monomer units;
iv. optionally, vinyl monomer units; and
v. optionally, multifunctional (meth)acrylate monomer units.

In the context of the present disclosure, the expression "low Tg (meth)acrylate copolymer" is meant to designate a (meth)acrylate copolymer having a Tg of below 20° C.

The high Tg acrylate copolymer has a weight average molecular weight (Mw) of above 20,000 Daltons, and comprises:
i. high Tg (meth)acrylic acid ester monomer units;
ii. optionally, acid functional ethylenically unsaturated monomer units;
iii. optionally, low Tg (meth)acrylic acid ester monomer units;
iv. optionally, non-acid functional, ethylenically unsaturated polar monomer units;
v. optionally, vinyl monomer units.

In the context of the present disclosure, the expression "high Tg (meth)acrylate copolymer" is meant to designate a (meth)acrylate copolymer having a Tg of above 50° C.

In the context of the present disclosure, the expression "low Tg (meth)acrylic acid ester monomer units" is meant to designate (meth)acrylic acid ester monomer units having a Tg of below 20° C., as a function of the homopolymer of said low Tg monomers.

In the context of the present disclosure, the expression "high Tg (meth)acrylic acid ester monomer units" is meant to designate (meth)acrylic acid ester monomer units having a Tg of above 50° C., as a function of the homopolymer of said high Tg monomers.

The terms "glass transition temperature" and "Tg" are used interchangeably and refer to the glass transition temperature of a material or a mixture. Unless otherwise indicated, glass transition temperature values are typically measured through differential scanning calorimetry (DSC). Alternatively, the glass transition temperature values of mixtures/blend of polymers or copolymers are typically estimated by the Fox equation, as detailed hereinafter.

Throughout the present description, the term "syrup (co)polymer" refers to a solution of a solute (co)polymer in one or more solvent monomers, the solution having preferably a viscosity of from 500 to 10,000 mPa·s at 25° C., and "solution (co)polymer" refers to a solution of a solute (co)polymer in one or more organic solvents.

The first pressure-sensitive adhesives of this disclosure provide the desired balance of tack, peel adhesion, and shear holding power, and further conform to the Dahlquist criteria; i.e. the modulus of the adhesive at the application temperature, typically room temperature, is less than $3 \times 10^6$ dynes/cm at a frequency of 1 Hz. The first pressure-sensitive adhesives of the present disclosure are particularly useful for forming strong bonds to low surface energy (LSE) substrates, and further exhibit exceptional adhesion at elevated temperatures on these substrates.

As used herein, the term "alkyl" refers to a mono- or polyvalent group which is a saturated hydrocarbon. The alkyl can be linear, branched, cyclic, or combinations thereof and includes both unsubstituted and substituted alkyl groups. The alkyl group typically has 1 to 32 carbon atoms. In some embodiments, the alkyl group contains 1 to 25, 1 to 20, 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, 2-ethylhexyl, 2-octyl, cyclopentyl, cyclohexyl, cycloheptyl, adamantyl, norbornyl and 2-propylheptyl.

In a particular aspect, the low Tg (meth)acrylate copolymer for use herein, and which may be a solution copolymer or a syrup copolymer, has a Tg of below 20° C., or even below 0° C.

According to a particular aspect, the low Tg (meth)acrylate copolymer for use herein comprises $C_1$-$C_{24}$ (meth)acrylic acid ester monomer units, $C_1$-$C_{18}$ (meth)acrylic acid ester monomer units, or even $C_4$-$C_{12}$ (meth)acrylic acid ester monomer units.

According to a more particular aspect, the low Tg (meth)acrylate copolymer for use herein comprises monomeric (meth)acrylic acid esters of a non-tertiary alcohol, which alcohol contains from 1 to 32, from 1 to 24, from 1 to 18, or even from 4 to 12 carbon atoms. A mixture of such monomers may be used.

Examples of monomers suitable for use as the (meth)acrylate acid ester monomer units include, but are not limited to, the esters of either acrylic acid or methacrylic acid with non-tertiary alcohols selected from the group consisting of ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctyl alcohol, 2-ethyl-1-hexanol, 1-decanol, 2-propylheptanol, 1-dodecanol, 1-tridecanol, 1-tetradecanol, citronellol, dihydrocitronellol, and any combinations of mixtures thereof.

In some particular aspects, the (meth)acrylate ester monomer unit is the ester of (meth)acrylic acid with butyl alcohol or isooctyl alcohol, or a combination thereof, although combinations of two or more different (meth)acrylate ester monomer are also suitable.

According to another aspect, the (meth)acrylate acid ester monomer units are the esters of (meth)acrylic acid with alcohols derived from a renewable source, such as 2-octanol, citronellol, dihydrocitronellol, and any combinations or mixtures thereof.

In some other aspects, the (meth)acrylate acid ester monomer units are esters of (meth)acrylic acid with 2-alkyl alkanols (Guerbet alcohols) as described in WO-A1-2011119363 (Lewandowski et al.), the content of which is incorporated herein by reference.

In some other aspects, the (meth)acrylate acid ester monomer units are esters of (meth)acrylic acid with non-tertiary alcohols selected from the group consisting of 2-ethyl-1-hexanol and 2-propylheptanol. In a particular aspect, the (meth)acrylate acid ester monomer units are esters of (meth)acrylic acid with 2-propylheptanol.

In some aspects, the (meth)acrylate acid ester monomer units for use herein is present in an amount of 85 to 99.5 parts by weight based on 100 parts total monomer content used to prepare the low Tg copolymer. Preferably, the (meth)acrylate acid ester monomer unit is present in an amount of 95 to 99 parts by weight based on 100 parts total monomer content of the low Tg copolymer.

The low Tg (meth)acrylate copolymer for use herein may optionally further comprise acid functional ethylenically unsaturated monomer units, where the acid functional group may be an acid per se, such as a carboxylic acid, or a portion may be salt thereof, such as an alkali metal carboxylate. Useful acid functional ethylenically unsaturated monomer units include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and any combinations or mixtures thereof.

Due to their availability, acid functional ethylenically unsaturated monomer units of the acid functional low Tg (meth)acrylate copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional ethylenically unsaturated monomer unit is generally used in amounts of 0.5 to 15 parts by weight, 1 to 15 parts by weight, or even 1 to 5 parts by weight, based on 100 parts by weight total monomer of the low Tg (meth)acrylate copolymer. In some other aspects, the acid functional ethylenically unsaturated monomer unit is used in amounts of 0.5 to 15 parts by weight, 0.5 to 10 parts by weight, 0.5 to 5 parts by weight, 0.5 to 3 parts by weight, or even 0.5 to 2 parts by weight, based on 100 parts by weight total monomer of the low Tg (meth)acrylate copolymer.

The non-acid functional, ethylenically unsaturated polar monomer units useful in preparing the low Tg (meth)acrylate copolymer are both somewhat oil soluble and water soluble, resulting in a distribution of the polar monomer between the aqueous and oil phases in an emulsion polymerization. As used herein, the term "polar monomers" are exclusive of acid functional monomers.

Representative examples of suitable non-acid functional, ethylenically unsaturated polar monomer units include, but are not limited to, 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono(meth)acrylates; alkyl vinyl ethers, including vinyl methyl ether; and mixtures thereof. Preferred non-acid functional, ethylenically unsaturated polar monomer units include those selected from the group consisting of 2-hydroxyethyl (meth)acrylate and N-vinylpyrrolidinone. The non-acid functional, ethylenically unsaturated polar monomer unit may be present in amounts of 0 to 10 parts by weight, or even 0.5 to 5 parts by weight, based on 100 parts by weight total monomer of the low Tg (meth)acrylate copolymer.

When used, vinyl monomer units useful in preparing the low Tg (meth)acrylate copolymer, include vinyl esters (e.g., vinyl acetate and vinyl propionate), styrene, substituted styrene (e.g., α-methyl styrene), vinyl halide, and mixtures thereof. As used herein vinyl monomer units are exclusive of acid functional monomers, acrylate ester monomers and polar monomers. Such vinyl monomer units are generally used at 0 to 5 parts by weight, or even 1 to 5 parts by weight, based on 100 parts by weight total monomer of the low Tg (meth)acrylate copolymer.

In order to increase cohesive strength of the coated adhesive composition, a multifunctional (meth)acrylate monomer unit may be incorporated into the blend of polymerizable monomers. Multifunctional acrylate monomer units are particularly useful for emulsion or syrup polymerization. Examples of useful multifunctional (meth)acrylate monomer units include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof. The amount and identity of the particular multifunctional (meth)acrylate monomer unit is tailored depending upon application of the adhesive composition.

Typically, the multifunctional (meth)acrylate monomer unit is present in amounts less than 5 parts based on total dry weight of adhesive composition. More specifically, the multifunctional (meth)acrylate monomer unit (crosslinker) may be present in amounts from 0.01 to 5 parts, or even 0.05 to 1 parts, based on 100 parts total monomers of the low Tg (meth)acrylate copolymer.

According to such particular aspect, the low Tg (meth)acrylate copolymer may comprise:
 i. 85 to 99.5 parts by weight of an (meth)acrylic acid ester monomer unit of non-tertiary alcohol;
 ii. 0.5 to 15 parts by weight of an acid functional ethylenically unsaturated monomer unit;
 iii. 0 to 10 parts by weight of a non-acid functional, ethylenically unsaturated polar monomer unit;
 iv. 0 to 5 parts vinyl monomer units; and
 v. 0 to 5 parts of a multifunctional (meth)acrylate monomer units;
 based on 100 parts by weight total monomers of the low Tg (meth)acrylate copolymer.

In some aspects, the low Tg copolymers may contain high Tg (meth)acrylic acid ester monomer units having glass transition temperatures of above 50° C., as a function of the homopolymer of said high Tg (meth)acrylic acid ester monomer units. The incorporation of small amounts of high Tg (meth)acrylic acid ester monomer units in the low Tg (meth)acrylate copolymer component improves the compatibility and stabilize the microphase morphology between the low- and high Tg (meth)acrylate copolymer components, particularly when the high Tg (meth)acrylic acid ester monomer unit is common to both (meth)acrylate copolymer components.

Suitable high Tg monomer units are (meth)acrylate acid esters and are described in more detail below. The low Tg (meth)acrylate copolymer may contain amounts of copolymerized high Tg (meth)acrylic acid ester monomer units such that the Tg of the (meth)acrylate copolymer is of below 20° C., preferably below 0° C., as estimated by the Fox Equation. Generally, the copolymer may contain 1-20 wt. %, or 1-10 wt. % in the low Tg (meth)acrylate copolymer. The high Tg (meth)acrylic acid ester monomer units of the low Tg (meth)acrylate copolymer may be incorporated in any manner. They may be part of the monomer mixture used in the preparation, whether by syrup, solvent or neat polymerization.

Where such high Tg (meth)acrylic acid ester monomer units are included, the low Tg (meth)acrylate copolymer may comprise:
 i. 60 to 98.5 parts by weight, preferably 65 to 98.5 parts by weight of an (meth)acrylic acid ester of non-tertiary alcohol;
 ii. 1 to 20 parts by weight of high Tg (meth)acrylic acid ester monomer units;
 iii. 0.5 to 15 parts by weight of acid-functional ethylenically unsaturated monomer units;
 iv. 0 to 10 parts by weight of non-acid functional, ethylenically unsaturated polar monomer units;

v. 0 to 5 parts vinyl monomer units; and vi. 0 to 5 parts of multifunctional (meth)acrylate monomer units;

based on 100 parts by weight total monomers of the low Tg (meth)acrylate copolymer.

The low Tg (meth)acrylate copolymer may be prepared by any conventional free radical polymerization method, including solution, radiation, bulk, dispersion, emulsion, solventless, and suspension processes. The resulting adhesive (co)polymers may be random or block (co)polymers. Preferably, the low Tg (meth)acrylate copolymer component is generally prepared as either a solution or syrup copolymer composition.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 24 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

A syrup polymer technique comprises partially polymerizing monomers to produce a syrup polymer comprising the low Tg (meth)acrylate copolymer and unpolymerized monomers. The syrup polymer composition is polymerized to a useful coating viscosity, which may be coated onto a substrate (such as a tape backing) and further polymerized. Partial polymerization provides a coatable solution of the acid functional (meth)acrylate solute copolymer in one or more solvent monomers. When high Tg (meth)acrylic acid ester monomer units are included, the initial monomer mixture may include the high Tg (meth)acrylic acid ester monomer units, and/or the high Tg (meth)acrylic acid ester monomer units may be added to the syrup polymer composition. In such aspects, the monomer mixture may be combined and partially polymerized to a suitable viscosity, then addition high Tg (meth)acrylic acid ester monomer units added.

The polymerizations may be conducted in the presence of, or preferably in the absence of, suitable solvents such as ethyl acetate, toluene and tetrahydrofuran which are unreactive with the functional groups of the components of the syrup polymer.

Polymerization can be accomplished by exposing the syrup polymer composition to energy in the presence of a photoinitiator. Energy activated initiators may be unnecessary where, for example, ionizing radiation is used to initiate polymerization. These photoinitiators can be employed in concentrations ranging from about 0.0001 to about 3.0 pbw, preferably from about 0.0001 to about 1.0 pbw, and more preferably from about 0.005 to about 0.5 pbw, per 100 pbw of the total monomer of the low Tg (meth)acrylate syrup copolymer.

A preferred method of preparation of the coatable syrup polymer is photoinitiated free radical polymerization. Advantages of the photopolymerization method are that 1) heating the monomer solution is unnecessary and 2) photoinitiation is stopped completely when the activating light source is turned off. Polymerization to achieve a coatable viscosity may be conducted such that the conversion of monomers to polymer is up to about 30%. Polymerization can be terminated when the desired conversion and viscosity have been achieved by removing the light source and by bubbling air (oxygen) into the solution to quench propagating free radicals.

The solute (co)polymer(s) may be prepared conventionally in a non-monomeric solvent and advanced to high conversion (degree of polymerization). When solvent (monomeric or non-monomeric) is used, the solvent may be removed (for example by vacuum distillation) either before or after formation of the syrup polymer. While an acceptable method, this procedure involving a highly converted functional polymer is not preferred because an additional solvent removal step is required, another material may be required (the non-monomeric solvent), and dissolution of the high molecular weight, highly converted solute polymer in the monomer mixture may require a significant period of time.

Useful photoinitiators include benzoin ethers such as benzoin methyl ether and benzoin isopropyl ether; substituted acetophenones such as 2,2-dimethoxyacetophenone, available as IRGACURE 651 photoinitiator (BASF, Ludwigshafen, Germany), 2,2 dimethoxy-2-phenyl-1-phenylethanone, available as ESACURE KB-1 photoinitiator (Sartomer Co.; West Chester, Pa.), and dimethoxyhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. Additional photoinitiator can be added to the mixture to be coated after the copolymer has been formed, i.e., photoinitiator can be added to the syrup polymer mixture.

The syrup polymer composition and the photoinitiator may be irradiated with activating UV radiation to polymerize the monomer component(s). UV light sources can be of two types: 1) relatively low light intensity sources such as backlights which provide generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm$^2$, preferably between 15 and 450 mW/cm$^2$. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$. Such photoinitiators preferably are present in an amount of from 0.1 to 1.0 pbw per 100 pbw of the syrup polymer composition.

The degree of conversion (of monomers to copolymer) can be monitored during the irradiation by measuring the index of refraction of the polymerizing. Useful coating viscosities are achieved with conversions (i.e. the percentage of available monomer polymerized) in the range of up to 30%, preferably 2-20%, more preferably from 5-15%, and most preferably from 7-12%. The molecular weight (weight average) of the solute polymer(s) is at least 100,000, preferably at least 250,000, more preferably at least 500,000.

It will be understood that a syrup polymerization method will produce a "dead polymer" in the initial free radical polymerization; i.e. a fully polymerized, not free-radically polymerizable polymer. Subsequently the solvent monomers do not free-radically polymerize onto the extant solute copolymer. Upon compounding the syrup polymer, further exposure to UV initiates free radical polymerization of the solvent monomers to produce a distinct copolymer. The syrup method provides advantages over solvent or solution polymerization methods; the syrup method yielding higher molecular weights. These higher molecular weights increase the amount of chain entanglements, thus increasing cohesive strength. Also, the distance between cross-links can be greater with high molecular syrup polymer, which allows for increased wet-out onto a surface.

The curable liquid precursor of the first pressure sensitive adhesive polymer layer for use herein further comprises, in part, a high Tg (meth)acrylate copolymer having a weight average molecular weight (Mw) of above 20,000 Daltons, above 25,000 Daltons, above 30,000 Daltons, above 35,000 Daltons, or even above 40,000 Daltons.

In some aspects, the high Tg (meth)acrylate copolymer has a weight average molecular weight (Mw) of below 100,000 Daltons, below 80,000 Daltons, below 75,000 Daltons, below 60,000 Daltons, below 50,000 Daltons, or even below 45,000 Daltons.

The high Tg (meth)acrylate copolymer has a Tg of above 50° C., or even above 75° C.

The high Tg (meth)acrylate copolymer comprises:
i) high Tg (meth)acrylic acid ester monomer units;
ii) optionally, acid functional ethylenically unsaturated monomer units;
iii) optionally, low Tg (meth)acrylic acid ester monomer units;
iv) optionally, non-acid functional, ethylenically unsaturated polar monomer units; and
v) optionally, vinyl monomer units.

The high Tg (meth)acrylate copolymer may comprise 100 wt. % high Tg monomer(s). In other aspects, the high Tg (meth)acrylate copolymer may comprise the additional monomer units, as described for the low Tg (meth)acrylate copolymer (supra), each in amounts such that the Tg of the resulting copolymer is at least 50° C., or even at least 75° C., as estimated by the Fox equation.

Thus the high Tg (meth)acrylate copolymer may comprise:
i) up to 100 parts by weight of high Tg (meth)acrylic acid ester monomer units;
ii) 0 to 15, or even 1 to 5 parts by weight of acid functional ethylenically unsaturated monomer units;
iii) 0 to 50, or even 1 to 25 parts by weight of optional low Tg (meth)acrylic acid ester monomer units;
iv) 0 to 10, or even 1 to 5 parts by weight of optional non-acid functional, ethylenically unsaturated polar monomer units; and
v) 0 to 5, or even 1 to 5 parts by weight of optional vinyl monomer units.

It is desirable for the (meth)acrylic acid ester (co)polymer to include a high Tg monomer units, such that the high Tg (meth)acrylate copolymer has a Tg of above 50° C., or even above 75° C., as estimated by the Fox Equation.

Suitable high Tg (meth)acrylic acid ester monomer units are selected from the group consisting of t-butyl (meth)acrylate, methyl (meth)acrylate, ethyl (meth)acrylate, isopropyl (meth)acrylate, n-butyl (meth)acrylate, isobutyl (meth)acrylate, s-butyl (meth)acrylate, t-butyl (meth)acrylate, stearyl (meth)acrylate, phenyl (meth)acrylate, cyclohexyl (meth)acrylate, isobornyl (meth)acrylate, isobornyl (meth)acrylate, benzyl (meth)acrylate, 3,3,5 trimethylcyclohexyl (meth)acrylate, cyclohexyl (meth)acrylate, N-octyl acrylamide, propyl (meth)acrylate, and any combinations or mixtures thereof.

Suitable low Tg (meth)acrylic acid ester monomer units include those having one ethylenically unsaturated group and a glass transition temperature of less than 0° C. (as a function of the homopolymer). Exemplary low Tg (meth) acrylic acid ester monomer units for use herein include, but are not limited to, n-butyl acrylate, isobutyl acrylate, hexyl acrylate, 2-ethyl-hexylacrylate, isooctylacrylate, caprolactoneacrylate, isodecylacrylate, tridecylacrylate, laurylmethacrylate, methoxy-polyethylenglycol-monomethacrylate, laurylacrylate, tetrahydrofurfuryl-acrylate, ethoxy-ethoxyethyl acrylate and ethoxylated-nonylacrylate. Especially preferred are 2-ethyl-hexylacrylate, ethoxy-ethoxyethyl acrylate, tridecylacrylate and ethoxylated nonylacrylate. Other monomers may be used as described for the low Tg copolymer (supra).

The high Tg (meth)acrylate (co)polymer herein may be prepared by any conventional free radical polymerization method, including solution, radiation, bulk, dispersion, emulsion, and suspension processes. The resulting adhesive (co)polymers may be random or block (co)polymers.

The adhesive copolymers may be prepared via suspension polymerizations as disclosed in U.S. Pat. No. 3,691,140 (Silver); U.S. Pat. No. 4,166,152 (Baker et al.); U.S. Pat. No. 4,636,432 (Shibano et al); U.S. Pat. No. 4,656,218 (Kinoshita); and U.S. Pat. No. 5,045,569 (Delgado).

Polymerization via emulsion techniques may require the presence of an emulsifier (which may also be called an emulsifying agent or a surfactant). Useful emulsifiers for the present disclosure include those selected from the group consisting of anionic surfactants, cationic surfactants, nonionic surfactants, and mixtures thereof. Preferably, an emulsion polymerization is carried out in the presence of anionic surfactant(s). A useful range of surfactant concentration is from about 0.5 to about 8 weight percent, preferably from about 1 to about 5 weight percent, based on the total weight of all monomers of the emulsion pressure-sensitive adhesive.

Alternatively, the copolymers can be polymerized by techniques including, but not limited to, the conventional techniques of solvent polymerization, dispersion polymerization, and solventless bulk polymerization. The monomer mixture may comprise a polymerization initiator, especially a thermal initiator or a photoinitiator of a type and in an amount effective to polymerize the comonomers.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 20 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

In a typical photopolymerization method, a monomer mixture may be irradiated with ultraviolet (UV) rays in the presence of a photopolymerization initiator (i.e., photoinitiators). Preferred photoinitiators are those available under the trade designations IRGACURE™ and DAROCUR™ from BASF and include 1-hydroxy cyclohexyl phenyl ketone (IRGACURE™ 184), 2,2-dimethoxy-1,2-diphenylethan-1-one (IRGACURE 651), bis(2,4,6-trimethylbenzoyl)

phenylphosphineoxide (IRGACURE™ 819), 1-[4-(2-hydroxyethoxy)phenyl]-2-hydroxy-2-methyl-1-propane-1-one (IRGACURE™ 2959), 2-benzyl-2-dimethylamino-1-(4-morpholinophenyl)butanone (IRGACURE™ 369), 2-methyl-1-[4-(methylthio)phenyl]-2-morpholinopropan-1-one (IRGACURE™ 907), and 2-hydroxy-2-methyl-1-phenyl propan-1-one (DAROCUR™ 1173). Particularly preferred photoinitiators are IRGACURE™ 819, 651, 184 and 2959.

Solventless polymerization methods, such as the continuous free radical polymerization method described in U.S. Pat. Nos. 4,619,979 and 4,843,134 (Kotnour et al.); the essentially adiabatic polymerization methods using a batch reactor described in U.S. Pat. No. 5,637,646 (Ellis); and, the methods described for polymerizing packaged pre-adhesive compositions described in U.S. Pat. No. 5,804,610 (Hamer et al.) may also be utilized to prepare the polymers.

Water-soluble and oil-soluble initiators useful in preparing the high Tg (co)polymers used in the present disclosure are initiators that, on exposure to heat, generate free-radicals which initiate (co)polymerization of the monomer mixture. Water-soluble initiators are preferred for preparing the (meth)acrylate polymers by emulsion polymerization. Suitable water-soluble initiators include but are not limited to those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis(4-cyanopentanoic acid) and its soluble salts (e.g., sodium, potassium). The preferred water-soluble initiator is potassium persulfate. Suitable oil-soluble initiators include but are not limited to those selected from the group consisting of azo compounds such as VAZO 64 (2,2'-azobis (isobutyronitrile)) and VAZO 52 (2,2'-azobis(2,4-dimethylpentanenitrile)), both available from E.I. du Pont de Nemours Co., peroxides such as benzoyl peroxide and lauroyl peroxide, and mixtures thereof. The preferred oil-soluble thermal initiator is (2,2'-azobis(isobutyronitrile)). When used, initiators may comprise from about 0.05 to about 1 part by weight, or from about 0.1 to about 0.5 part by weight based on 100 parts by weight of monomer components in the first pressure-sensitive adhesive.

For both of the high and low Tg (meth)acrylate copolymers, a useful predictor of interpolymer Tg for specific combinations of various monomers can be computed by application of Fox Equation: $1/Tg=\Sigma Wi/Tgi$. In this equation, Tg is the glass transition temperature of the mixture, Wi is the weight fraction of component i in the mixture, and Tgi is the glass transition temperature of component i, and all glass transition temperatures are in Kelvin (K). As used herein the term "high Tg monomer" refers to a monomer, which when homopolymerized, produce a (meth)acryloyl polymer having a Tg of above 50° C. The incorporation of the high Tg monomer to the high Tg (meth)acrylate copolymer is sufficient to raise the glass transition temperature of the resulting (meth)acrylate copolymer to above 50° C., above 75° C., or even above 100° C., as calculated using the Fox Equation. Alternatively, the glass transition temperature can also be measured in a variety of known ways, including, e.g., through differential scanning calorimetry (DSC).

If desired, a chain transfer agent may be added to the monomer mixture of either of the low- or high Tg (co) polymers to produce a (co)polymer having the desired molecular weight. A chain transfer is preferably used in the preparation of the high Tg (co)polymer. It has been observed that when the molecular weight of the high Tg (co)polymer is less than 20 k, the peel performance at elevated temperatures is reduced. Further, when the $M_w$ is greater than about 100 k, the immiscibility of the components is such that the tack of the composition is reduced.

Examples of useful chain transfer agents include but are not limited to those selected from the group consisting of carbon tetrabromide, alcohols, mercaptans, and mixtures thereof. When present, the preferred chain transfer agents are isooctylthioglycolate and carbon tetrabromide. The chain transfer agent may be used in amounts such that the high Tg (co)polymer has a $M_w$ of greater than 20 k, and preferable less than 100 k. The monomer mixture may further comprise up to about 5 parts by weight of a chain transfer agent, typically about 0.01 to about 5 parts by weight, if used, preferably about 0.5 parts by weight to about 3 parts by weight, based upon 100 parts by weight of the total monomer mixture.

In order to increase cohesive strength of the first pressure-sensitive adhesive, a crosslinking additive may be added to the adhesive composition—the combination of the high- and low Tg (co)polymers. Two main types of crosslinking additives are exemplary. The first crosslinking additive is a thermal crosslinking additive such as multifunctional aziridine, isocyanate and epoxy. One example of aziridine crosslinker is 1,1'-isophthaloyl-bis(2-methylaziridine (CAS No. 7652-64-4). Such chemical crosslinkers can be added into PSAs after polymerization and activated by heat during oven drying of the coated adhesive. Although polyfunctional (meth)acrylates may be included in the low Tg copolymer component and may function as crosslinking agents, additional crosslinking agents may be added. In still other methods of crosslinking, thermal crosslinkers may be used, optionally in combination with suitable accelerants and retardants. Suitable thermal crosslinkers for use herein include, but are not limited to, isocyanates, more particularly trimerized isocyanates and/or sterically hindered isocyanates that are free of blocking agents, or else epoxide compounds such as epoxide-amine crosslinker systems. Advantageous crosslinker systems and methods are described e.g. in the descriptions of DE 202009013255 U1, EP 2 305 389 A, EP 2 414 143 A, EP 2 192 148 A, EP 2 186 869, EP 0 752 435 A, EP 1 802 722 A, EP 1 791 921 A, EP 1 791 922 A, EP 1 978 069 A, and DE 10 2008 059 050 A, the relevant contents of which are herewith incorporated by reference. Suitable accelerant and retardant systems for use herein are described e.g. in the description of US-A1-2011/0281964, the relevant content of which is herewith explicitly incorporated by reference. Suitable thermal crosslinkers for use herein include epoxycyclohexyl derivatives, in particular epoxycyclohexyl carboxylate derivatives, with particular preference to (3,4-epoxycyclohexane)methyl 3,4-epoxycyclohexylcarboxylate, commercially available from Cytec Industries Inc. under tradename UVACURE 1500.

In another embodiment, chemical crosslinkers, which rely upon free radicals to carry out the crosslinking reaction, may be employed. Reagents such as, for example, peroxides serve as a source of free radicals. When heated sufficiently, these precursors will generate free radicals that bring about a crosslinking reaction of the polymer. A common free radical generating reagent is benzoyl peroxide. Free radical generators are required only in small quantities, but generally require higher temperatures to complete a crosslinking reaction than those required for the bisamide and isocyanate reagents.

The second type of crosslinking additive is a photosensitive crosslinker, which is activated by high intensity ultraviolet (UV) light. Two common photosensitive crosslinkers used for acrylic PSAs are benzophenone and copolymerizable aromatic ketone monomers as described in U.S. Pat. No. 4,737,559 (Kellen et al.). Another photocrosslinker, which can be post-added to the solution or syrup copolymer and activated by UV light is a triazine, for example, 2,4-bis(trichloromethyl)-6-(4-methoxy-phenyl)-s-triazine. In some embodiments, multifunctional acrylates may be used to increase the cohesive strength. Multi-functional acrylates are particularly useful for emulsion polymerization. Examples of useful multi-functional acrylate crosslinking agents include, but are not limited to, diacrylates, triacrylates, and tetraacrylates, such as 1,6-hexanediol diacrylate, poly(ethylene glycol) diacrylates, polybutadiene diacrylate, polyurethane diacrylates, and propoxylated glycerin triacrylate, and mixtures thereof.

Hydrolyzable, free-radically copolymerizable crosslinkers, such as monoethylenically unsaturated mono-, di-, and trialkoxy silane compounds including, but not limited to, methacryloxypropyltrimethoxysilane (available from Gelest, Inc., Tullytown, Pa.), vinyl dimethylethoxysilane, vinyl methyl diethoxysilane, vinyltriethoxysilane, vinyltrimethoxysilane, vinyltriphenoxysilane, and the like, are also useful crosslinking agents.

The amount and identity of the crosslinking agent is tailored depending upon application of the adhesive composition. If present, a crosslinker can be used in any suitable amount. Typically, the crosslinking agent is present in amounts less than 5 parts based on total dry weight of adhesive composition. More specifically, the crosslinker may be present in amounts from 0.01 to 5 parts, preferably 0.05 to 1 parts, based on 100 parts total monomers of the low Tg copolymer.

In the context of the present disclosure, the curable liquid precursor of the first pressure sensitive adhesive polymer layer comprises a crosslinking agent which is preferably selected from the group consisting of multifunctional aziridines, multifunctional isocyanates, multifunctional epoxides, benzophenone, triazines, multifunctional acrylates, multifunctional carboxylates, oxetanes, oxazolines, and any combinations or mixtures thereof. In a more preferred aspect, the crosslinking agent is selected from the group consisting of multifunctional acrylates.

Conventional acrylic adhesives do not often adhere well to certain substrates, such as certain types of automotive paints and low energy surfaces (LSE). Efforts have been made to improve the adhesion of acrylic adhesives, i.e., develop more aggressive tack, to these types of surfaces; tackifying the base acrylic polymer is commonly practiced. Various types of tackifiers include phenol modified terpenes, resins such as polyvinyl cyclohexane and poly(t-butyl styrene), and rosin esters such as glycerol esters of rosin and pentaerythritol esters of rosin.

Due to the high solubility parameter of most conventional pressure-sensitive acrylic adhesives and the presence of specific potential interactions between these adhesives and many tackifiers, a limited selection of tackifiers is available to the formulator. As a consequence, hydrocarbon-based tackifiers, and especially hydrogenated hydrocarbon resins, have been considered unsuitable for use in acrylic adhesives formulations due to their nonpolar character.

However, such hydrogenated hydrocarbon tackifiers may be advantageously used, as an optional ingredient, in combination with the high- and low Tg (meth)acrylate copolymers described supra. The tackifiers are typically used in amounts sufficient to strengthen the partial phase separation extent in the system. The incompatibility provided by such tackifiers may be used to produce pressure-sensitive adhesive compositions. As result of the incompatibility, it is observed that the glass transition of the adhesive composition is further broadened, relative to the combination of the high- and low Tg copolymers, which consequentially further improves its overall adhesions on LSE or even MSE substrates. If a compatible tackifier (those having good compatibility with the low Tg acrylic polymers) is added to a high- and low Tg copolymers blend, a significant drop in adhesion on LSE substrates is generally observed, and the advantageous effects from the phase separation of high- and low Tg copolymers may be generally lost.

Hydrogenated hydrocarbon tackifiers are traditionally used in more rubber-based adhesives rather than acrylic-based pressure sensitive adhesives. The hydrogenated hydrocarbon tackifiers are found to be particularly useful in the acrylate-based pressure sensitive adhesives for low surface energy substrates disclosed herein. Exemplary hydrogenated hydrocarbon tackifiers include C9 and C5 hydrogenated hydrocarbon tackifiers. Examples of C9 hydrogenated hydrocarbon tackifiers include those sold under the trade designation: REGALITE S-5100, REGALITE R-7100, REGALITE R-9100, REGALITE R-1125, REGALITE S-7125, REGALITE S-1100, REGALITE R-1090, REGALREZ 6108, REGALREZ 1085, REGALREZ 1094, REGALREZ 1126, REGALREZ 1139, and REGALREZ 3103, sold by Eastman Chemical Co., Middelburg, Netherlands; PICCOTAC and EASTOTAC sold by Eastman Chemical Co.; ARKON P-140, ARKON P-125, ARKON P-115, ARKON P-100, ARKON P-90, ARKON M-135, ARKON M-115, ARKON M-100, and ARKON M-90 sold by Arakawa Chemical Inc., Chicago, Ill.; and ESCOREZ 5000 series sold by Exxon Mobil Corp., Irving, Tex. Of particular interest are partially hydrogenated C9 hydrogenated tackifiers, preferably fully hydrogenated C9 hydrogenated tackifiers.

The hydrogenated hydrocarbon tackifiers, if present, are typically used in amounts of from 0.1 to 20 parts by weight, from 0.5 to 20 parts by weight, from 1 to 15 parts by weight, from 2 to 15 parts by weight, or even from 5 to 15 parts by weight, relative to 100 parts of the low- and high-Tg (meth)acrylate (co)polymers.

Other additives can be added in order to enhance the performance of the first pressure sensitive adhesive polymer layer. For example, leveling agents, ultraviolet light absorbers, hindered amine light stabilizers (HALS), oxygen inhibitors, wetting agents, rheology modifiers, defoamers, biocides, dyes and the like, can be included herein. All of these additives and the use thereof are well known in the art. It is understood that any of these compounds can be used so long as they do not deleteriously affect the adhesive properties.

Useful as additives to the curable liquid of the first pressure sensitive adhesive polymer layer are UV absorbers and hindered amine light stabilizers. UV absorbers and hindered amine light stabilizers act to diminish the harmful effects of UV radiation on the final cured product and thereby enhance the weatherability, or resistance to cracking, yellowing and delamination of the coating. A preferred hindered amine light stabilizer is bis(1,2,2,6,6-pentamethyl-4-piperidinyl) [3,5-bis(1,1-dimethylethyl-4-hydroxyphenyl)methyl]butylpropanedioate, available as Tinuvin™ 144, from BASF.

In some aspects the curable liquid of the first pressure sensitive adhesive polymer layer may include filler. Such compositions may include at least 40 wt-%, at least 45 wt-%, or even at least 50 wt-% filler, based on the total weight of the composition. In some aspects, the total amount of filler is at most 90 wt-%, at most 80 wt-%, or even at most 75 wt-% filler.

Fillers may be selected from one or more of a wide variety of materials, as known in the art, and include organic and inorganic filler. Inorganic filler particles include silica, submicron silica, zirconia, submicron zirconia, and non-vitreous microparticles of the type described in U.S. Pat. No. 4,503,169 (Randklev).

Filler components include nanosized silica particles, nanosized metal oxide particles, and combinations thereof. Nanofillers are also described in U.S. Pat. No. 7,090,721 (Craig et al.), U.S. Pat. No. 7,090,722 (Budd et al.), U.S. Pat. No. 7,156,911 (Kangas et al.), and U.S. Pat. No. 7,649,029 (Kolb et al.).

Fillers may be either particulate or fibrous in nature. Particulate fillers may generally be defined as having a length to width ratio, or aspect ratio, of 20:1 or less, and more commonly 10:1 or less. Fibers can be defined as having aspect ratios greater than 20:1, or more commonly greater than 100:1. The shape of the particles can vary, ranging from spherical to ellipsoidal, or more planar such as flakes or discs. The macroscopic properties can be highly dependent on the shape of the filler particles, in particular the uniformity of the shape.

In some aspects, the curable liquid of the first pressure sensitive adhesive polymer layer may comprise a nanoscopic particulate filler (i.e., a filler that comprises nanoparticles) having an average primary particle size of less than about 0.100 micrometers (i.e., microns), or even less than 0.075 microns. As used herein, the term "primary particle size" refers to the size of a non-associated single particle. The average primary particle size can be determined by cutting a thin sample of hardened composition and measuring the particle diameter of about 50-100 particles using a transmission electron micrograph at a magnification of 300,000 and calculating the average. The filler can have a unimodal or polymodal (e.g., bimodal) particle size distribution. The nanoscopic particulate material typically has an average primary particle size of at least about 2 nanometers (nm), and preferably at least about 7 nm. Preferably, the nanoscopic particulate material has an average primary particle size of no greater than about 50 nm, or even no greater than about 20 nm in size. The average surface area of such a filler is preferably at least about 20 square meters per gram ($m^2/g$), at least about 50 $m^2/g$, or even at least about 100 $m^2/g$.

One particularly advantageous additive that may be incorporated in the curable liquid precursor of the first pressure sensitive adhesive polymer layer is represented by chlorinated polyolefinic (co)polymers. In the context of the present disclosure, it has been surprisingly been found that incorporation of chlorinated polyolefinic (co)polymers in the curable liquid precursor of the first pressure sensitive adhesive polymer layer significantly improves the stability upon heat bond ageing and heat/humidity bond ageing of the resulting pressure sensitive adhesive polymer layer, in particular on low surface energy (LSE) substrates.

Examples of suitable chlorinated polyolefinic (co)polymers for use herein include those sold under the trade designation: CP 343-1, sold by Eastman Chemical Co.; 13-LP, 15-LP, 16-LP and 17-LP sold by Toyo Kasei Kogyo Co. Ltd; HYPALON CP 827B, HYPALON CP 163 and HYPALON CP 183 sold by DuPont Co.; and TYRIN CPE 4211P, TYRIN CPE 6323A and TYRIN CPE 3615P sold by Dow Chemical Co. In a preferred aspect, CP 343-1 is used as chlorinated polyolefinic (co)polymer.

According to a preferred aspect of the present disclosure, the curable liquid precursor of the first pressure sensitive adhesive polymer layer comprises a chlorinated polyolefinic (co)polymer, which is selected from the group consisting of chlorinated polypropylene, chlorinated polyethylene, chlorinated ethylene/vinyl acetate copolymer, and any combinations, mixtures or copolymers thereof. More preferably, the chlorinated polyolefinic (co)polymer is selected from the group of chlorinated polypropylenes.

The chlorinated polyolefinic (co)polymers, if present, are typically used in amounts of from 0.1 and 15 parts by weight, from 0.1 and 10 parts by weight, from 0.2 and 5 parts by weight, from 0.2 and 3 parts by weight, or even from 0.2 and 2 parts by weight based 100 parts of the low- and high-Tg (meth)acrylate (co)polymers.

The curable liquid precursor of the first pressure sensitive adhesive polymer layer is generally prepared by simple blending of the high- and low Tg (meth)acrylate copolymer components, optionally with the tackifier. The polymers can be blended using several methods. The polymers can be blended by melt blending, solvent blending, or any suitable physical means. For example, the polymers can be melt blended by a method as described by Guerin et al. in U.S. Pat. No. 4,152,189, the disclosure of which is incorporated by reference herein. That is, all solvent (if used) is removed from each polymer by heating to a temperature of about 150° C. to about 175° C. at a reduced pressure. Although melt blending may be used, the adhesive blends of the present disclosure can also be processed using solvent blending. The acidic and basic polymers should be substantially soluble in the solvents used.

Physical blending devices that provide dispersive mixing, distributive mixing, or a combination of dispersive and distributive mixing are useful in preparing homogenous blends. Both batch and continuous methods of physical blending can be used. Examples of batch methods include BRABENDER (using a BRABENDER PREP CENTER, available from C. W. Brabender Instruments, Inc.; South Hackensack, N.J.) or BANBURY internal mixing and roll milling (using equipment available from FARREL COMPANY; Ansonia, Conn.). Examples of continuous methods include single screw extruding, twin screw extruding, disk extruding, reciprocating single screw extruding, and pin barrel single screw extruding. The continuous methods can include utilizing both distributive elements, such as cavity transfer elements (e.g., CTM, available from RAPRA Technology, Ltd.; Shrewsbury, England) and pin mixing elements, static mixing elements and dispersive elements (e.g., MADDOCK mixing elements or SAXTON mixing elements as described in "Mixing in Single-Screw Extruders," Mixing in Polymer Processing, edited by Chris Rauwendaal (Marcel Dekker Inc.: New York (1991), pp. 129, 176-177, and 185-186).

In aspects where the low Tg (meth)acrylate copolymer component is a solution copolymer, the low Tg (meth)acrylate copolymer in a solvent is combined with the high Tg (meth)acrylate (co)polymer and optionally the tackifier, mixed until homogenous, optionally coated, and dried to remove the solvent. When the low Tg (meth)acrylate polymer component is a syrup copolymer, the syrup copolymer is combined with the high Tg (meth)acrylate (co)polymer and optionally the tackifier, optional additional solvent monomer added, optionally coated and further polymerized.

The curable liquid precursor of the first pressure sensitive adhesive polymer layer comprises at least 60 parts by weight, preferably at least 70 parts by weight, more preferably at least 80 parts by weight, of the low Tg (meth)acrylate copolymer component, which may be in the form of a solution or a syrup copolymer; up to 40 parts by weight, preferably 5 to 40 parts by weight, of the high Tg (meth) acrylate (co)polymer, with the sum of the high- and low Tg (co)polymer components 100 parts by weight. The tackifier, if present, is used in amounts sufficient to effect a partial phase separation of the components, and is generally used in amounts of 0.1 to 15 parts, preferably 0.1 to 10 parts by weight, relative to 100 parts by weight of the high- and low Tg (meth)acrylate (co)polymer components.

It is observed that the combination of the low Tg and high Tg (meth)acrylate (co)polymer components yields a microphase-separated pressure-sensitive adhesive after curing or drying wherein the low Tg (meth)acrylate copolymer is a continuous phase and the high Tg (meth)acrylate (co)polymer exists as relatively uniformly-shaped inclusions ranging in size from about 0.01 micrometer to about 0.1 micrometer. The microphase domains are separated by a diffuse boundary caused by the intermixing of the partially incompatible components at the interfaces. It is also observed that the microphase separation broadens of the glass transition of the adhesive composition, relative to that of the composition where the high and low Tg monomer units are copolymerized in a random fashion. One estimate of this effect is the peak width at a fixed height (FHPW) at half of the peak intensity of the Tan Delta curve from a dynamic mechanical analysis.

Surprisingly, a multilayer pressure-sensitive adhesive assembly comprising an adhesive layer comprising such a composition, and exhibiting microphase separation, provides substantial improvement in both peel adhesion and shear-holding capability on challenging-to-bond substrates, particularly LSE and MSE substrates, more particularly, LSE substrates, when compared to compositions having a homogenous structure or those having macro-phase separation. In particular, exceptional improvements in adhesion properties at elevated temperatures are achieved. Without wishing to be bound by theory, it is believed that such advantageous phase-separating effects are dependent on the weight average molecular weight (Mw) of the high Tg (co)polymer. If the weight average molecular weight (Mw) of the high Tg (co)polymer is less than 20,000 Daltons, the phase-separating effects are not sufficient to yield satisfactory adhesion performances at elevated temperatures.

A multilayer pressure-sensitive adhesive assembly comprising an adhesive layer comprising such a composition, and exhibiting microphase separation, provides substantial improvement in both peel adhesion while maintaining acceptable values for other adhesive properties such as shear, when compared to compositions having a homogenous structure or those having macro-phase separation.

According to another aspect of the present disclosure, it is provided a multilayer pressure sensitive adhesive assembly obtainable by the method as described above. The obtainable multilayer pressure sensitive adhesive assembly comprises at least a first pressure sensitive adhesive polymer layer superimposed to a second polymer layer.

In a particular aspect of the present disclosure, the multilayer pressure sensitive adhesive assembly is light-transmissive to visible light. Preferably, each of the polymer layers of the multilayer pressure sensitive adhesive assembly has a transmission of at least 80%, preferably at least 85%, more preferably at least 90%, even more preferably at least 95%, relative to visible light.

In another particular aspect of the present disclosure, the multilayer pressure sensitive adhesive assembly (comprising at least a first pressure sensitive adhesive polymer layer superimposed to a second polymer layer,) has a light-transmission relative to visible light and which results from the light-transmission of the superimposed polymer layers of at least 80%, preferably at least 85%, more preferably at least 90%.

In order to improve its transparency, the multilayer pressure sensitive adhesive assembly of the present disclosure may be substantially free of filler particles, cavities in the form of microspheres, expendable microspheres, in particular pentane filled expendable microspheres or gaseous cavities, glassbeads, glass microspheres, (hydrophobic/hydrophilic) silica type fillers, fibers, electrically and/or thermally conducting particles, nano particles. If desired, the multilayer pressure sensitive adhesive assembly may comprise light-transmissive solid films such as, for example, light-transmissive polymer films or webs.

The multilayer pressure sensitive adhesive assemblies of the present disclosure are provided with unique properties and, in particular, with advantageous optical properties such as, in particular, high optical transmission to visible light. While not wishing to be bound by such theory it is believed that this results from a micro-diffusion taking place at the interface between adjacent layers.

The extent of such micro-diffusion is believed to be on the one hand small enough so that it does not affect the integrity of adjacent layers. The extent of such micro-diffusion is believed to be on the other hand large enough to provide a micro-gradient at the interface which results, for example, in a gradual transition between the refractive indices of adjacent layers and hence in an increased transmission. The micro-diffusion is also believed to increase the bonding strength between adjacent layers of the multilayer film upon curing which is reflected, for example, in improved mechanical properties such as an increased T-peel strength.

As part of the advantageous properties provided by the multilayer pressure sensitive adhesive assemblies of the present disclosure, it has been surprisingly found that, in some aspects, the multilayer pressure sensitive adhesive assemblies exhibit excellent heat bond ageing resistance and/or heat/humidity bond ageing on various challenging-to-bond substrates, particularly LSE and MSE substrates, more particularly, LSE substrates.

According to a particular aspect, the multilayer pressure sensitive adhesive assembly exhibits a decrease in peel strength of less than 40%, preferably less than 30%, more preferably less than 25%, even more preferably less than 20%, still more preferably less than 15%, yet more preferably less than 10%, most preferably less than 5%, after heat bond ageing on polypropylene, when measured according to the heat bond ageing test method described in the experimental section.

The pressure sensitive adhesive assembly according to the present disclosure may have a design or configuration of any suitable kind, depending on its ultimate application and the desired properties, and provided it comprises at least a first pressure sensitive adhesive polymer layer superimposed to a second polymer layer.

According to one aspect, the multilayer pressure sensitive adhesive assembly of the present disclosure may take the form of a construction comprising two or more superimposed layers, i.e. the first pressure sensitive adhesive polymer layer, the second polymer layer and adjacent layers such as e.g. a backing layer and/or further pressure sensitive adhesive layers. Such adhesive multilayer constructions or tapes may be advantageously used as a dual-layer adhesive tape to adhere two objects to one another. In that context, suitable backing layers for use herein may or may not exhibit at least partial pressure sensitive adhesive characteristics.

In executions where a backing layer is also present, such a pressure sensitive adhesive assembly reflects a three-layer design, in which the backing layer may be sandwiched between e.g. two pressure sensitive adhesive layers.

However, regarding multilayer pressure sensitive adhesive assemblies, the present disclosure is not limited to the above described designs. As an alternative execution, the pressure sensitive adhesive assembly may comprise at least one intermediate layer between a backing layer and pressure sensitive adhesive layer(s). These further internal intermediate layers, as well as the backing layer, may exhibit advantageous mechanical properties, such as e.g. increasing the tear resistance of the multilayer pressure sensitive adhesive assembly or optical functionalities such as e.g. light transmission or reflection, colouring and labelling.

In a particular aspect, the intermediate layer comprises a polymer chosen from the group consisting of polyacrylates, polyurethanes, polyolefins, polystyrene, polyamides, natural rubbers, synthetic rubbers, polyvinylpyrrolidone, and any combinations or mixtures thereof.

However, it is also possible that the intermediate layer(s) is chosen from a pressure sensitive adhesive composition as described in this disclosure for the first pressure sensitive adhesive polymer layer. The formulation of the intermediate layer(s) may be identical or different compared to the first pressure sensitive adhesive polymer layer.

Suitable backing layers can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like.

In a particular aspect, the pressure sensitive adhesive assembly of the present disclosure is in the form of a multilayer pressure sensitive adhesive assembly, wherein the second polymer layer is a further pressure sensitive adhesive polymer layer, adjacent to the first pressure sensitive adhesive layer.

According to the particular execution, wherein the multilayer pressure sensitive adhesive assembly further comprises a further pressure sensitive adhesive layer adjacent to the first pressure sensitive adhesive layer, the multilayer pressure sensitive adhesive assembly of the present disclosure may advantageously take the form of skin/core type multilayer pressure sensitive adhesive assembly, wherein the first pressure sensitive adhesive polymer layer is the skin layer of the multilayer pressure sensitive adhesive assembly and the second polymer layer is the core layer of the multilayer pressure sensitive adhesive assembly. Skin/core type of multilayer pressure sensitive adhesive assemblies are well know to those skilled in the art, and are commonly referred to as a dual layer polymeric foam tape assemblies.

According to a particular aspect, the pressure sensitive adhesive assembly according to the present disclosure comprises a second polymer layer which takes the form of a polymeric foam layer, which is preferably a pressure sensitive adhesive layer.

In the context of the present disclosure, the term "polymeric foam" is meant to designate a material based on a polymer and which material comprises voids, typically in an amount of at least 5% by volume, typically from 10% to 55% by volume or from 10% to 45% by volume. The voids may be obtained by any of the known methods such as cells formed by gas. Alternatively, the voids may result from the incorporation of hollow fillers, such as hollow polymeric particles, hollow glass microspheres or hollow ceramic microspheres.

A polymeric foam layer for use herein has for example a thickness comprised between 100 and 6000 µm, between 200 and 4000 µm, between 500 and 2000 µm, or even between 800 and 1500 µm. As will be apparent to those skilled in the art, in the light of the present description, the preferred thickness of the polymeric foam layer will be dependent on the intended application.

A polymeric foam layer typically has a density comprised between 0.45 g/cm$^3$ and 1.5 g/cm$^3$, between 0.45 g/cm$^3$ and 1.10 g/cm$^3$, between 0.50 g/cm$^3$ and 0.95 g/cm$^3$, between 0.60 g/cm$^3$ and 0.95 g/cm$^3$, or even between 0.70 g/cm$^3$ and 0.95 g/cm$^3$. This density is achieved by including voids or cells. Typically, the polymeric foam layer will comprise at least 5% of voids by volume and for example between 15 and 45%, or between 20% and 45% by volume.

The voids or cells in the polymeric foam layer can be created in any of the known manners described in the art and include the use of a gas or blowing agent and/or including hollow particles into the composition for the polymeric foam layer. For example, according to one method to create a polymeric foam described in U.S. Pat. No. 4,415,615, an acrylic foam can be obtained by the steps of (i) frothing a composition containing the acrylate monomers and optional comonomers, (ii) coating the froth on a backing and (iii) polymerizing the frothed composition. It is also possible to coat the unfrothed composition of the acrylate monomers and optional comonomers to the backing and to then simultaneously foam and polymerize that composition. Frothing of the composition may be accomplished by whipping a gas into the polymerizable composition. Preferred gasses for this purpose are inert gasses such as nitrogen and carbon dioxide, particularly if the polymerization is photoinitiated.

Without wishing to be bound by theory, it is believed that pressure sensitive adhesive assemblies comprising a second polymer layer which takes the form of a polymeric foam layer obtained by frothing techniques, provides excellent overall conformability to the pressure sensitive adhesive assembly.

Multilayer pressure sensitive adhesive assemblies of the skin/core type, and in particular dual layer polymeric foam tape assemblies, are particularly advantageous when compared to single-layer pressure sensitive adhesives, in that adhesion (quick adhesion) can be adjusted by the formulation of the second pressure sensitive adhesive layer (also commonly referred to as the skin layer), while other properties/requirements of the overall assembly such as application issues, deforming issues and energy distribution may be addressed by appropriate formulation of the polymeric foam layer (also commonly referred to as the core layer). In some aspects, the multilayer pressure sensitive adhesive assemblies as disclosed herein are smooth, homogenous and consist of layers which are chemically bond to each other, without any delamination occurring.

In some aspects, it may be advantageous for the multilayer pressure sensitive adhesive assemblies of the present disclosure to further comprise a second pressure sensitive adhesive layer, thereby forming e.g. a three-layered multilayer pressure sensitive adhesive assembly. Preferably, the second pressure sensitive adhesive polymer layer is adjacent to the second polymer layer in the side of the second polymer layer which is opposed to the side of second polymer layer adjacent to the first pressure sensitive adhesive polymer layer. Preferably still, the first pressure sensitive adhesive polymer layer, the second polymer layer and the second pressure sensitive adhesive polymer layer are superimposed.

Three-layered multilayer pressure sensitive adhesive assemblies according to one aspect of the disclosure, may advantageously take the form of a skin/core/skin multilayer pressure sensitive adhesive assembly, wherein the first pressure sensitive adhesive polymer layer is the first skin layer of the multilayer pressure sensitive adhesive assembly, the second pressure sensitive adhesive polymer layer is the second skin layer of the multilayer pressure sensitive adhesive assembly and the second polymer layer is the core layer of the multilayer pressure sensitive adhesive assembly.

The second polymer layer and/or the second pressure sensitive adhesive polymer layer may have any composition commonly known in the art. As such, the composition of these various layers for use in the multilayer pressure sensitive adhesive assemblies of the present disclosure is not particularly limited.

In a particular aspect, the second polymer layer and/or the second pressure sensitive adhesive layer comprise a polymer base material selected from the group consisting of polyacrylates, polyurethanes, polyolefins, polyamines, polyamides, polyesters, polyethers, polyisobutylene, polystyrenes, polyvinyls, polyvinylpyrrolidone, natural rubbers, synthetic rubbers, and any combinations, copolymers or mixtures thereof.

In a typical aspect, the second polymer layer and/or the second pressure sensitive adhesive layer comprise a polymer base material selected from the group consisting of polyacrylates, polyurethanes, and any combinations, copolymers or mixtures thereof. According to another typical aspect, the second polymer layer and/or the second pressure sensitive adhesive layer comprise a polymer base material selected from the group consisting of polyacrylates, and any combinations, copolymers or mixtures thereof.

According to a preferred aspect of the pressure sensitive adhesive assemblies of the present disclosure, the second polymer layer and/or the second pressure sensitive adhesive layer comprises a polymer base material selected from the group consisting of polyacrylates whose main monomer component preferably comprises a linear or branched alkyl (meth)acrylate ester, preferably a non-polar linear or branched alkyl (meth)acrylate ester having a linear or branched alkyl group comprising preferably from 1 to 32, from 1 to 20, or even from 1 to 15 carbon atoms.

According to a preferred aspect of the pressure sensitive adhesive assemblies of the present disclosure, the second polymer layer and/or the second pressure sensitive adhesive layer comprises a polymer base material selected from the group consisting of polyacrylates whose main monomer component comprises a linear or branched alkyl (meth)acrylate ester selected from the group consisting of methyl (meth)acrylate, ethyl (meth)acrylate, n-propyl (meth)acrylate, isopropyl (meth)acrylate, n-butyl acrylate, isobutyl acrylate, tert-butyl (meth)acrylate, n-pentyl (meth)acrylate, iso-pentyl (meth)acrylate, n-hexyl (meth)acrylate, iso-hexyl (meth)acrylate, cyclohexyl (meth)acrylate, phenyl (meth) acrylate, octyl (meth)acrylate, iso-octyl (meth)acrylate, 2-octyl (meth)acrylate, 2-ethylhexyl (meth)acrylate, decyl (meth)acrylate, lauryl (meth)acrylate, 2-propylheptyl (meth) acrylate, stearyl (meth)acrylate, isobornyl acrylate, benzyl (meth)acrylate, octadecyl acrylate, nonyl acrylate, dodecyl acrylate, isophoryl (meth)acrylate, and any combinations or mixtures thereof.

In a more preferred aspect, the linear or branched alkyl (meth)acrylate ester is selected from the group consisting of iso-octyl (meth)acrylate, 2-ethylhexyl (meth)acrylate, 2-propylheptyl (meth)acrylate, butyl acrylate, 2-octyl (meth) acrylate, and any combinations or mixtures thereof; more preferably from the group consisting of iso-octyl acrylate, 2-octyl (meth)acrylate, 2-ethylhexyl (meth)acrylate and 2-propylheptyl (meth)acrylate, and any combinations or mixtures thereof; even more preferably from the group consisting of 2-ethylhexyl acrylate, 2-octyl acrylate and 2-propylheptyl acrylate, and any combinations or mixtures thereof.

According to an alternative aspect of the multilayer pressure sensitive adhesive assembly of the present disclosure, the second pressure sensitive adhesive layer and/or the second polymer layer has a (co)polymeric composition identical or similar to the composition described above for the curable liquid precursor of the first pressure sensitive adhesive polymer layer.

According to another alternative aspect, the linear or branched alkyl (meth)acrylate ester for use herein is selected to comprise 2-octyl(meth)acrylate. Polymer base material derived from 2-octyl (meth)acrylate provides comparable adhesive properties when compared with other isomers of octyl (meth)acrylate, such as n-octyl and isooctyl. Further, the pressure sensitive adhesive compositions have lower inherent and solution viscosities when compared to adhesive compositions derived from other octyl isomers, such as isooctyl acrylate, at the same concentrations, and under the same polymerization conditions.

The 2-octyl (meth)acrylate may be prepared by conventional techniques from 2-octanol and (meth)acryloyl derivates such as esters, acids and acyl halides. The 2-octanol may be prepared by treatment of ricinoleic acid, derived from castor oil, (or ester or acyl halide thereof) with sodium hydroxide, followed by distillation from the co-product sebacic acid.

It is however preferred that at least a part, preferably at least 25 wt %, more preferably at least 40 wt %, even more preferably at least 50 wt %, most preferably 100 wt % of the structure of the 2-octyl(meth)acrylate monomer for use herein is preferably completely (i.e. 100 wt.-%) derived from biological material, more preferably from a plant material. This may advantageously be used to provide adhesive films/tapes which are at least partly derived from "green" sources, which is ecologically more sustainable and also reduces the dependency on mineral oil and the price development.

In the context of the present disclosure, the term "derived from biological material" is meant to express that from a certain chemical ingredient, at least a part, preferably at least 50 wt % of its chemical structure comes from biological materials, of its structure. This definition is in principle the same as for bio-diesel fuel, in which usually only the fatty acid part originates from biological sources whereas the methanol may also be derived from fossil material like coal or mineral oil.

(Meth)acrylic-based polymeric materials included in known pressure-sensitive adhesives are often prepared from one or more non-polar acrylate monomers with a relatively low glass transition temperature (Tg) (i.e., the Tg of a monomer is measured as a homopolymer prepared from the monomer) plus various optional monomers such as one or more polar monomers. The polar monomers are often selected to have an acidic group, a hydroxyl group, or a nitrogen-containing group.

Some widely used non-polar acrylate monomers in conventional (meth)acrylic-based elastomeric materials are alkyl (meth)acrylates such as 2-ethylhexyl acrylate (2-EHA) and isooctyl acrylate (IOA).

According to a particular aspect of the pressure sensitive adhesive assemblies of the present disclosure, the second polymer layer and/or the second pressure sensitive adhesive polymer layer comprises a polymer base material further comprising a polar comonomer, preferably a polar acrylate, more preferably selected from the group consisting of acrylic acid, methacrylic acid, itaconic acid, hydroxyalkyl acrylates, acrylamides and substituted acrylamides, acrylamines and substituted acrylamines and any combinations or mixtures thereof. Other useful polar comonomers include, but are not limited to, N-substituted acrylamides, acrylonitrile, methacrylonitrile, hydroxyalkyl acrylates, cyanoethyl acrylate, maleic anhydride, N-vinyl-2-pyrrolidone, N-vinylcaprolactam and any combinations or mixtures thereof.

According to a typical aspect of the present disclosure, the second polymer layer and/or the second pressure sensitive adhesive polymer layer for use in the pressure sensitive adhesive assembly comprises a pressure sensitive adhesive composition comprising a reaction product of a polymerizable material comprising:
  (a) a linear or branched alkyl (meth)acrylate ester as main monomer, wherein the main monomer is preferably selected from the group consisting of iso-octyl (meth)acrylate, 2-ethylhexyl (meth)acrylate, 2-propylheptyl (meth)acrylate, butyl acrylate; and optionally
  (b) a second monomer having an ethylenically unsaturated group, preferably a reinforcing monoethylenically-unsaturated monomers which is copolymerizable with the acrylate main monomer.

In some exemplary aspects, the polymerizable material used for producing the second polymer layer and/or the second pressure sensitive adhesive polymer layer of the pressure sensitive adhesive assembly comprises (at least one) second monomer having an ethylenically unsaturated group. Any suitable second monomer having an ethylenically unsaturated group may be used to prepare the polymerizable material used for producing the second polymer layer and/or the second pressure sensitive adhesive polymer layer of the PSA assembly. Suitable second monomer having an ethylenically unsaturated group for use herein will be easily identified by those skilled in the art in the light of the present description.

Exemplary second monomers having an ethylenically unsaturated group for use herein include those selected from the group consisting of polar and non-polar alkyl (meth)acrylate esters, polar monomers, non-polar vinyl monomers, and any combinations or mixtures thereof.

According to a typical aspect, the second monomer having an ethylenically unsaturated group comprises an alkyl (meth)acrylate ester, preferably having an alkyl group comprising from 1 to 32, from 1 to 20, or even from 1 to 15 carbon atoms.

In a more typical aspect, the polymerizable material further comprises a second non-polar monomer having an ethylenically unsaturated group. Any non-polar monomer with an ethylenically unsaturated group can be used as the second monomer to prepare the polymerizable material used for producing the second polymer layer and/or the second pressure sensitive adhesive polymer layer of the PSA assembly. Suitable non-polar monomers having an ethylenically unsaturated group for use herein will be easily identified by those skilled in the art in the light of the present description.

Suitable second non-polar monomers having an ethylenically unsaturated group include, but are not limited to, non-polar alkyl (meth)acrylate esters. In particular, the second monomer comprises a non-polar alkyl (meth)acrylate ester having an alkyl group comprising from 1 to 32, from 1 to 20, from 1 to 15, or even from 1 to 13 carbon atoms.

Particular non-polar alkyl (meth)acrylate esters with an alkyl group having from 1 to 30 carbon atoms for use herein include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, iso-pentyl (meth)acrylate (i.e., iso-amyl (meth)acrylate), 3-pentyl (meth)acrylate, 2-methyl-1-butyl (meth)acrylate, 3-methyl-1-butyl (meth)acrylate, stearyl (meth)acrylate, phenyl (meth)acrylate, n-hexyl (meth)acrylate, iso-hexyl (meth)acrylate, cyclohexyl (meth)acrylate, 2-methyl-1-pentyl (meth)acrylate, 3-methyl-1-pentyl (meth)acrylate, 4-methyl-2-pentyl (meth)acrylate, 2-ethyl-1-butyl (meth)acrylate, 2-methy-1-hexyl (meth)acrylate, 3,5,5-trimethyl-1-hexyl (meth)acrylate, cyclohexyl (meth)acrylate, 3-heptyl (meth)acrylate, benzyl (meth)acrylate, n-octyl (meth)acrylate, iso-octyl (meth)acrylate, 2-octyl (meth)acrylate, 2-ethyl-1-hexyl (meth)acrylate, n-decyl (meth)acrylate, iso-decyl (meth)acrylate, isobornyl (meth)acrylate, 2-propylheptyl (meth)acrylate, isononyl (meth)acrylate, isophoryl (meth)acrylate, n-dodecyl (meth)acrylate (i.e., lauryl (meth)acrylate), n-tridecyl (meth)acrylate, iso-tridecyl (meth)acrylate, 3,7-dimethyl-octyl (meth)acrylate, and any combinations or mixtures thereof.

Other suitable alkyl (meth)acrylate esters for use herein include those with an alkyl group having at least 14 carbon atoms but that are linear or that have a single branching point. Examples include, but are not limited to, 1-octadecyl (meth)acrylate, 17-methyl-1-heptadecyl (meth)acrylate, and 1-tetradecyl (meth)acrylate.

Still other suitable non-polar (meth)acrylate esters for use herein are aryl (meth)acrylates such as, for example, phenyl (meth)acrylate or benzyl (meth)acrylate; alkenyl (meth)acrylates such as, for example, 3,7-dimethyl-6-octenyl-1 (meth)acrylate and allyl (meth)acrylate; and aryl substituted alkyl (meth)acrylates or aryloxy substituted alkyl (meth)acrylates such as, for example, 2-biphenylhexyl (meth)acrylate, benzyl (meth)acrylate, and 2-phenoxy ethyl (meth)acrylate.

In some typical aspects, it might be advantageous for the second non-polar monomer for use in the PSA assembly to have a relatively high Tg when formed into a homopolymer (i.e., a polymer prepared using a single polymerizable material), as these monomers have the ability to modulate the Tg of the polymerizable material so as to provide enhanced adhesive strength. When formed into a homopolymer, these monomers typically have a glass transition temperature (Tg) of at least 20° C., or at least 25° C., or at least 30° C., or at least 40° C., or even at least 50° C. However, the disclosure is not that limited, as a second non-polar monomer for use in the multilayer PSA assembly may also have a relatively low Tg when formed into a homopolymer, i.e. a Tg of below 20° C.

According to a particular aspect, the second non-polar monomer is for example selected from the group consisting of methyl (meth)acrylate, tert-butyl (meth)acrylate, ethyl (meth)acrylate, n-propyl (meth)acrylate, isopropyl (meth)acrylate, iso-butyl (meth)acrylate, stearyl (meth)acrylate, phenyl (meth)acrylate, cyclohexyl (meth)acrylate, isobornyl (meth)acrylate, benzyl (meth)acrylate, isophoryl (meth)acrylate, and any combinations or mixtures thereof.

In a preferred aspect, the second non-polar monomer for use herein is selected from the group consisting of isobornyl (meth)acrylate, cyclohexyl (meth)acrylate, isophoryl (meth) acrylate, cyclohexyl (meth)acrylate, and any combinations or mixtures thereof. According to a particularly preferred aspect, the second monomer is selected to comprise isobornyl (meth)acrylate.

Further second monomers having an ethylenically unsaturated group for use herein may include a monomer with an acidic group and a single ethylenically unsaturated group (i.e., an acidic monomer). These monomers are typically polar or strongly polar. Polarity (i. e., hydrogen-bonding ability) is frequently described by the use of terms such as 'strongly', 'moderately', and 'poorly'. References describing these and other solubility terms include 'Solvents', Paint Testing Manual, 3rd ed., G. G. Seward, Ed., American Society for Testing and Materials, Philadelphia, Pa., and 'A Three-Dimensional Approach to Solubility', Journal of Paint Technology, Vol. 38, No. 496, pp. 269-280. The ethylenically unsaturated group can be a (meth)acryloyl group or a vinyl group (i.e., $CH_2=CH_2$— group) that is not a (meth) acryloyl group. Exemplary acidic monomers can have a carboxylic acid group, sulfonic acid group, phosphonic acid group, or salts thereof. Due to their availability, acidic monomers with carboxylic acid groups or salts thereof are often selected. If stronger acidic groups are desired, monomers with phosphonic acid, sulfonic acid groups, or salts thereof can be used. Examples of acidic monomers include, but are not limited to, (meth)acrylic acid, itaconic acid, fumaric acid, crotonic acid, citraconic acid, maleic acid, oleic acid, beta-carboxyethyl (meth)acrylate, 2-sulfoethyl methacrylate, styrene sulfonic acid, 2-acrylamido-2-methyl-propanesulfonic acid, vinylphosphonic acid, or mixtures thereof. Any suitable salt of an acidic group can be used. In many embodiments, the cation of the salt is an ion of an alkaline metal (e.g., sodium, potassium, or lithium ion), an ion of an alkaline earth (e.g., calcium, magnesium, or strontium ion), an ammonium ion, or an ammonium ion substituted with one or more alkyl or aryl groups.

For differentiation of polarity, some examples will be given. In particular useful representatives of strongly polar monomers are acrylic acid, methacrylic acid, itaconic acid, hydroxyalkyl acrylates, acrylamides and substituted acrylamides while, for example N-vinyl pyrrolidone, N-vinyl caprolactam, acrylonitrile, vinylchloride, diallyl phthalate and N,N-dialkylamino (meth)acrylates are typical examples of moderately polar monomers. Further examples for polar monomers include cyano acrylate, fumaric acid, crotonic acid, citronic acid, maleic acid, β-carboxyethyl acrylate or sulfoethyl methacrylate. The alkyl (meth)acrylate monomers enumerated above are typical examples of relatively poorly polar monomers. These examples are given for illustrative reasons only and are not to be understood as limiting. Among the group of polar monomers for use as the second monomer, N-vinyl caprolactam is particularly preferred.

For the pressure sensitive assemblies according to the present disclosure, the content of strongly polar acrylates is typically limited in order to provide good adhesion to LSE (Low Surface Energy) surfaces. Hence, it is advantageous that the polymerizable material for the second polymer layer and/or the second pressure sensitive adhesive polymer layer of the multilayer PSA assembly comprises up to 10 weight percent of the strongly polar acrylate based on a total weight of polymerizable material, from 0.1 to 10 weight percent, from 0.5 to 10 weight percent, from 1.0 to 10 weight percent, from 2.0 to 8.0 weight percent, from 2.5 to 6.0 weight percent, or even from 3.0 to 6.0 weight percent, when the PSA assembly is in particular intended for adhesion to LSE substrates.

Other second monomers having an ethylenically unsaturated group suitable for use herein include those with a single ethylenically unsaturated group and a hydroxyl group. These monomers tend to be polar. The ethylenically unsaturated group can be a (meth)acryloyl group or a vinyl group (i.e., $CH_2=CH_2$— group). Exemplary monomers with a hydroxyl group include, but are not limited to, hydroxyalkyl (meth)acrylates (e.g., 2-hydroxyethyl acrylate or 3-hydroxypropyl acrylate), hydroxyalkyl (meth)acrylamides (e.g., 2-hydroxyethyl acrylamide or 3-hydroxypropyl acrylamide), and ethoxylated hydroxyethyl methacrylate (e.g., monomers commercially available from Sartomer under the trade designation CD570, CD571, CD572).

Still other suitable second monomers having an ethylenically unsaturated group are those with a single ethylenically unsaturated group and a nitrogen-containing group or a salt thereof. Most of these monomers tend to be polar. The ethylenically unsaturated group can be a (meth)acryloyl group or a vinyl group (i.e., $CH_2=CH_2$— group). Examples of the nitrogen-containing groups include, but at not limited to, secondary amido groups and tertiary amido groups. Exemplary polar monomers with secondary amido groups include, but are not limited to, N-alkyl (meth)acrylamides such as N-methyl acrylamide, N-ethyl acrylamide, N-isopropyl acrylamide, tert-octyl acrylamide, or N-octyl acrylamide. Exemplary polar monomers with a tertiary amido group include, but are not limited to, N-vinyl caprolactam, N-vinyl-2-pyrrolidone, acryloyl morpholine, and N,N-dialkyl acrylamides such as N,N-dimethyl acrylamide, N,N-diethyl acrylamide, N,N-dipropyl acrylamide, N,N-dibutyl acrylamide, and any combinations or mixtures thereof.

Still other suitable polar second monomers having an ethylenically unsaturated group for use herein include those with a single ethylenically unsaturated group and an ether group (i.e., a group containing at least one alkylene-oxy-alkylene group of formula —R—O—R— where each R is an alkylene having 1 to 4 carbon atoms). These monomers tend to be polar. Exemplary monomers include, but are not limited to, alkoxylated alkyl (meth)acrylates such as ethoxy-ethoxyethyl acrylate, 2-methoxyethyl acrylate, and 2-ethoxyethyl acrylate; and a poly(alkylene oxide) acrylates such as poly(ethylene oxide) acrylates, and poly(propylene oxide) acrylates. The poly(alkylene oxide) acrylates are often referred to as poly(alkylene glycol) acrylates. These monomers can have any suitable end group such as a hydroxyl group or an alkoxy group. For example, when the end group is a methoxy group, the monomer can be referred to as methoxy poly(ethylene glycol) acrylate.

The various polar monomers may typically be added to increase adhesion of the second polymer layer and/or the second pressure sensitive adhesive polymer layer of the PSA assembly to an adjacent layer such as a substrate or a backing layer, to enhance the cohesive strength of the polymerizable material, or both. Any of the polar monomers or salt thereof can be present in any suitable amounts. In some exemplary aspects, the polar monomers are present in amounts up to 15 weight percent based on a total weight of the polymerizable material used to produce the particular pressure-sensitive adhesive layer of the pressure sensitive adhesive assembly. Accordingly, in some exemplary aspects, the polar monomer, preferably a polar acrylate monomer, can be present in an amount in a range of from 0.1 to 15 weight percent, from 0.5 to 15 weight percent, from 1.0 to 10 weight percent, from 2.0 to 8.0 weight percent, from 2.5 to 6.0 weight percent, or even from 3.0 to 6.0 weight percent of a first polar monomer. In some other exemplary aspects, this amount is typically up to 10 weight percent or up to 5 weight percent. For example, the polar monomer can be present in an amount in a range of 0 to 15 weight percent, 0.5 to 15 weight percent, 1 to 15 weight percent, 0 to 10 weight percent, 0.5 to 10 weight percent, 1 to 10 weight percent, 0 to 5 weight percent, 0.5 to 5 weight percent, or 1 to 5 weight percent based on a total weight of the polymerizable material used to produce the second polymer layer and/or the second pressure sensitive adhesive polymer layer of the pressure sensitive adhesive assembly.

In some aspects, the second monomer having an ethylenically unsaturated group for use herein is for example selected from the group consisting of methyl methacrylate, tert-butyl (meth)acrylate, ethyl (meth)acrylate, n-propyl (meth)acrylate, isopropyl (meth)acrylate, iso-butyl (meth)acrylate, stearyl (meth)acrylate, phenyl (meth)acrylate, cyclohexyl (meth)acrylate, isobornyl (meth)acrylate, benzyl (meth)acrylate, isophoryl (meth)acrylate, N-vinyl caprolactam, and any combinations or mixtures thereof.

More typically, the second monomer having an ethylenically unsaturated group for use herein is for example selected from the group consisting of isobornyl (meth)acrylate, cyclohexyl (meth)acrylate, isophoryl (meth)acrylate, cyclohexyl (meth)acrylate, N-vinyl caprolactam, and any combinations or mixtures thereof. Even more typically, the second monomer is selected from the group of isobornyl (meth)acrylate and N-vinyl caprolactam.

In one particularly preferred aspect, the second monomer having an ethylenically unsaturated group for use herein is selected to be isobornyl (meth)acrylate, preferably isobornyl acrylate.

In some exemplary aspects, the polymerizable material used for producing the second polymer layer and/or the second pressure sensitive adhesive polymer layer of the PSA assembly, may comprise (at least one) further co-monomer. Any further co-monomer can be used to prepare the polymerizable material used for producing the second polymer layer and/or the second pressure sensitive adhesive polymer layer. Suitable further co-monomer for use herein will be easily identified by those skilled in the art, in the light of the present description.

Exemplary further co-monomers for use herein include those described above with respect to the second monomer having an ethylenically unsaturated group. In a typical aspect, further co-monomers for use herein include those selected from the group consisting of non-polar alkyl (meth)acrylate esters, polar monomers, non-polar vinyl monomers, and any combinations or mixtures thereof. In another typical aspect, further co-monomers for use herein include those selected from the group consisting of non-polar alkyl (meth)acrylate esters, as described hereinabove.

In an advantageous aspect of the PSA assembly, the polymerizable material comprises a further co-monomer selected from the group of polar monomers, which preferably comprise an acidic group, a hydroxyl group, or a nitrogen-containing group, and wherein the acidic group is preferably a carboxyl group or a salt thereof.

In still another advantageous aspect, the further co-monomer comprises a polar monomer, preferably a polar acrylate, more preferably selected from the group consisting of acrylic acid, methacrylic acid, itaconic acid, hydroxyalkyl acrylates, acrylamides and substituted acrylamides, acrylamines and substituted acrylamines, and any combinations or mixtures thereof. In a particularly advantageous aspect, the further co-monomer comprises acrylic acid.

In some aspects of the PSA assembly, the polymerizable material used to produce the second polymer layer and/or the second pressure sensitive adhesive polymer layer comprises from 50 to 99.5 weight percent, or from 60 to 90 weight percent of 2-propylheptyl acrylate as a first monomer and from 0.5 to 50 weight percent, from 1.0 to 50 weight percent, from 3.0 to 40 weight percent, from 5.0 to 35 weight percent, or even from 10 to 30 weight percent, of the second monomer having an ethylenically unsaturated group, based on the total weight of polymerizable material.

In some other aspects of the PSA assembly, the polymerizable material comprises at least 50 weight percent of a linear or branched alkyl (meth)acrylate ester as first/main monomer and up to 15 weight percent, or up to 10 weight percent of a polar monomer, preferably a polar acrylate, based on the total weight of polymerizable material.

In some other aspects of the PSA assembly, the polymerizable material comprises at least 0.1 weight percent, at least 0.5 weight percent, at least 1 weight percent, or at least 2 weight percent, or even at least 3 weight percent, of a polar monomer, preferably a polar acrylate, based on the total weight of polymerizable material.

According to an advantageous aspect of the pressure sensitive assembly of the present disclosure, the polymerizable material used to produce the second polymer layer and/or the second pressure sensitive adhesive polymer layer, comprises:

a) from 50 to 99.5 weight percent, or from 60 to 90 weight percent, of a linear or branched alkyl (meth)acrylate ester as first/main monomer, wherein the main monomer is preferably selected from the group consisting of iso-octyl (meth)acrylate, 2-ethylhexyl (meth)acrylate, 2-propylheptyl (meth)acrylate, butyl acrylate; optionally b) from 1.0 to 50 weight percent, from 3.0 to 40 weight percent, from 5.0 to 35 weight percent, or even from 10 to 30 weight percent, of the second monomer having an ethylenically unsaturated group, preferably a second non-polar monomer having an ethylenically unsaturated group; optionally c) from 0.1 to 15 weight percent, from 0.5 to 15 weight percent, from 1.0 to 10 weight percent, from 2.0 to 8.0 weight percent, from 2.5 to 6.0 weight percent, or even from 3.0 to 6.0 weight percent of a polar monomer, preferably a polar acrylate; and optionally d) a tackifying resin,
wherein the weight percentages are based on the total weight of polymerizable material.

According to still another advantageous aspect of the pressure sensitive assembly, the polymerizable material used to produce the second polymer layer and/or the second pressure sensitive adhesive polymer layer, comprises:

a) of a linear or branched alkyl (meth)acrylate ester as first/main monomer, wherein the main monomer is preferably selected from the group consisting of iso-octyl (meth)acrylate, 2-ethylhexyl (meth)acrylate, 2-propylheptyl (meth)acrylate, butyl acrylate; optionally b) from 1.0 to 50 weight percent, from 3.0 to 40 weight percent, from 5.0 to 35 weight percent, or even from 10 to 30 weight percent, of the second monomer having an ethylenically unsaturated group, preferably a second non-polar monomer having an ethylenically unsaturated group; optionally c) from 0.1 to 15 weight percent, from 0.5 to 15 weight percent, from 1.0 to 10 weight percent, from 2.0 to 8.0 weight percent, from 2.5 to 6.0 weight percent, or even from 3.0 to 6.0 weight percent of a first polar monomer, preferably a polar acrylate; optionally d) a second polar monomer, preferably a polar non-acrylate monomer; and optionally e) a tackifying resin;

wherein the weight percentages are based on the total weight of polymerizable material.

In some executions, one or more tackifiers, one or more plasticizers, or a mixture thereof can be combined with the polymerizable material used to produce the second polymer layer and/or the second pressure sensitive adhesive polymer layer. Tackifiers (i.e., tackifying agents or tackifying resins) and plasticizers (i.e., plasticizing agents) are often added to modulate the Tg, modulate the storage modulus, and to alter the tackiness of the pressure-sensitive adhesive.

Any tackifiers that are included in the particular polymeric compositions are typically selected to be miscible with the polymerizable material. Any tackifier typically included in conventional pressure-sensitive adhesive compositions may be used. Either solid or liquid tackifiers can be added. Solid tackifiers generally have a number average molecular weight (Mw) of 10,000 grams per mole or less and a softening point above about 70° C. Liquid tackifiers are viscous materials that have a softening point of about 0° C. to about 70° C.

Suitable tackifying resins include rosin resins such as rosin acids and their derivatives (e.g., rosin esters); terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the particular pressure-sensitive adhesive composition. Combinations of various tackifiers can be used if desired.

Tackifiers that are rosin esters are the reaction products of various rosin acids and alcohols. These include, but are not limited to, methyl esters of rosin acids, triethylene glycol esters of rosin acids, glycerol esters of rosin acids, and pentaertythritol esters of rosin acids. These rosin esters can be hydrogenated partially or fully to improve stability and reduce their color contribution to the pressure-sensitive adhesive composition. The rosin resin tackifiers are commercially available, for example, from Eastman Chemical Company under the trade designations PERMALYN, STAYBELITE, and FORAL as well as from Newport Industries under the trade designations NUROZ and NUTAC. A fully hydrogenated rosin resin is commercially available, for example, from Eastman Chemical Company under the trade designation FORAL AX-E. A partially hydrogenated rosin resin is commercially available, for example, from Eastman Chemical Company under the trade designation STAYBE-LITE-E.

Tackifiers that are hydrocarbon resins can be prepared from various petroleum-based feed stocks. There feedstocks can be aliphatic hydrocarbons (mainly C5 monomers with some other monomers present such as a mixture of trans-1,3-pentadiene, cis-1,3-pentadiene, 2-methyl-2-butene, dicyclopentadiene, cyclopentadiene, and cyclopentene), aromatic hydrocarbons (mainly C9 monomers with some other monomers present such as a mixture of vinyl toluenes, dicyclopentadiene, indene, methylstyrene, styrene, and methylindenes), or mixtures thereof. Tackifiers derived from C5 monomers are referred to as C5-based hydrocarbon resins while those derived from C9 monomers are referred to as C9-based hydrocarbon resins. Some tackifiers are derived from a mixture of C5 and C9 monomers or are a blend of C5-based hydrocarbon tackifiers and C9-based hydrocarbon tackifiers. These tackifiers can be referred to as C5/C9-based hydrocarbon tackifiers. Any of these resins can be partially or fully hydrogenated to improve their color, their thermal stability or their process compatibility.

The C5-based hydrocarbon resins are commercially available from Eastman Chemical Company under the trade designations PICCOTAC and EASTOTAC, from Cray Valley under the trade designation WINGTACK, from Neville Chemical Company under the trade designation NEVTAC LX, and from Kolon Industries, Inc. under the trade designation HIKOREZ. The C5-based hydrocarbon resins are commercially available from Eastman Chemical with various degrees of hydrogenation under the trade designation EASTOTACK.

The C9-based hydrocarbon resins are commercially available from Eastman Chemical Company under the trade designation PICCO, KRISTLEX, PLASTOLYN, and PICCOTAC, and ENDEX, from Cray Valley under the trade designations NORSOLENE, from RueTgers N.V. under the trade designation NOVAREZ, and from Kolon Industries, Inc. under the trade designation HIKOTAC. These resins can be partially or fully hydrogenated. Prior to hydrogenation, the C9-based hydrocarbon resins are often about 40 percent aromatic as measured by proton Nuclear Magnetic Resonance. Hydrogenated C9-based hydrocarbon resins are commercially available, for example, from Eastman Chemical under the trade designations REGALITE and REGALREZ that are 50 to 100 percent (e.g., 50 percent, 70 percent, 90 percent, and 100 percent) hydrogenated. The partially hydrogenated resins typically have some aromatic rings.

Various C5/C9-based hydrocarbon tackifiers are commercially available from Arakawa under the trade designation ARKON, from Zeon under the trade designation QUINTONE, from Exxon Mobile Chemical under the trade designation ESCOREZ, and from Newport Industries under the trade designations NURES and H-REZ (Newport Industries).

Any of the tackifiers may be used in amounts of up to 100 parts relative to 100 parts of the polymerizable material. It is however preferred to use lower amounts of tackifiers. For example, the tackifiers can be used in amounts up to 50 parts, up to 45 parts, up to 40 parts, up to 35 parts, or up to 30 parts. The amount of tackifier can be for example, in the range of 3 to 50 parts, in the range of 3.5 to 45 parts, in the range of 4 to 40 parts, in the range of 4.5 to 35 parts, or in the range of 5 to 30 parts based on 100 parts of the polymerizable material. In some other aspects, the tackifier may be used in an amount from 3 to 100 parts, or from 3 to 80 parts based on 100 parts of the polymerizable material.

In an advantageous aspect of the pressure sensitive adhesive assembly of the present disclosure, the tackifying resin is selected from the group consisting of C5-based hydrocarbon resins, C9-based hydrocarbon resins, C5/C9-based hydrocarbon resins, and any combinations or mixtures thereof. In another advantageous aspect, the tackifying resin is selected from the group consisting of hydrogenated terpene resins, hydrogenated rosin resins, hydrogenated C5-based hydrocarbon resins, hydrogenated C9-based hydrocarbon resins, hydrogenated C5/C9-based hydrocarbon resins, and any combinations or mixtures thereof.

Some polymeric compositions useful for preparing the second polymer layer and/or the second pressure sensitive adhesive polymer layer of the pressure sensitive adhesive assembly according to this disclosure may include one or more plasticizers. The plasticizer is typically selected to be compatible with (i.e., miscible with) the other components in the composition such as the polymerizable material and any optional tackifier. Suitable plasticizers include, but are not limited to, various polyalkylene oxides (e.g., polyethylene oxides or propylene oxides), adipic acid esters, formic acid esters, phosphoric acid esters, benzoic acid esters, phthalic acid esters, and sulfonamides, or naphthenic oils.

According to one particular aspect of the multilayer pressure sensitive adhesive assembly according to the present disclosure, the polymerizable material useful for preparing the second polymer layer and/or the second pressure sensitive adhesive polymer layer may further comprise a crosslinker (also referred to as crosslinking agent), preferably in an amount of up to 5 weight percent, based on the total weight of polymerizable material.

A crosslinker can also be used, in the context of the present disclosure, as a second monomer having an ethylenically unsaturated group. The crosslinker often increases the cohesive strength and the tensile strength of the polymerizable material. The crosslinker can have at least two functional groups which are capable of polymerizing with the first monomer or another monomer. That is, the crosslinker can have at least two ethylenically unsaturated groups. Suitable crosslinkers often have multiple (meth) acryloyl groups. Alternatively, the crosslinker can have at least two groups that are capable of reacting with various functional groups (i.e., functional groups that are not ethylenically unsaturated groups) on another monomer. For example, the crosslinker can have multiple groups that can react with functional groups such as acidic groups on other monomers.

Crosslinkers with multiple (meth)acryloyl groups can be di(meth)acrylates, tri(meth)acrylates, tetra(meth)acrylates, penta(meth)acrylates, and the like. These crosslinkers can be formed, for example, by reacting (meth)acrylic acid with a polyhydric alcohol (i.e., an alcohol having at least two hydroxyl groups). The polyhydric alcohol often has two, three, four, or five hydroxyl groups. Mixtures of crosslinkers may also be used.

In many aspects, the crosslinkers contain at least two (meth)acryloyl groups. Exemplary crosslinkers with two acryloyl groups include, but are not limited to, 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, polybutadiene di(meth)acrylate, propoxylated glycerin tri(meth)acrylate, and neopentylglycol hydroxypivalate diacrylate modified caprolactone.

Exemplary crosslinkers with three or four (meth)acryloyl groups include, but are not limited to, trimethylolpropane triacrylate (e.g., commercially available under the trade designation TMPTA-N from Cytec Industries, Inc., Smyrna, Ga. and under the trade designation SR-351 from Sartomer, Exton, Pa.), pentaerythritol triacrylate (e.g., commercially available under the trade designation SR-444 from Sartomer), tris(2-hydroxyethylisocyanurate) triacrylate (e.g., commercially available under the trade designation SR-368 from Sartomer), a mixture of pentaerythritol triacrylate and pentaerythritol tetraacrylate (e.g., commercially available from Cytec Industries, Inc., under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), di-trimethylolpropane tetraacrylate (e.g., commercially available under the trade designation SR-355 from Sartomer), and ethoxylated pentaerythritol tetraacrylate (e.g., commercially available under the trade designation SR-494 from Sartomer). An exemplary crosslinker with five (meth)acryloyl groups includes, but is not limited to, dipentaerythritol pentaacrylate (e.g., commercially available under the trade designation SR-399 from Sartomer).

In some aspects, the crosslinkers are polymeric material that contains at least two (meth)acryloyl groups. For example, the crosslinkers can be poly(alkylene oxides) with at least two acryloyl groups (e.g., polyethylene glycol diacrylates commercially available from Sartomer such as SR210, SR252, and SR603) or poly(urethanes) with at least two (meth)acryloyl groups (e.g., polyurethane diacrylates such as CN9018 from Sartomer). As the higher molecular weight of the crosslinkers increases, the resulting acrylic copolymer tends to have a higher elongation before breaking. Polymeric crosslinkers tend to be used in greater weight percent amounts compared to their non-polymeric counterparts.

Other types of crosslinkers can be used rather than those having at least two (meth)acryloyl groups. The crosslinker can have multiple groups that react with functional groups such as acidic groups on other second monomers. For example, monomers with multiple aziridinyl groups can be used that are reactive with carboxyl groups. For example, the crosslinkers can be a bis-amide crosslinker as described in U.S. Pat. No. 6,777,079 (Zhou et al.).

In other methods of crosslinking, photocrosslinkers (e.g., UV photocrosslinkers) are added. These photocrosslinkers can be copolymerizable with the various monomers used to form the elastomeric material (e.g., copolymerizable benzophenones) or can be added after polymerization. Suitable photocrosslinkers added after polymerization include, for example, multifunctional benzophenones, triazines (such as XL-330, which is 2,4,-bis(trichloromethyl)-6-(4-methoxyphenyl)-triazine from 3M Company, Saint Paul, Minn.), acetophenones, and the like.

In still other methods of crosslinking, thermal crosslinkers may be used, optionally in combination with suitable accelerants and retardants. Suitable thermal crosslinkers for use herein include, but are not limited to, isocyanates, more particularly trimerized isocyanates and/or sterically hindered isocyanates that are free of blocking agents, or else epoxide compounds such as epoxide-amine crosslinker systems. Advantageous crosslinker systems and methods are described e.g. in the descriptions of DE202009013255 U1, EP 2 305 389 A, EP 2 414 143 A, EP 2 192 148 A, EP 2 186 869, EP 0 752 435 A, EP 1 802 722 A, EP 1 791 921 A, EP 1 791 922 A, EP 1 978 069 A, and DE 10 2008 059 050 A, the relevant contents of which are herewith incorporated by reference. Suitable accelerant and retardant systems for use herein are described e.g. in the description of US-A1-2011/0281964, the relevant content of which is herewith explicitly incorporated by reference. Suitable thermal crosslinkers for use herein include epoxycyclohexyl derivatives, in particular epoxycyclohexyl carboxylate derivatives, with particular preference to (3,4-epoxycyclohexane)methyl 3,4-epoxycyclohexylcarboxylate, commercially available from Cytec Industries Inc. under tradename UVACURE 1500.

If present, a crosslinker can be used in any suitable amount. In many aspects, the crosslinker is present in an amount of up 5 parts by weight based on a total weight of polymerizable material. In some aspects, the crosslinker is present in an amount up to 4 weight percent, up to 3 weight percent, up to 2 weight percent, or up to 1 weight percent. The crosslinker can be present, for example, in amounts greater than 0.01 weight percent, greater than 0.03 weight percent, greater than 0.05 weight percent, greater than 0.07 weight percent, or greater than 1 weight percent. In some aspects, the crosslinker is present in an amount in a range of 0 to 5 weight percent, 0.01 to 5 weight percent, 0.05 to 5 weight percent, 0 to 3 weight percent, 0.01 to 3 weight percent, 0.05 to 3 weight percent, 0 to 1 weight percent, 0.01 to 1 weight percent, or 0.05 to 1 weight percent. As another example, any of the polymerizable materials can include up to 5 weight percent crosslinker such as 0.01 to 5 weight percent, 0.05 to 5 weight percent, 0.07 to 5 weight percent, or 1 to 5 weight percent.

Aside from thermal, moisture or photosensitive crosslinking agents, crosslinking may also be achieved using high energy electromagnetic radiation such as gamma or e-beam radiation.

An initiator for free radical polymerization is typically added to the various monomers used to form the polymerizable material useful to produce the second polymer layer and/or the second pressure sensitive adhesive polymer layer. The polymerization initiator can be a thermal initiator, a photoinitiator, or both. Any suitable thermal initiator or photoinitiator known for free radical polymerization reactions can be used. The initiator is typically present in an amount in the range of 0.01 to 5 weight percent, in the range of 0.01 to 2 weight percent, in the range of 0.01 to 1 weight percent, or in the range of 0.01 to 0.5 weight percent based on a total weight of polymerizable material.

In some executions, a thermal initiator is used. Thermal initiators can be water-soluble or water-insoluble (i.e., oil-soluble) depending on the particular polymerization method used. Suitable water-soluble initiators include, but are not limited to, persulfates such as potassium persulfate, ammonium persulfate, sodium persulfate, and mixtures thereof; an oxidation-reduction initiator such as the reaction product of a persulfate and a reducing agent such as a metabisulfite (e.g., sodium metabisulfite) or a bisulfate (e.g., sodium bisulfate); or 4,4'-azobis(4-cyanopentanoic acid) and its soluble salts (e.g., sodium, potassium). Suitable oil-soluble initiators include, but are not limited to, various azo compounds such as those commercially available under the trade designation VAZO from E. I. DuPont de Nemours Co. including VAZO 67, which is 2,2'-azobis(2-methylbutane nitrile), VAZO 64, which is 2,2'-azobis(isobutyronitrile), and VAZO 52, which is (2,2'-azobis(2,4-dimethylpentanenitrile); and various peroxides such as benzoyl peroxide, cyclohexane peroxide, lauroyl peroxide, and mixtures thereof.

In many executions, a photoinitiator is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J.) or under the trade designation ESACURE KB-1 from Sartomer (Exton, Pa.)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1, 2-propanedione-2-(O-ethoxycarbonyl)oxime. Other suitable photoinitiators include, for example, 1-hydroxy cyclohexyl phenyl ketone (IRGACURE 184), bis(2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), and 2-hydroxy-2-methyl-1-phenyl propan-1-one (DAROCUR 1173).

The particular polymerizable material used to produce the second polymer layer and/or the second pressure sensitive adhesive polymer layer may optionally further contain chain transfer agents to control the molecular weight of the resultant elastomeric material. Examples of useful chain transfer agents include, but are not limited to, carbon tetrabromide, alcohols, mercaptans such as isooctylthioglycolate, and mixtures thereof. If used, the polymerizable mixture may include up to 0.5 weight of a chain transfer agent based on a total weight of polymerizable material. For example, the polymerizable mixture can contain 0.01 to 0.5 weight percent, 0.05 to 0.5 weight percent, or 0.05 to 0.2 weight percent chain transfer agent.

According to one particular aspect of the pressure sensitive adhesive assembly according to the present disclosure, the particular polymerizable material used to produce the second polymer layer and/or the second pressure sensitive adhesive polymer layer may further include one or more other vinyl monomers such as vinyl esters (e.g., vinyl acetate and vinyl propionate); styrene or derivatives thereof such as alkyl substituted styrene (e.g., α-methyl styrene); vinyl halide; or mixtures thereof. These monomers can be polar or non-polar. If present, these other vinyl monomer can be present in any suitable amount. In some aspects, the vinyl monomers are present in an amount of up 5 parts by weight, based on a total weight of polymerizable material. For example, the vinyl monomer can be used in amounts up to 4 weight percent, up to 3 weight percent, or up to 2 weight percent. In some particular aspects, the vinyl monomer is present in an amount in a range of 0 to 5 weight percent, 0.5 to 5 weight percent, 1 to 5 weight percent, 0 to 3 weight percent, or 1 to 3 weight percent.

The polymerizable material used to form the second polymer layer and/or the second pressure sensitive adhesive polymer layer of the multilayer PSA assembly may include an organic solvent or may be free or essentially free of an organic solvent. As used herein, the term "essentially free" in reference to an organic solvent means that the means that the organic solvent is present in an amount less than 5 weight percent, less than 4 weight percent, less than 3 weight percent, less than 2 weight percent, or less than 1 weight percent based on the weight of the polymerizable material. If an organic solvent is included in the polymerizable material, the amount is often selected to provide the desired viscosity. Examples of suitable organic solvents include, but are not limited to, methanol, tetrahydrofuran, ethanol, isopropanol, heptane, acetone, methyl ethyl ketone, methyl acetate, ethyl acetate, toluene, xylene, ethylene glycol alkyl ether, and any combinations or mixtures thereof.

The particular second polymer and/or second pressure sensitive adhesive polymer compositions of the multilayer PSA assembly may be prepared by a variety of conventional free radical polymerization methods, including solution, bulk (i.e., with little or no solvent), dispersion, emulsion, and suspension processes. The particular method used may be influenced by the use of the final pressure sensitive adhesive composition. The reaction product of the polymerizable materials can be random or block copolymers.

In some methods of preparing the second polymer and/or the second pressure sensitive adhesive polymer composition(s) of the multilayer PSA assembly according to the disclosure, the polymerizable material containing the monomers is partially polymerized so as to increase its viscosity to that corresponding to a syrup-like material. Generally, the main monomers and other optional monomers are mixed with a portion of the free radical polymerization initiator. Depending on the type of initiator added, the mixture is typically exposed to actinic radiation or heat to partially polymerize the monovalent monomers (i.e., monomers with a single ethylenically unsaturated group). Then, the crosslinker and any remaining portion of the initiator may be added to the syrup-like, partially polymerized material. Optional tackifiers and plasticizers may also be combined with the partially polymerized material. The resulting mixture can be more readily applied as a coating composition onto a support (e.g., release liner) or another layer (e.g., polymeric foam layer). The coating layer can then be exposed to actinic radiation if a photoinitiator is present or to heat if a thermal initiator is present. Exposure to actinic radiation or heat typically results in the further reaction of polymerizable material within the coating composition.

To be useful as a pressure sensitive adhesive, the pressure sensitive adhesive material typically has a storage modulus less than 300,000 Pascals at 25° C. The storage modulus of the pressure-sensitive adhesive material usually is no greater than 200,000 Pascals, no greater than 100,000 Pascals, no greater than 50,000 Pascals, or no greater than 25,000 Pascal at 25° C. For example, the storage modulus can be no greater than 10,000 Pascals, no greater than 9,000 Pascals, no greater than 8,000 Pascals, or no greater than 7,500 Pascals at 25° C. A lower storage modulus is often desirable for high performance pressure-sensitive adhesives.

In a particular aspect of the pressure-sensitive adhesive assembly according to the present disclosure, the second polymer layer and/or the second pressure sensitive adhesive polymer layer of the multilayer PSA assembly comprise a filler material.

Any filler material commonly known to those skilled in the art may be used in the context of the present disclosure. Typical examples of filler material that can be used herein include, but are not limited to, those selected from the group consisting of expanded perlite, microspheres, expendable microspheres, ceramic spheres, zeolites, clay fillers, glass beads, hollow inorganic beads, silica type fillers, hydrophobic silica type fillers, hydrophilic silica type fillers, fumed silica, fibers, in particular glass fibers, carbon fibers, graphite fibers, silica fibers, ceramic fibers, electrically and/or thermally conducting particles, nanoparticles, in particular silica nanoparticles, and any combinations thereof.

In a particular aspect of the pressure sensitive adhesive assembly according to the disclosure, the second polymer layer and/or the second pressure sensitive adhesive polymer layer comprise a filler material is selected from the group consisting of glass microspheres, hydrophobic silica type fillers, and any combinations or mixtures thereof.

In another particular aspect, the filler material is selected from the group consisting of hollow non-porous particulate filler materials, wherein the surface of the hollow non-porous particulate filler material is provided with a hydrophobic or hydrophilic surface modification, preferably a hydrophobic surface modification.

In a particular aspect of the pressure sensitive adhesive assembly according to the disclosure, the second polymer layer and/or the second pressure sensitive adhesive polymer layer comprise a hollow non-porous particulate filler material, wherein the surface of the hollow non-porous particulate filler material is preferably provided with a hydrophobic surface modification. Such fillers may be advantageously used to e.g. increase the mechanical stability of the pressure sensitive adhesive assembly and may also increase its shear and peel force resistance. From the filler particles set out above, fumed silica particles may be advantageously used in combination with the hollow non-porous particulate filler material as described above.

Preferably, the filler material is selected from the group consisting of glass microspheres, the surface of which is provided with a hydrophobic or hydrophilic surface modification, preferably a hydrophobic surface modification. The hydrophobic surface modification of the hollow non-porous particulate filler material for use herein may be performed by any commonly known method.

Preferably, the hydrophobic surface modification of the hollow non-porous particulate filler material is performed with non-polar groups, preferably alkyl groups through covalent bonds, more preferably through covalent siloxane bonds, between the non-polar groups (preferably, alkyl groups) and the surface of the hollow non-porous particulate filler material.

According to preferred aspect, the surface of the hollow non-porous particulate filler material is rendered hydrophobic by chemically reacting the hollow non-porous particulate filler material with a silane, preferably a silane containing at least one hydrolysable functional group and at least one non-hydrolysable functional group. Preferably, the surface of the hollow non-porous particulate filler material is rendered hydrophobic by chemically reacting said non-porous particulate filler material with an alkyl silane or an alkoxy silane, more preferably an alkoxy silane containing at least one hydrolysable functional group and at least one non-hydrolysable functional group.

More preferably, the alkoxy silane for use herein has the following formula:

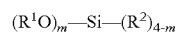

$$(R^1O)_m—Si—(R^2)_{4-m}$$

wherein:

$R^1$ is independently an alkyl group, preferably comprising 1 to 6, more preferably 1 to 4 carbon atoms, even more preferably $R^1$ is independently selected from the group consisting of methyl, ethyl, propyl and butyl, more preferably from the group consisting of methyl and ethyl;

m=1 to 3, preferably m=2 or 3; more preferably m=3;

$R^2$ is independently an hydrophobic (non-hydrolyzable) moiety, preferably selected from the group consisting of saturated, unsaturated, substituted or un-substituted alkyls, ethers, thioethers, esters, amides, amines, carbamates, urethanes, polyolefins, and any combinations thereof, preferably comprising from 1 to 100, more preferably from 1 to 50, even more preferably from 1 to 30 carbon atoms, still more preferably from 1 to 25 carbon atoms; yet more preferably $R^2$ is independently selected from the group consisting of methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and fluorinated derivatives thereof, tridecafluoro-1,2,2,2-tetrahydrooctyl; yet more preferably $R^2$ is independently selected from the group consisting of methyl, n-octyl, hexadecyl and tridecafluroro-1,2,2,2-tetrahydrooctyl.

According to another preferred aspect, the hydrophobic surface modification of the hollow non-porous particulate filler material is performed by applying an hydrophobic coating, wherein the hydrophobic coating is preferably applied by contacting the hollow non-porous particulate filler material with a liquid medium selected from the group of emulsions, suspensions or solutions, and comprising a component preferably selected from the group consisting of alkoxy silanes, hydrocarbon waxes, polyethylene waxes, fluorinated hydrocarbon waxes, silicone, and any combinations or mixtures thereof.

As will be apparent to those skilled in the art in the light of the present disclosure, other additives may optionally be included in the second polymer layer and/or the second pressure sensitive adhesive polymer layer of the pressure sensitive adhesive assembly to achieve any desired properties. Such additives, include pigments, tackifiers, toughening agents, reinforcing agents, fire retardants, antioxidants, and various stabilizers. The additives are added in amounts sufficient to obtain the desired end properties.

According to a typical execution, the pressure sensitive adhesive assembly according to the present disclosure is further provided on at least one of its major surfaces with a release liner. As release liner, any suitable material known to the skilled person can be used, such as e.g. a siliconized paper or siliconized polymeric film material, in particular a siliconized PET-film or a siliconized PE or PE/PP blend film material.

The thickness of the various pressure sensitive adhesive layer(s), polymer layers and other optional layer(s) comprised in the pressure sensitive adhesive assembly may vary in wide ranges depending on the desired execution and associated properties. By way of example, the thickness can be independently chosen for each layer between 25 μm and 6000 μm, between 40 μm and 3000 μm, between 50 μm and 3000 μm, between 75 μm and 2000 μm, or even between 75 μm and 1500 μm.

According to the particular execution, wherein the multilayer pressure sensitive adhesive assembly takes the form of skin/core type multilayer pressure sensitive adhesive assembly, wherein the first pressure sensitive adhesive polymer layer is the skin layer of the multilayer pressure sensitive adhesive assembly and the second polymer layer is the core layer of the multilayer pressure sensitive adhesive assembly, it is preferred that the first pressure sensitive adhesive layer has a lower thickness compared to the second polymer layer. This is particularly advantageous in executions where the second polymer layer is a polymeric foam layer, thereby forming a polymeric foam pressure sensitive adhesive tape. As a way of example, the thickness of the first pressure sensitive adhesive layer may typically be in the range from 20 μm to 250 μm, or even from 40 μm to 200 μm, whereas the thickness of the polymeric foam layer may typically be in the range from 100 μm to 6000 μm, from 400 μm to 3000 μm, or even from 800 μm to 2000 μm. Such multilayer pressure sensitive adhesive assemblies typically exhibit high peel adhesion. Without wishing to be bound by theory, it is believed such high peel adhesion is caused by a stabilizing effect of the relatively thick polymeric foam layer compared to the first PSA layer.

The pressure sensitive adhesive assembly of the present disclosure can be coated/applied upon a variety of substrates to produce adhesive-coated articles. The substrates can be flexible or inflexible and be formed of a polymeric material, glass or ceramic material, metal, or combinations thereof. Suitable polymeric substrates include, but are not limited to, polymeric films such as those prepared from polypropylene, polyethylene, polyvinyl chloride, polyester (polyethylene terephthalate or polyethylene naphthalate), polycarbonate, polymethyl(meth)acrylate (PMMA), cellulose acetate, cellulose triacetate, and ethyl cellulose. Foam backings may be used. Examples of other substrates include, but are not limited to, metal such as stainless steel, metal or metal oxide coated polymeric material, metal or metal oxide coated glass, and the like.

The pressure sensitive adhesive assemblies of the present disclosure may be used in any article conventionally known to use such assemblies such as labels, tapes, signs, covers, marking indices, display components, touch panels, and the like. Flexible backing materials having microreplicated surfaces are also contemplated.

The pressure sensitive adhesive assembly may be coated/applied on a substrate using any conventional coating techniques modified as appropriate to the particular substrate. For example, pressure sensitive adhesive assemblies may be applied/coated to a variety of solid substrates by methods such as roller coating and die coating. These various methods of coating allow the pressure sensitive adhesive assemblies to be placed on the substrate at variable thicknesses thus allowing a wider range of use of the assemblies.

The multilayer pressure sensitive adhesive assembly according to the present disclosure may be particularly useful for forming strong adhesive bonds to low surface energy (LSE) substrates. Included among such materials are polypropylene, polyethylene (e.g., high density polyethylene or HDPE), blends of polypropylene (e.g. PP/EPDM, TPO). Other substrates may also have properties of low surface energy due to a residue, such as an oil residue or a film, such as paint, being on the surface of the substrate.

However, even though the pressure sensitive adhesive assemblies bond well to low surface energy surfaces, the use of these adhesives is not limited to low surface energy substrates. The pressure sensitive adhesives assemblies surprisingly bond well to medium surface energy (MSE) substrates such as, for example, polyamide 6 (PA6), acrylonitrile butadiene styrene (ABS), PC/ABS blends, PC, PVC, PA, PUR, TPE, POM, polystyrene, poly(methyl methacrylate) (PMMA), clear coat surfaces, in particular clear coats for vehicles like a car or coated surfaces for industrial applications and composite materials like fiber reinforced plastics.

Surprisingly still, the pressure sensitive adhesive assemblies according to the present disclosure also provide strong adhesive bond to higher surface energy (HSE) substrates such as, for example, ceramics, glasses, and metals.

Accordingly, the present disclosure is further directed to the use of a pressure sensitive adhesive assembly as above described for the bonding to a low surface energy substrate, a medium surface energy substrate and/or a high surface energy substrate, preferably for the bonding to a low surface energy substrate or a medium surface energy substrate.

The substrate to which the pressure sensitive adhesive assembly may be applied is selected depending on the particular application. For example, the pressure sensitive adhesive assembly, in particular via its first pressure sensitive adhesive layer may be applied to sheeting products (e.g., decorative graphics and reflective products), label stock, and tape backings. Additionally, the pressure sensitive adhesive assembly may be applied directly onto other substrates such as a metal panel (e.g., automotive panel) or a glass window so that yet another substrate or object can be attached to the panel or window. Accordingly, the pressure sensitive adhesive assembly of the present disclosure may find a particular use in the automotive manufacturing industry (e.g. for attachment of exterior trim parts or for weatherstrips), in the construction industry or in the solar panel construction industry.

Accordingly, the present disclosure is further directed to the use of a pressure sensitive adhesive assembly as above described for industrial applications, in particular for construction applications and automotive applications.

The pressure sensitive adhesive assembly may also be provided in the form of a pressure-sensitive adhesive transfer tape in which at least one layer of the pressure sensitive adhesive assembly is disposed on a release liner for application to a permanent substrate at a later time. The pressure sensitive adhesive assembly may also be provided as a single coated or double coated tape in which the pressure sensitive adhesive assembly is disposed on a permanent backing. Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Polymeric foams are commercially available from various suppliers such as 3M Co., Voltek, Sekisui, and others. The polymeric foam layer may be formed as a coextruded sheet with the pressure sensitive adhesive assembly on one or both sides of the polymeric foam layer, or the pressure sensitive adhesive assembly may be laminated to it. When the pressure sensitive adhesive assembly is laminated to the substrate, it may be desirable to treat the surface of the substrate to improve the adhesion. Such treatments are typically selected based on the nature of the materials in the pressure sensitive adhesive assembly and of the substrate and include primers and surface modifications (e.g., corona treatment and surface abrasion).

For a single-sided tape, the pressure sensitive adhesive assembly is applied to one surface of the backing material and a suitable release material is applied to the opposite surface of the backing material. Release materials are known and include materials such as, for example, silicones, polyolefins, polycarbamates, polyacrylics, and the like. For double coated tapes, the pressure sensitive adhesive assembly is applied to one surface of the backing material and a pressure sensitive adhesive assembly is disposed on the opposite surface of the backing material. Double coated tapes are often carried on a release liner.

According to another aspect, the present disclosure is directed to a curable precursor of a multilayer pressure sensitive adhesive assembly comprising at least a first pressure sensitive adhesive polymer layer and a second polymer layer, wherein the curable precursor of a pressure sensitive adhesive assembly comprises a layer of a curable liquid precursor of the first pressure sensitive adhesive polymer layer superimposed to a layer of a curable liquid precursor of the second polymer layer, wherein the curable liquid precursor of the first pressure sensitive adhesive polymer layer comprises:

a) 60 parts by weight or greater of a low Tg (meth)acrylate copolymer component comprising:
  i. $C_1$-$C_{32}$ (meth)acrylic acid ester monomer units;
  ii. optionally, acid functional ethylenically unsaturated monomer units;
  iii. optionally, non-acid functional, ethylenically unsaturated polar monomer units;
  iv. optionally, vinyl monomer units; and
  v. optionally, a multifunctional (meth)acrylate, and b) up to 40 parts by weight of a high Tg acrylate copolymer having a weight average molecular weight (Mw) above 20000 Daltons, and comprising:
  i. high Tg (meth)acrylic acid ester monomer units;
  ii) optionally, acid functional ethylenically unsaturated monomer units;
  iii) optionally, low Tg (meth)acrylic acid ester monomer units;
  iv) optionally, non-acid functional, ethylenically unsaturated polar monomer units;
  v) optionally, vinyl monomer units; and
c) optionally, up to 20 parts by weight of a hydrogenated hydrocarbon tackifier, based on 100 parts by weight of a) and b).

The first pressure sensitive adhesive polymer layer, the second polymer layer, the curable liquid precursor of the first pressure sensitive adhesive polymer layer and the curable liquid precursor of the second polymer layer for use in the curable precursor of a multilayer pressure sensitive adhesive assembly are as described above in the context of the method for manufacturing a multilayer pressure sensitive adhesive assembly.

In a preferred aspect of the curable precursor of a multilayer pressure sensitive adhesive assembly, the low Tg (meth)acrylate copolymer comprises $C_1$-$C_{24}$ (meth)acrylic acid ester monomer units, or even $C_1$-$C_{18}$ (meth)acrylic acid ester monomer units.

According to particular aspect, a (lower) layer of a curable liquid precursor of the second polymer layer is covered by an adjacent (upper) layer of a curable liquid precursor of the first pressure sensitive adhesive polymer layer, respectively, essentially without exposing the (lower) layer of a curable liquid precursor of the second polymer layer.

The current disclosure is described in more details with the following figures.

FIG. 1 is a schematic cross-sectional representation of a coating apparatus to carry out one exemplary embodiment of the method for manufacturing a multilayer pressure sensitive adhesive assembly according to one aspect of the present disclosure.

In FIG. 1, a coating apparatus 1 is shown comprising two coating knives 2, 3 which are offset from a substrate 4 in the form of a (bottom) release liner, thus forming gaps between the respective bottom portions of the coating knives 2, 3 and the substrate 4. The substrate 4 is moved in a downstream direction 5 relatively to the coating apparatus 1 as indicated by an arrow. The coating knives 2, 3 are vertically arranged, spaced apart and held independently from each other and can be moved in a vertical direction to change the gap width to the substrate 4. The coating knives 2, 3 can further be moved relatively to each other in a lateral direction in order to modify the lateral distance between the coating knives 2, 3. The lateral spaces between adjacent coating knives 2, 3 define a coating chamber 6 in which a curable liquid precursor II of a second polymer layer is provided under ambient pressure to yield a precursor layer 10 of a second polymer layer. The curable liquid precursor II develops pressure sensitive adhesive characteristics after UV curing and represents a core layer 12 of a dual layer PSA assembly according to the present disclosure.

The front wall and the back wall of the coating chamber 6 are defined by the respective adjacent coating knives 2, 3. A second curable liquid precursor I is provided in front of the upstream coating knife 2 as a rolling bead 7 to yield a precursor layer 9 of first pressure sensitive adhesive polymer layer. The second curable liquid precursor I is a precursor of a polymeric layer developing pressure sensitive adhesive characteristics after UV curing and representing a skin layer 11 of a dual layer PSA assembly according to the present disclosure.

In the coating chamber 6, a solid film 8 in the form of a release liner is conveyed on the upstream side of the coating knife 3 essentially simultaneously with the curable liquid precursor II.

By moving the substrate 4 relatively to the coating apparatus 1 in the downstream direction 5, the curable liquid precursors I, II are deposited onto the substrate 4 in a self-metered manner and superimposed on one another in the order of the arrangement of the liquid precursors I, II to form the precursor layers 9, 10, which are top-covered by the release liner 8. The gap between the first coating knife 2 and the substrate 4 is such that the precursor layer 9 has a thickness of about 80 to 100 µm. The offset between the coating knives 2, 3 is adjusted in such a way that the precursor layer 10 achieves a thickness of about 1400 µm.

The multilayer assembly is then cured in a UV-curing station to yield a dual-layered double-sided pressure sensitive adhesive tape with a core layer 12 and a skin layer 11.

Figure 2:
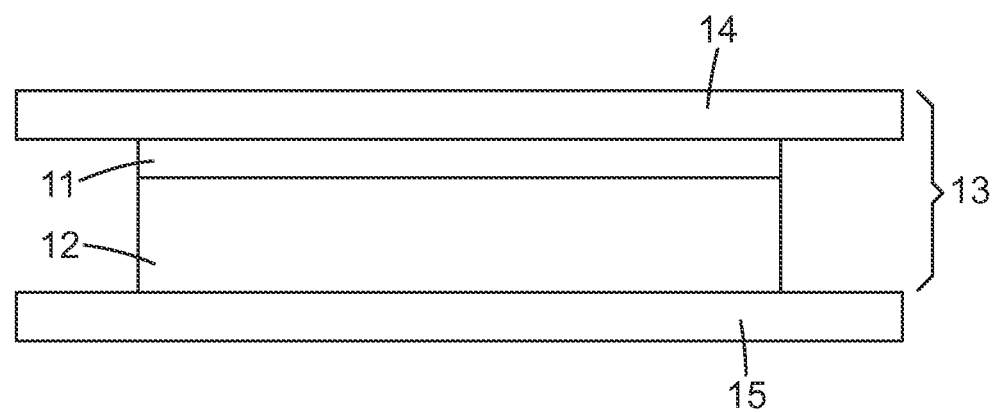
FIG. 2 is a schematic cross-sectional view of an exemplary embodiment of the multilayer pressure sensitive adhesive assembly according to another aspect of the present disclosure, wherein the depicted PSA assembly is a double-sided dual-layer assembly sandwiched between two dissimilar substrates.

FIG. 2 is a schematic cross-sectional view of an exemplary embodiment of the multilayer pressure sensitive adhesive assembly according to another aspect of the present disclosure, wherein the depicted PSA assembly is a double-sided dual-layer assembly sandwiched between two dissimilar substrates.

FIG. 2 shows a PSA assembly 13 comprising a dual-layered double-sided pressure sensitive adhesive assembly with its first pressure sensitive adhesive skin-layer 11 being bonded to a polymeric substrate 14, like a socket of a rearview mirror. The pressure sensitive adhesive polymeric core layer 12 is bonded to a glass substrate 15, in particular the inner side of a vehicle windscreen.

Figure 3:
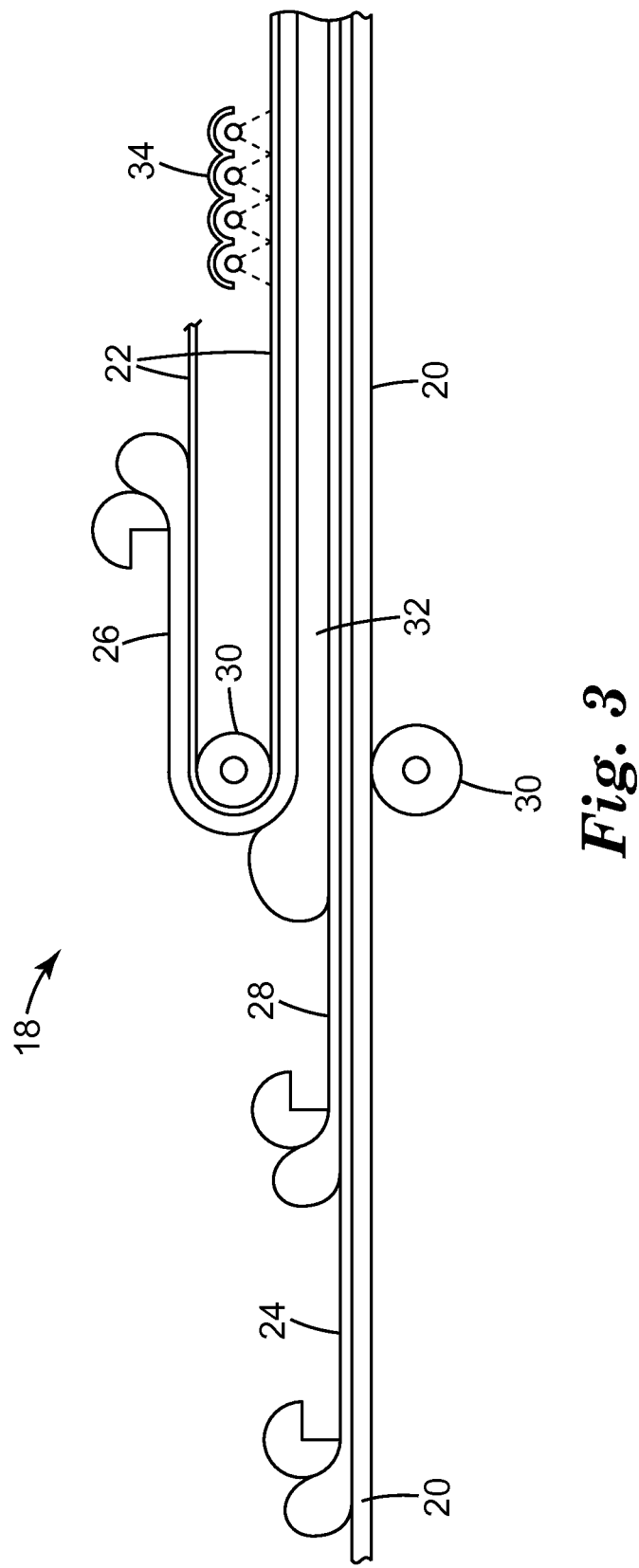
FIG. 3 is a schematic cross-sectional representation of a coating apparatus to carry out another exemplary embodiment of the method for manufacturing a multilayer pressure sensitive adhesive assembly.

FIG. 3 is a schematic cross-sectional representation of a coating apparatus to carry out another exemplary embodiment of the method for manufacturing a multilayer pressure sensitive adhesive assembly according to one aspect of the present disclosure.

In FIG. 3 are shown knife-coated curable liquid precursor layers 24 and 26 applied onto respectively a polymeric substrate 20 and a low-adhesion carrier 22. Each of layers 24 and 26 comprises a syrup consisting of a monomer blend which is curable to a pressure-sensitive adhesive state, and represent respectively curable liquid precursors of pressure sensitive adhesive polymer layer 2 (PSA2) and curable liquid precursors of pressure sensitive adhesive polymer layer 3 (PSA3). Over the curable liquid precursor layer 24, is knife-coated a very thin curable liquid precursor layer of a first pressure sensitive adhesive polymer layer 28 (PSA1). Similarly, a curable liquid precursor layer of a second polymer layer 32 is thickly applied at the nip of a pair of rollers 20. The curable liquid precursor layer 32 develops pressure sensitive adhesive characteristics after UV curing and represents a core layer of a four-layer PSA assembly according to the present disclosure, whereas the curable liquid precursor layers 24, 26 and 28 develop pressure sensitive adhesive characteristics after UV curing and represent skin layers of the four-layer PSA assembly. Emerging from the rollers 20 are the polymeric substrate 20 and the low-adhesion carrier 22, between which are the four curable liquid precursor layers 24, 26, 28 and 32 which are simultaneously subjected to ultraviolet radiation from a bank of UV lamps 34, thus yielding the four-layer pressure sensitive adhesive tape assembly.

Item 1 is a method for manufacturing a multilayer pressure sensitive adhesive assembly comprising at least a first pressure sensitive adhesive polymer layer superimposed to a second polymer layer, the method comprising the steps of:
a) providing a substrate;
b) providing a curable liquid precursor of the first pressure sensitive adhesive polymer layer and a curable liquid precursor of the second polymer layer as superimposed layers onto the substrate;
c) optionally, providing one or more solid films and applying these essentially simultaneously with the formation of the adjacent lower polymer layer; and
d) curing the precursor of the multilayer pressure sensitive adhesive assembly thus obtained;
wherein the curable liquid precursor of the first pressure sensitive adhesive polymer layer comprises:
a) 60 parts by weight or greater of a low Tg (meth)acrylate copolymer (component) comprising:
i. $C_1$-$C_{32}$ (meth)acrylic acid ester monomer units;
ii. optionally, acid functional ethylenically unsaturated monomer units;
iii. optionally, non-acid functional, ethylenically unsaturated polar monomer units;
iv. optionally, vinyl monomer units; and
v. optionally, multifunctional (meth)acrylate monomer units, and
b) up to 40 parts by weight of a high Tg (meth)acrylate copolymer having a weight average molecular weight (Mw) of above 20,000 Daltons, and comprising:
i. high Tg (meth)acrylic acid ester monomer units;
ii) optionally, acid functional ethylenically unsaturated monomer units;
iii) optionally, low Tg (meth)acrylic acid ester monomer units;
iv) optionally, non-acid functional, ethylenically unsaturated polar monomer units;
v) optionally, vinyl monomer units; and
c) optionally, up to 20 parts by weight of a hydrogenated hydrocarbon tackifier, based on 100 parts by weight of copolymers a) and b).

Item 2 is the method of item 1, wherein the low Tg (meth)acrylate copolymer comprises $C_1$-$C_{24}$ (meth)acrylic acid ester monomer units, or even $C_1$-$C_{18}$ (meth)acrylic acid ester monomer units.

Item 3 is a method according to any of item 1 or 2, wherein a (lower) layer of a curable liquid precursor of the second polymer layer is covered by an adjacent (upper) layer of a curable liquid precursor of the first pressure sensitive adhesive polymer layer, respectively, essentially without exposing the (lower) layer of a curable liquid precursor of the second polymer layer.

Item 4 is a method according to any of the preceding items, which further comprises the steps of:
e) providing two or more coating knives which are offset, independently from each other, from the substrate to form a gap normal to the surface of the substrate;
f) moving the substrate relative to the coating knives in a downstream direction;
g) providing a curable liquid precursor of the first pressure sensitive adhesive polymer layer and a curable liquid precursor of the second polymer layer to the upstream side of the coating knives thereby coating the two or more curable liquid precursors through the respective gaps as superimposed layers onto the substrate.

Item 5 is a method according to any of the preceding items, whereby the curable liquid precursors are applied under ambient pressure or an over-pressure.

Item 6 is a method according to any of the preceding items, whereby the curable liquid precursors are provided in one or more coating chambers essentially abutting each other and being bordered in downstream direction by a front wall, optionally one or more intermediate walls and a back wall, and, optionally, by a rolling bead positioned up-web relative to the front wall, whereas in particular the upstream intermediate walls, the back wall and, if a rolling bead is present upstream relative to the front wall, the front wall are formed by coating knives.

Item 7 is a method according to any of the preceding items, whereby the solid films are attached to form the lowest layer and/or the topmost layer and/or an intermediate layer of the precursor of the multilayer film.

Item 8 is a method according to any of the preceding items, whereby at least the exposed surface of the substrate and/or at least one surface of a solid film facing the precursor of the multilayer film, is a release surface.

Item 9 is a method according to any of the preceding items, whereby the substrate forms an integral part of the multilayer film subsequent to the curing step.

Item 10 is a method according to any of the preceding items, whereby the precursor layers are cured thermally and/or by exposing them to actinic radiation, in particular after they have passed the back wall of a coating apparatus.

Item 11 is a method according to any of the preceding items, whereby the curable liquid precursors have a Brookfield viscosity of at least 1,000 mPa·s at 25° C.

Item 12 is a method according to any of the preceding items, wherein the low Tg (meth)acrylate copolymer has a Tg of below 20° C., or even below 0° C.

Item 13 is a method according to any of the preceding items, wherein the high Tg (meth)acrylate copolymer has a Tg of above 50° C., above 75° C., or even above 100° C.

Item 14 is a method according to any of the preceding items, wherein the high Tg (meth)acrylate copolymer has a weight average molecular weight (Mw) of above 25,000 Daltons, above 30,000 Daltons, above 35,000 Daltons, or even above 40,000 Daltons.

Item 15 is a method according to any of the preceding items, wherein the high Tg (meth)acrylate copolymer has a weight average molecular weight (Mw) of below 100,000 Daltons, below 80,000 Daltons, below 75,000 Daltons, below 60,000 Daltons, below 50,000 Daltons, or even below 45,000 Daltons.

Item 16 is a method according to any of the preceding items, wherein the low Tg (meth)acrylate copolymer comprises:
  i. 60 to 98.5 parts by weight, preferably 65 to 98.5 parts by weight of $C_1$-$C_{32}$ (meth)acrylic acid ester monomer units, $C_1$-$C_{24}$ (meth)acrylic acid ester monomer units, or even $C_1$-$C_{18}$ (meth)acrylic acid ester monomer units;
  ii. 1 to 20 parts by weight of high Tg (meth)acrylic acid ester monomer units;
  iii. 0.5 to 15 parts by weight of acid-functional ethylenically unsaturated monomer units;
  iv. 0 to 10 parts by weight of non-acid functional, ethylenically unsaturated polar monomer units;
  v. 0 to 5 parts vinyl monomer units; and
  vi. 0 to 5 parts of multifunctional (meth)acrylate monomer units;
based on 100 parts by weight of the total monomers of the low Tg copolymer.

Item 17 is a method according to any of items 1 to 15, wherein the low Tg (meth)acrylate copolymer comprises:
  i. 85 to 99.5 parts by weight of an (meth)acrylic acid ester monomer unit of non-tertiary alcohol;
  ii. 0.5 to 15 parts by weight of an acid functional ethylenically unsaturated monomer unit;
  iii. 0 to 10 parts by weight of a non-acid functional, ethylenically unsaturated polar monomer unit;
  iv. 0 to 5 parts vinyl monomer units; and
  v. 0 to 5 parts of a multifunctional (meth)acrylate monomer units;
based on 100 parts by weight total monomers of the low Tg (meth)acrylate copolymer.

Item 18 is a method according to any of the preceding items, wherein the low Tg (meth)acrylate copolymer comprises a solution copolymer comprising a low Tg solute copolymer in a solvent.

Item 19 is a method according to any of the preceding items, wherein the high Tg (meth)acrylic acid ester monomer units are selected from the group consisting of t-butyl (meth)acrylate, methyl (meth)acrylate, ethyl (meth)acrylate, isopropyl (meth)acrylate, n-butyl (meth)acrylate, isobutyl (meth)acrylate, s-butyl (meth)acrylate, t-butyl (meth)acrylate, stearyl (meth)acrylate, phenyl (meth)acrylate, cyclohexyl (meth)acrylate, isobornyl (meth)acrylate, isobornyl (meth)acrylate, benzyl (meth)acrylate, 3,3,5 trimethylcyclohexyl (meth)acrylate, cyclohexyl (meth)acrylate, N-octyl acrylamide, propyl (meth)acrylate, and any combinations or mixtures thereof.

Item 20 is a method according to any of the preceding items, wherein the curable liquid precursor of the first pressure sensitive adhesive polymer layer further comprises a crosslinking agent, which is preferably selected from the group consisting of multifunctional aziridines, multifunctional isocyanates, multifunctional epoxides, benzophenone, triazines, multifunctional acrylates, multifunctional carboxylates, oxetanes, oxazolines, and any combinations or mixtures thereof.

Item 21 is a method according to item 20, wherein the crosslinking agent is selected from the group consisting of multifunctional acrylates.

Item 22 is a method according to any of the preceding items, wherein the $C_1$-$C_{32}$ (meth)acrylic acid ester monomer units, the $C_1$-$C_{24}$ (meth)acrylic acid ester monomer units, or even the $C_1$-$C_{18}$ (meth)acrylic acid ester monomer units of the low Tg (meth)acrylate copolymer are selected from the group consisting of (meth)acrylic esters of ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and any combinations or mixtures thereof; more preferably from the group consisting of (meth)acrylic esters of 2-octanol, citronellol, dihydrocitronellol, and any combinations or mixtures thereof.

Item 23 is a method according to any of the preceding items, wherein the $C_1$-$C_{32}$ (meth)acrylic acid ester monomer units, the $C_1$-$C_{24}$ (meth)acrylic acid ester monomer units, or even the $C_1$-$C_{18}$ (meth)acrylic acid ester monomer units of the low Tg (meth)acrylate copolymer comprise acrylic esters of 2-alkyl alkanols.

Item 24 is a method according to any of items 1 to 23, wherein the $C_1$-$C_{32}$ (meth)acrylic acid ester monomer units, the $C_1$-$C_{24}$ (meth)acrylic acid ester monomer units, or even the $C_1$-$C_{18}$ (meth)acrylic acid ester monomer units of the low Tg (meth)acrylate copolymer comprise 2-octyl(meth)acrylate.

Item 25 is a method according to item 24, wherein at least 25 wt %, preferably at least 50 wt %, more preferably at least 75 wt %, most preferably 100 wt % of the chemical structure of the 2-octyl(meth)acrylate is at least partly, preferably at least 25 wt %, more preferably at least 50 wt %, even more preferably at least 75 wt %, most preferably 100 wt % derived from biological material, more preferably from a plant material.

Item 26 is a method according to any of the preceding items, wherein the curable liquid precursor of the first pressure sensitive adhesive polymer layer and/or the curable liquid precursor of the second polymer layer is at least partly, preferably at least 25 wt %, more preferably at least 50 wt %, even more preferably at least 75 wt %, most preferably 100 wt % derived from biological material, more preferably from a plant material.

Item 27 is a method according to any of items 1 to 23, wherein the $C_1$-$C_{32}$ (meth)acrylic acid ester monomer units, the $C_1$-$C_{24}$ (meth)acrylic acid ester monomer units, or even the $C_1$-$C_{18}$ (meth)acrylic acid ester monomer units of the low Tg (meth)acrylate copolymer comprise esters of (meth)acrylic acid with non-tertiary alcohols selected from the group consisting of 2-ethyl-1-hexanol and 2-propylheptanol. In a particular aspect, the (meth)acrylate acid ester monomer units are esters of (meth)acrylic acid with 2-propylheptanol.

Item 28 is a method according to any of the preceding items, wherein the curable liquid precursor of the first pressure sensitive adhesive polymer layer comprises from 0.1 to 20 parts by weight, from 0.5 to 20 parts by weight, from 1 to 15 parts by weight, from 2 to 15 parts by weight, or even from 5 to 15 parts by weight of a hydrogenated hydrocarbon tackifier, preferably a fully hydrogenated hydrocarbon tackifier, based on 100 parts by weight of copolymers a) and b).

Item 29 is a method according to any of the preceding items, wherein the curable liquid precursor of the first pressure sensitive adhesive polymer layer further comprises a chlorinated polyolefinic (co)polymer, which is preferably selected from the group consisting of chlorinated polypropylene, chlorinated polyethylene, chlorinated ethylene/vinyl acetate copolymer, and any combinations, mixtures or copolymers thereof.

Item 30 is a method according to item 29, wherein the curable liquid precursor of the first pressure sensitive adhesive polymer layer comprises a chlorinated polyolefinic (co)polymer in an amount comprised between 0.1 and 15 parts by weight, between 0.1 and 10 parts by weight, between 0.2 and 5 parts by weight, between 0.2 and 3 parts by weight, or even between 0.2 and 2 parts by weight based on 100 parts by weight of copolymers a) and b).

Item 31 is a method according to any of the preceding items, wherein the low Tg (meth)acrylate copolymer comprises a syrup copolymer comprising a low Tg solute (meth)acrylate copolymer in solvent monomer(s).

Item 32 is a method according to item 31, wherein the low Tg solute (meth)acrylate copolymer comprises:
 i. 85 to 99.5 parts by weight of an (meth)acrylic acid ester;
 ii. 0.5 to 15 parts by weight of an acid functional ethylenically unsaturated monomer;
 iii. 0 to 10 parts by weight of a non-acid functional, ethylenically unsaturated polar monomer;
 iv. 0 to 5 parts by weight of a vinyl monomer; and
 v. 0 to 5 parts by weight of a multifunctional (meth)acrylate;
 based on 100 parts by weight of the total monomers of the low Tg solute copolymer.

Item 33 is a method according to any of item 31 or 32, wherein the syrup copolymer comprises up to 30 parts by weight of the solute (meth)acrylate copolymer in solvent monomer(s).

Item 34 is a method according to any of items 31 to 33, wherein the syrup copolymer has a viscosity of from 500 to 10,000 mPa·s at 22° C.

Item 35 is a method according to any of items 31 to 34, wherein the solvent monomer(s) comprise a mixture of:
 i) an alkyl (meth)acrylate monomer;
 ii) optionally, an acid-functional ethylenically unsaturated monomer;
 iii) optionally, a non-acid functional polar monomer;
 iv) optionally, a vinyl monomer; and
 v) optionally, a multifunctional (meth)acrylate.

Item 36 is a multilayer pressure sensitive adhesive assembly obtainable by the method according to any of items 1 to 35.

Item 37 is the multilayer pressure sensitive adhesive assembly of item 36, (comprising at least a first pressure sensitive adhesive polymer layer superimposed to a second polymer layer,) which is light-transmissive, and wherein each of the polymer layers has a transmission of at least 80%, preferably at least 85%, more preferably at least 90%, even more preferably at least 95%, relative to visible light.

Item 38 is a multilayer pressure sensitive adhesive assembly according to item 36 or 37, (comprising at least a first pressure sensitive adhesive polymer layer superimposed to a second polymer layer,) which has a light-transmission relative to visible light and which results from the light-transmission of the superimposed polymer layers of at least 80%, preferably at least 85%, more preferably at least 90%.

Item 39 is a multilayer pressure sensitive adhesive assembly according to any of items 36 to 38, exhibiting a decrease in peel strength of less than 40%, preferably less than 30%, more preferably less than 25%, even more preferably less than 20%, still more preferably less than 15%, yet more preferably less than 10%, most preferably less than 5%, after heat bond ageing on polypropylene, when measured according to the heat bond ageing test method described in the experimental section.

Item 40 is a multilayer pressure sensitive adhesive assembly according to any of items 36 to 39, wherein the second polymer layer takes the form of a polymeric foam layer, which is preferably a pressure sensitive adhesive layer.

Item 41 is a multilayer pressure sensitive adhesive assembly according to item 40, wherein the polymeric foam layer is obtained by frothing techniques, preferably by whipping a gas into the polymerizable composition of the second polymer layer.

Item 42 is a multilayer pressure sensitive adhesive assembly according to any of items 36 to 41, which is in the form of a skin/core multilayer pressure sensitive adhesive assembly, wherein the first pressure sensitive adhesive polymer layer is the skin layer of the multilayer pressure sensitive adhesive assembly and the second polymer layer is the core layer of the multilayer pressure sensitive adhesive assembly.

Item 43 is a multilayer pressure sensitive adhesive assembly according to any of items 36 to 42, which further comprises a second pressure sensitive adhesive layer, which is preferably adjacent to the second polymer layer in the side of the second polymer layer which is opposed to the side of second polymer layer adjacent to the first pressure sensitive adhesive polymer layer, and wherein the first pressure sensitive adhesive polymer layer, the second polymer layer and the second pressure sensitive adhesive polymer layer are superimposed.

Item 44 is a multilayer pressure sensitive adhesive assembly according to item 43, which is in the form of a skin/core/skin multilayer pressure sensitive adhesive assembly, wherein the first pressure sensitive adhesive polymer layer is the first skin layer of the multilayer pressure sensitive adhesive assembly, the second pressure sensitive adhesive polymer layer is the second skin layer of the multilayer pressure sensitive adhesive assembly and the second polymer layer is the core layer of the multilayer pressure sensitive adhesive assembly.

Item 45 is a multilayer pressure sensitive adhesive assembly according to any of items 36 to 44, wherein the second polymer layer and/or the second pressure sensitive adhesive layer comprises a polymer base material selected from the group consisting of polyacrylates, polyurethanes, polyolefins, polyamines, polyamides, polyesters, polyethers, polyisobutylene, polystyrenes, polyvinyls, polyvinylpyrrolidone, natural rubbers, synthetic rubbers, and any combinations, copolymers or mixtures thereof.

Item 46 is a multilayer pressure sensitive adhesive assembly according to item 45, wherein the second polymer layer and/or the second pressure sensitive adhesive polymer layer comprises a polymer base material selected from the group consisting of polyacrylates whose main monomer component preferably comprises a linear or branched alkyl (meth)acrylate ester, preferably a non-polar linear or branched alkyl (meth)acrylate ester having a linear or branched alkyl group comprising preferably from 1 to 32, from 1 to 20, or even from 1 to 15 carbon atoms.

Item 47 is a multilayer pressure sensitive adhesive assembly according to any of item 45 or 46, wherein the second polymer layer and/or the second pressure sensitive adhesive polymer layer comprises a polymer base material selected from the group consisting of polyacrylates whose main monomer component comprises a linear or branched alkyl (meth)acrylate ester selected from the group consisting of methyl (meth)acrylate, ethyl (meth)acrylate, n-propyl (meth)acrylate, isopropyl (meth)acrylate, n-butyl acrylate, isobutyl acrylate, tert-butyl (meth)acrylate, n-pentyl (meth)acrylate, iso-pentyl (meth)acrylate, n-hexyl (meth)acrylate, iso-hexyl (meth)acrylate, cyclohexyl (meth)acrylate, phenyl (meth)acrylate, octyl (meth)acrylate, iso-octyl (meth)acrylate, 2-octyl(meth)acrylate, 2-ethylhexyl (meth)acrylate, decyl (meth)acrylate, lauryl (meth)acrylate, 2-propylheptyl (meth)acrylate, stearyl (meth)acrylate, isobornyl acrylate, benzyl (meth)acrylate, octadecyl acrylate, nonyl acrylate, dodecyl acrylate, isophoryl (meth)acrylate, and any combinations or mixtures thereof.

Item 48 is a multilayer pressure sensitive adhesive assembly according to item 47, wherein the linear or branched alkyl (meth)acrylate ester is selected from the group consisting of iso-octyl (meth)acrylate, 2-ethylhexyl (meth)acrylate, 2-propylheptyl (meth)acrylate, butyl acrylate, 2-octyl (meth)acrylate, and any combinations or mixtures thereof; more preferably from the group consisting of iso-octyl acrylate, 2-ethylhexyl (meth)acrylate and 2-propylheptyl (meth)acrylate, and any combinations or mixtures thereof; even more preferably from the group consisting of 2-ethylhexyl acrylate and 2-propylheptyl acrylate, and any combinations or mixtures thereof.

Item 49 is a multilayer pressure sensitive adhesive assembly according to item 48, wherein the linear or branched alkyl (meth)acrylate ester comprises 2-octyl(meth)acrylate.

Item 50 is a multilayer pressure sensitive adhesive assembly according to item 49, wherein at least 25 wt %, preferably at least 50 wt %, more preferably at least 75 wt %, most 100 wt % of the chemical structure of the 2-octyl(meth) acrylate is at least partly, preferably completely (i.e. 100 wt %) derived from biological material, more preferably from a plant material.

Item 51 is a multilayer pressure sensitive adhesive assembly according to item 48, wherein the $C_1$-$C_{32}$ (meth)acrylic acid ester monomer units, the $C_1$-$C_{24}$ (meth)acrylic acid ester monomer units, or even the $C_1$-$C_{18}$ (meth)acrylic acid ester monomer units of the low Tg (meth)acrylate copolymer comprise esters of (meth)acrylic acid with non-tertiary alcohols selected from the group consisting of 2-ethyl-1-hexanol and 2-propylheptanol. In a particular aspect, the (meth)acrylate acid ester monomer units are esters of (meth) acrylic acid with 2-propylheptanol.

Item 52 is a multilayer pressure sensitive adhesive assembly according to any of items 45 to 51, wherein the polymer base material further comprises a polar comonomer, preferably a polar acrylate, more preferably selected from the group consisting of acrylic acid, methacrylic acid, itaconic acid, hydroxyalkyl acrylates, acrylamides and substituted acrylamides, acrylamines and substituted acrylamines and any combinations or mixtures thereof.

Item 53 is a multilayer pressure sensitive adhesive assembly according to any of items 36 to 52, wherein the second pressure sensitive adhesive layer and/or the second polymer layer has a (co)polymeric composition as described in any of items 1 to 34 for the curable liquid precursor of the first pressure sensitive adhesive polymer layer.

Item 54 is a multilayer pressure sensitive adhesive assembly according to any of items 36 to 53, wherein the second polymer layer and/or the second pressure sensitive adhesive layer further comprise a filler material which is preferably selected from the group consisting of filler particles, in particular expanded perlite, microspheres, expendable microspheres, glassbeads, glass microspheres, silica type fillers, hydrophobic silica type fillers, hydrophilic silica type fillers, hydrophobic fumed silica, hydrophilic fumed silica, fibers, electrically and/or thermally conducting particles, nanoparticles, in particular silica nanoparticles, and any combinations or mixtures thereof.

Item 55 is a multilayer pressure sensitive adhesive assembly according to item 54, wherein the filler material is selected from the group consisting of glass microspheres, hydrophobic silica type fillers, and any combinations or mixtures thereof.

Item 56 is a multilayer pressure sensitive adhesive assembly according to any of item 54 or 55, wherein the filler material is selected from the group consisting of hollow non-porous particulate filler materials, wherein the surface of the hollow non-porous particulate filler material is provided with a hydrophobic or hydrophilic surface modification, preferably a hydrophobic surface modification.

Item 57 is a multilayer pressure sensitive adhesive assembly according to item 56, wherein the filler material is selected from the group consisting of glass microspheres, the surface of which is provided with a hydrophobic or hydrophilic surface modification, preferably a hydrophobic surface modification.

Item 58 is a multilayer pressure sensitive adhesive assembly according to any of items 43 to 57, which is obtainable by the method according to any of items 1 to 35.

Item 59 is a curable precursor of a multilayer pressure sensitive adhesive assembly comprising at least a first pressure sensitive adhesive polymer layer and a second polymer layer, wherein the curable precursor of a pressure sensitive adhesive assembly comprises a layer of a curable liquid precursor of the first pressure sensitive adhesive polymer layer superimposed to a layer of a curable liquid precursor of the second polymer layer, wherein the curable liquid precursor of the first pressure sensitive adhesive polymer layer comprises:

a) 60 parts by weight or greater of a low Tg (meth)acrylate copolymer component comprising:
  i. $C_1$-$C_{32}$ (meth)acrylic acid ester monomer units;
  ii. optionally, acid functional ethylenically unsaturated monomer units;
  iii. optionally, non-acid functional, ethylenically unsaturated polar monomer units;
  iv. optionally, vinyl monomer units; and
  v. optionally, a multifunctional (meth)acrylate, and
b) up to 40 parts by weight of a high Tg acrylate copolymer having a weight average molecular weight (Mw) above 20000 Daltons, and comprising:
  i. high Tg (meth)acrylic acid ester monomer units;
  ii) optionally, acid functional ethylenically unsaturated monomer units;
  iii) optionally, low Tg (meth)acrylic acid ester monomer units;
  iv) optionally, non-acid functional, ethylenically unsaturated polar monomer units;
  v) optionally, vinyl monomer units; and
c) optionally, up to 20 parts by weight of a hydrogenated hydrocarbon tackifier, based on 100 parts by weight of a) and b).

Item 60 is the curable precursor of a multilayer pressure sensitive adhesive assembly of item 58, wherein the low Tg (meth)acrylate copolymer comprises $C_1$-$C_{24}$ (meth)acrylic acid ester monomer units, or even $C_1$-$C_{18}$ (meth)acrylic acid ester monomer units.

Item 61 is a curable precursor of a multilayer pressure sensitive adhesive assembly according to any of item 59 or 60, wherein a (lower) layer of a curable liquid precursor of the second polymer layer is covered by an adjacent (upper) layer of a curable liquid precursor of the first pressure sensitive adhesive polymer layer, respectively, essentially without exposing the (lower) layer of a curable liquid precursor of the second polymer layer.

Item 62 is the use of a pressure sensitive adhesive assembly according to any of items 35 to 58 for the bonding to a low surface energy substrate, a medium surface energy substrate and/or a high surface energy substrate, preferably for the bonding to a low surface energy substrate or a medium surface energy substrate.

Item 63 is the use of a pressure sensitive adhesive assembly according to any of items 35 to 58 for industrial applications, in particular for construction applications and automotive applications.

EXAMPLES

The present disclosure is further illustrated by the following examples. These examples are merely for illustrative purposes only and are not meant to be limiting on the scope of the appended claims.

Test Substrates

The multilayer pressure sensitive adhesive assemblies according to the present disclosure were tested for their adhesive properties on following substrates:
Steel: Stainless Steel (SS) plate ("Edelstahl 1.4301 IIID", 150×50×2 mm), available from Rocholl GmbH, Aglatershausen, Germany
PP: polypropylene plate ("Kunststoffprüfkörper PP nature"; Fabrikat Simona HWST; 150 cm×50×2 mm), available from Rocholl GmbH, Aglatershausen, Germany.

Prior to testing, the substrates were cleaned as follows:
The SS plates were first cleaned with MEK and n-heptane, dried with a tissue, and then cleaned with MEK and dried with a tissue.
The PP panels were cleaned first with a dry tissue applied with gentle force to remove any residuals/waxy compounds on the surface and then cleaned with a mixture of isopropyl alcohol:distilled water (1:1) and dried with a tissue.

Test Methods
90°-Peel-Test at 300 mm/Min (According to Test Method, Finat No. 2, $8^{th}$ Edition 2009)

Multilayer pressure sensitive adhesive assembly strips according to the present disclosure and having a width of 12.7 mm and a length >120 mm were cut out in the machine direction from the sample material. For test sample preparation the liner was first removed from the one adhesive side and placed on an aluminum strip having the following dimension 22×1.6 cm, 0.13 mm thickness. Then, the adhesive coated side of each PSA assembly strip was placed, after the liner was removed, with its adhesive side down on a clean test panel using light finger pressure. Next, the test samples were rolled twice in each direction with a standard FINAT test roller (weight 6.8 kg) at a speed of approximately 10 mm per second to obtain intimate contact between the adhesive mass and the surface. After applying the pressure sensitive adhesive assembly strips to the test panel, the test samples were allowed to dwell at ambient room temperature (23° C.+/−2° C., 50% relative humidity+/−5%) prior to testing.

For peel testing the test samples were in a first step clamped in the lower movable jaw of a Zwick tensile tester (Model Z005 commercially available from Zwick/Roell GmbH, Ulm, Germany). The multilayer pressure sensitive adhesive film strips were folded back at an angle of 90° and their free ends grasped in the upper jaw of the tensile tester in a configuration commonly utilized for 90° measurements. The tensile tester was set at 300 mm per minute jaw separation rate. Test results are expressed in Newton per 10 mm (N/10 mm) The quoted peel values were the average of two 90°-peel measurements.

The 90° peel testing after heat ageing was tested as follows:
First, the samples were prepared as previously described with an aluminum backing and applied onto the test substrates. After storage of the samples in a constant climate room for 1 hour at room temperature (at 23+/−2° C. and 50% relative humidity+/−5%) the test panels were placed in an oven at 90° C. for 3 days. After oven aging the test panels were reconditioned in a constant climate room for 24 hours and the 90° peel forces are measured as described above.
Static Shear-Test (According to FINAT™ 8, $8^{th}$ Edition 2009)

The test was carried out at ambient room temperature (23° C.+/−2° C. and 50%+/−5% relative humidity). Each test specimen was cut out having a dimension of 12.7 mm by 25.4 mm. The liner was then removed from one side of the test specimen and the adhesive was adhered onto to an aluminum strip having the following dimension 11×1.6 cm, 0.13 mm thickness and comprising a hole for the weight. The second liner was thereafter removed from the test specimen and the small panel with the test specimen was applied onto the respective test panel (PP) having the following dimensions: 50 mm×100 mm×2 mm at the short edge. A 1000 g weight was then put onto the sandwich construction for 60 minutes. Each sample was then placed into a vertical shear-stand (+2° disposition) with automatic time logging and a 1000 g weight was then hung into the hole of the aluminum stripe. The time until failure was measured and recorded in minutes. Target value was 10.000 minutes. Per test specimen three samples were measured.

Static Shear Test @ 70° C. with 250 g (FINAT Test Method No. 8, $8^{th}$ Edition 2009)

The static shear was a measure of the cohesiveness or internal strength of an adhesive. It was measured in units of time (minutes) required to pull a standard area of adhesive sheet material from a stainless steel test panel under stress of a constant, standard load.

A strip of 25 mm wide and 5.1 cm long was cut in machine direction from the cured multilayer pressure sensitive adhesive sample. One release liner was removed from the strip and the PSA assembly was attached through its exposed adhesive surface onto an anodized aluminium backing. Then, the second release liner was removed and the PSA assembly was attached to the test substrate, providing a bond area of 25×10 mm and using light finger pressure. The standard FINAT test roller (6.8 kg) was rolled one time in each direction at a speed of approximately 10 mm per second to obtain intimate contact between the adhesive mass and the substrate surface. After applying the multilayer PSA assembly strip to the test plate, the test plate was left at room temperature for a period of 24 h before testing. A loop was prepared at the end of the test strip in order to hold the specified weight. The test panel was placed in a shear holding device. After a 15 min dwell time at the test temperature of 70° C., the 250 g load was attached in the loop. The timer was started. The results were recorded in minutes and are the average of three shear measurements. A recorded time of "10000+" indicates that the adhesive did not fail after 10000 min.

Molecular Weight Measurement

The weight average molecular weight of the polymers was determined using conventional gel permeation chromatography (GPC). The GPC apparatus obtained from Waters, included a high pressure liquid chromatography pump (Model 600E), an auto-sampler (Model 712 WISP), and a refractive index detector (Model 2414). The chromatograph was equipped with three Mixed Bed type B (10 μm particle) columns 300×7.5 mm from Agilent.

Polymeric solutions for testing were prepared by dissolving a polymer in 1 ml tetrahydrofuran at a concentration of 0.3% polymer by weight. 300 μl etheral alcoholic diazomethane solution (0.4 mol/l) is added and the sample was kept for 60 minutes at room temperature. The sample was then blown to dryness under a stream of nitrogen at room temperature. The dried sample was dissolved in THF, containing 0.1% toluene, to yield a 0.1% w/v solution. The solution was then filtered through a 0.45 micron polytetrafluoroethylene filter. 100 μl of the resulting solution is injected into the GPC and eluted at a rate of 1.00 milliliter per minute through the columns maintained at 40° C. Toluene was used as a flow rate marker. The system was calibrated with polystyrene standards (10 standards, divided in 3 solutions in the range between 470 Da and 7300000 Da) using a 3rd order regression analysis to establish a calibration curve. The weight average molecular weight (Mw) was calculated for each sample from the calibration curve.

Raw Materials Used:

In the examples, the following raw materials are used:

Isooctyl acrylate (IOA) is an ester of isooctyl alcohol and acrylic acid which is obtained from 3M Hilden, Germany.

2-Ethylhexylacrylate (2-EHA, C8-acrylate) is an ester of 2-ethylalcohol and acrylic acid which is obtained from BASF AG, Germany.

2-Octylacrylate is an ester of 2-octylalcohol and acrylic acid which is prepared as disclosed in preparative example 1 of U.S. Pat. No. 7,385,020.

Acrylic acid is obtained from 3M Hilden, Germany (AA).

Isobornylacrylate (SR 506D) is a monofunctional acrylic monomer available from Cray Valley, France.

REGALREZ 1126 is a low molecular weight, fully hydrogenated pure monomer C9 resin, commercially available from Eastman Chemical BV, NL.

REGALREZ 1094 is a low molecular weight, fully hydrogenated resin, commercially available from Eastman Chemical BV, NL.

1,6-Hexanedioldiacrylate (HDDA) is a fast curing diacrylate and is obtained from 3M Hilden, Germany.

IRGACURE 651 (Irg651), 2,2 dimethoxy-1,2-diphenylethanone is a photoinitiator and is available from BASF, Germany.

OMNIRAD BDK 2,2-dimethoxy-2-phenylacetophenone is a UV-initiator and is available from iGm resins, Waalwijk Netherlands.

XL-330 2,4-bis(trichloromethyl)-6-(4-methoxyphenyl)-triazine is a photocrosslinker and is obtained from 3M Company, St. Paul, Minn.

3M Glass Bubbles (K15), hollow glass bubbles with a diameter of 115 μm, commercially available by 3M Deutschland GmbH, Germany.

AEROSIL R-972 are hydrophobic fumed silica particles, available from Evonik, Germany.

CPO 343-1 a chlorinated polyolefin soluble in isobornylacrylate and commercially available by Eastman Chemical Products Inc., U.S.A.

IOTG, Isooctyl thioglycolate is a chain transfer agent and commercially available by TCI, Tokyo Chemical Industry Co., Ltd., Tokyo, Japan.

Before preparing the liquid precursors used for the first pressure sensitive adhesive layer, the high Tg (meth)acrylate copolymers, having the composition as shown in Table 1, were prepared as detailed below.

TABLE 1

| Raw materials | HTG-1 |
|---|---|
| Isobornylacrylate (IBOA) | 97 wt % |
| Acrylic acid (AA) | 3 wt % |
| OMNIRAD BDK | 1 (phr) |
| Isooctyl thioglycolate (IOTG) | 1 (phr) |

Preparation of the High Tg (Meth)Acrylate Copolymers

High Tg acrylic copolymers were prepared by mixing the high Tg monomer isobornyl acrylate (IBOA) with acrylic acid (AA), photoinitiator and chain transfer agent isooctyl thioglycolate (IOTG) as shown in Table 1. Then, approximately 28 g of the high Tg copolymer mixture was filled into LDPE bags (commercially available by e.g. Zip Lock) having one of the either dimensions—7.2×12.4 cm (small bag) or 9.9×17 cm (large bag)—and any air entrapments were forced out of the open bag. Nitrogen gas was then purged into the bags for at least 5 minutes and then the bags were closed. In a next step, the bags were immersed in a constant water bath at ca. 20° C. and irradiated using a LAMAG UV lamp (366 nm, 1100 μW/cm2) for approx. 5-10 minutes on each side to produce copolymers having the weight average molecular weights Mw of between 23500 to 25500 g/mol as shown in Table 2. After synthesis, the obtained high Tg copolymers were hard (glass-like) and brittle on impact.

TABLE 2

|   | Mw (g/mol) | Mw/Mn | Mass (g) | bag size | N2 purge (min) | distance to lamp (cm) | irradiation time (min) |
|---|---|---|---|---|---|---|---|
| HTG-1a | 24700 | 1.86 | 28 | small | 5 | 5 | 10 |
| HTG-1b | 24400 | 1.73 | 28 | small | 10 | 10 | 8 |
| HTG-1c | 23600 | 1.74 | 28 | large | 10 | 10 | 8 |
| HTG-1d | 25000 | 1.96 | 20-30 | large | 5-10 | 5 | 5 |
| HTG-1e | 25600 | 1.78 | 20-30 | large | 5-10 | 5 | 5 |

Preparation of the Liquid Precursors:
Preparation of the Liquid Precursors Used for the First Pressure Sensitive Adhesive Layer (LPS 1 to LPS 5)

The low Tg acrylic syrup was prepared by initially pre-polymerizing the selected acrylate and the acrylic acid (AA) monomers in a vessel containing 0.04 ppH photoinitiator and then exposing the mixture to ultraviolet radiation until a coatable syrup with a viscosity of about 11000 mPa·s (when measured with a Brookfield viscosimeter T=25° C., spindle 4, 12 rpm) was obtained.

Before the UV-exposure, the mixture was flushed 10 minutes with nitrogen and nitrogen was also bubbled to the mixture until the polymerization process was stopped by adding air to the syrup. All the time the mixture was stirred with a propeller stirrer (300 U/min) and the reaction was stopped when a viscosity of about 11000 mPas was reached. Additional co-monomer(s), the remaining photoinitiator, hydrocarbon tackifier, the high Tg copolymer HTG-1 and the crosslinker were added to the syrup and mixed until they dissolved completely.

An overview of all liquid precursors used for the first pressure sensitive adhesive layer (LPS 1-LPS 5) is shown in Table 3.

TABLE 3

|  | LPS 1 | LPS 2 | LPS 3 | LPS 4 | LPS 5 |
|---|---|---|---|---|---|
|  | wt % | wt % | wt % | wt % | wt % |
| 2-EHA | 76.5 | 74 | 76.5 | 76.5 | 78 |
| AA | 2.5 | 5 | 2.5 | 2.5 | 2 |
| IBOA | 10 | 10 | 10 | — | 10 |
| IBOA/CPO (10/2) |  |  |  | 12 |  |
| HTG-1 | 10.66 | 10.66 | 10.66 | 10 | 10 |
|  | phr | phr | phr | phr | phr |
| IRGACURE 651 |  |  |  | 0.2 | 0.2 |
| OMNIRAD | 0.2 | 0.2 | 0.2 |  |  |
| HDDA | 0.1 | 0.1 | 0.1 | 0.1 |  |
| XL 330 |  |  |  |  | 0.1 |
| REGALREZ 1094 | 10 | 10 |  |  |  |
| REGALREZ 1126 |  |  | 10 | 10 | 10 |

Preparation of Liquid Precursor of the Second Polymer Layer (LPF 1-LPF 3):

The liquid precursors of the second polymer layer, later referred to as LPF 1 to LPF 3 were prepared by combining the 90 wt % of 2-EHA and 10 wt. % of acrylic acid with 0.04 pph photoinitiator in a glass vessel or—in case of LPF 3-95 wt % of 2-OA and 5 wt % of acrylic acid with 0.04 ppH photoinitiator. Moreover, LPF 3 was additionally subjected to a frothing step as described in U.S. Pat. No. 4,415,615 (Esmay et al.). Before the UV exposure was initiated, the mixture was flushed 10 minutes with nitrogen and nitrogen was also bubbled into the mixture the whole time until the polymerization process was stopped by adding air to the syrup. All the time the mixture was stirred with a propeller stirrer (300 U/min) and the reaction was stopped when a viscosity of about 2000 mPas was reached (when measured with a Brookfield viscosimeter, T=25° C., spindle 4, 12 rpm). Additional 0.16 ppH photoinitiator, 0.1 ppH crosslinker, optionally Aerosil R-972 and optionally glass bubbles K15 were added to the syrup and mixed until they were dissolved/dispersed. The compositions of LPF 1 to LPF 3 are shown in Table 4.

TABLE 4

|  | LPF 1 | LPF 2 | LPF 3 |
|---|---|---|---|
| 2-EHA | 90 | 90 |  |
| 2-OA |  |  | 95 |
| AA | 10 | 10 | 5 |
| AEROSIL R-972 | 3 |  |  |
| OMNIRAD BDK | 0.2 | 0.2 |  |
| IRGACURE 651 |  |  | 0.2 |
| HDDA | 0.1 | 0.1 | 0.06 |
| K15 glass bubbles | 6 |  |  |

Making of Pressure Sensitive Adhesive Tape
Example Ex.1

For making Ex.1 the liquid precursors of the first pressure sensitive adhesive layer (LPS 1) and the second polymer layer (LPF 1) were superimposed onto each other in a lab coater, according to the method described in WO-A1-2011094385 (Hitschmann et al.). Hereby, the liquid precursor of the first pressure sensitive adhesive layer was coated on the bottom of the second polymer layer. The knife height setting was 130-140 μm for the first knife (for the first pressure sensitive adhesive layer) and 1240-1250 μm for the second knife (for the second polymer layer), both levels calculated from the substrate surface.

The lab coater was connected to a UV curing station of 3 m length, where zones of different UV-intensities could be realized. The UV-radiation cured the tape from both its top and bottom side. Hereby in all zones the intensity from top and bottom side was set at equal levels. The total radiation intensities (top+bottom) and the length of the different zones are listed in Table 5 below.

TABLE 5

|  | Zone 1 Length (200 cm) | Zone 2 (length 100 cm) |
|---|---|---|
| Total intensity [mW(cm$^2$)] | 2.07 | 4.27 |

The dual (or triple) layer construction is coated on 75 μm solvent free siliconized PET-liners (SLVK-Liner having a dimension of 300 mm×300 mm).

Making of Pressure Sensitive Adhesive Tape
Examples Ex.2-Ex.7

For the making of Ex.2 to Ex.7, the liquid precursors of the first pressure sensitive adhesive layer and the second polymer layer were superimposed onto each other in a coater, according to the method described in EP0259094 (Zimmerman et al.). Hereby, the liquid precursor of the second polymer layer was coated on the first pressure sensitive adhesive layer. In the setup, the liquid precursor of the first pressure sensitive adhesive layer was individually knife coated on the substrate with a knife gap setting of 125 μm, whereas the precursor of the second polymer layer was coated with a knife gap setting resulting to a combined caliper of the two liquid precursor layers of about 1225 μm.

These liquid precursor layers were then simultaneously subjected to ultraviolet radiation from a UV curing station, thus photopolymerizing the monomers to provide multilayer pressure sensitive adhesive tape examples. The UV curing station was of 3 m length, where zones of different uV-intensities could be realized. The UV-radiation cured the tape from both its top and bottom side. Hereby in all zones the intensity from top and bottom side was set at equal levels. The total radiation intensities (top+bottom) and the length of the different zones are previously listed in Table 5.

A complete overview of all pressure sensitive adhesive tape examples used for testing is shown in Table 6.

TABLE 6

| Ex. No | LPS | LPF | Made according to method described in |
|---|---|---|---|
| Ex. 1 | 1 | 1 | WO 2011094385 |
| Ex. 2 | 1 | 1 | EP0259094 |
| Ex. 3 | 2 | 1 | EP0259094 |
| Ex. 4 | 1 | 2 | EP0259094 |
| Ex. 5 | 3 | 1 | EP0259094 |
| Ex. 6 | 4 | 1 | EP0259094 |
| Ex. 7 | 5 | 3 | EP0259094 |

Test Results

Table 7 shows the 90° peel values after 72 h dwell time at room temperature (RT) to PP and stainless steel (SS) test substrates, 90° peel testing after heat ageing to PP and the static shear results at 23° C. as well as at 70° C.

TABLE 7

| Ex. No | 90° Peel on PP 72 h/RT (N/cm) | 90° Peel on SS 72 h/RT (N/cm) | 90° Peel After aging at 1 h/RT + 3 days 90° C. + 24 h RT | Static Shear at RT to PP, 1000 g weight (min) | Static Shear at 70° C. to PP, 250 g weight (min) |
|---|---|---|---|---|---|
| Ex. 1 | 18 | | | 10000+ | |
| Ex. 2 | 19 | | | 10000+ | |
| Ex. 3 | 16 | | | 10000+ | 10000+ |
| Ex. 4 | 20 | | | 10000+ | 10000+ |
| Ex. 5 | 17 | | 14 | | 10000+ |
| Ex. 6 | 20 | | 60 | | 10000+ |
| Ex. 7 | 35.5 | 26.4 | | | |

Example 4 was a clear pressure sensitive adhesive assembly, having a second polymer layer which did not contain any fillers. Also here, the 90° peel and the static shear values were in the range as for the previous examples. As such, the present disclosure provides clear pressure sensitive adhesive assemblies that exhibit a good property balance on LSE substrates such as PP.

Further test results in Table 7 show that Ex.6, which differs from Ex.5 only by its additional content of CPO 343-1, demonstrates improved peel values after heat aging whilst at the same time maintaining high shear properties at 70° C.

Ex.7 had a first pressure sensitive adhesive layer based on 2 octyl-acrylate (2-OA) which is derived from renewable resources, in particular from plants. The 90° peel results to PP and stainless steel show test results that are desirable to obtain to LSE substrates.

REFERENCE NUMBERS 1 coating apparatus
2 coating knife
3 coating knife
4 substrate
5 downstream direction
6 coating chamber
7 rolling bead
8 release liner
9 precursor layer of first pressure sensitive adhesive polymer layer
10 precursor layer of second polymer layer
11 skin layer
12 core layer
13 assembly
14 polymeric substrate
15 glass substrate
I-II consecutive numbering of coating stations starting from the rolling bead (if present) as the most upstream coating station with the following coating chambers numbered in downstream direction.
18 coating apparatus
20 polymeric substrate
22 Low-adhesion carrier
24 PSA 2 skin layer
26 PSA 3 skin layer
28 PSA 1 skin layer
30 coating roller
32 core layer
34 UV-curing station

What we claim is:

1. A method for manufacturing a multilayer pressure sensitive adhesive assembly comprising at least a first pressure sensitive adhesive polymer layer superimposed to a second polymer layer, the method comprising the steps of:
   a) providing a substrate;
   b) providing a first curable liquid precursor of the first pressure sensitive adhesive polymer layer and a second curable liquid precursor of the second polymer layer as superimposed layers onto the substrate;
   c) optionally, providing one or more solid films and applying these adjacent to and essentially simultaneously with the formation of the superimposed layers; and
   d) curing the superimposed layers of the multilayer pressure sensitive adhesive assembly thus obtained;
wherein the first curable liquid precursor of the first pressure sensitive adhesive polymer layer comprises:
   a) 60 parts by weight or greater of a low Tg (meth)acrylate copolymer comprising:
      i. $C_1$-$C_{32}$ (meth)acrylic acid ester monomer units;
      ii. optionally, acid functional ethylenically unsaturated monomer units;
      iii. optionally, non-acid functional, ethylenically unsaturated polar monomer units;
      iv. optionally, vinyl monomer units; and
      v. optionally, multifunctional (meth)acrylate monomer units, and
   b) up to 40 parts by weight of a high Tg (meth)acrylate copolymer having a weight average molecular weight (Mw) of above 20,000 Daltons, and comprising:
      i. high Tg (meth)acrylic acid ester monomer units;
      ii. optionally, acid functional ethylenically unsaturated monomer units;
      iii. optionally, low Tg (meth)acrylic acid ester monomer units;
      iv. optionally, non-acid functional, ethylenically unsaturated polar monomer units;
      v. optionally, vinyl monomer units; and c) optionally, up to 20 parts by weight of a hydrogenated hydrocarbon tackifier, based on 100 parts by weight of copolymers a) and b).

2. A method according to claim 1, wherein the low Tg (meth)acrylate copolymer comprises $C_1$-$C_{24}$ (meth)acrylic acid ester monomer units.

3. A method according to claim 1, wherein a layer of the second curable liquid precursor of the second polymer layer is covered by an adjacent layer of the first curable liquid precursor of the first pressure sensitive adhesive polymer layer, respectively, without exposing the layer of a second curable liquid precursor of the second polymer layer.

4. A method according to claim 1, which further comprises the steps of:
   e) providing two or more coating knives which are offset, independently from each other, from the substrate to form two or more gaps normal to a surface of the substrate;
   f) moving the substrate relative to the two or more coating knives in a downstream direction;
   g) providing the first curable liquid precursor of the first pressure sensitive adhesive polymer layer and the second curable liquid precursor of the second polymer layer to the upstream side of the coating knives thereby coating the first curable liquid precursor through a first gap and the second curable liquid precursor through a second gap as superimposed layers onto the substrate.

5. A method according to claim 1, wherein the high Tg (meth)acrylate copolymer has a weight average molecular weight (Mw) of above 25,000 Daltons.

6. A method according to claim 1, wherein the low Tg (meth)acrylate copolymer comprises:
   i. 85 to 99.5 parts by weight of an (meth)acrylic acid ester monomer unit of non-tertiary alcohol;
   ii. 0.5 to 15 parts by weight of an acid functional ethylenically unsaturated monomer unit;
   iii. 0 to 10 parts by weight of a non-acid functional, ethylenically unsaturated polar monomer unit;
   iv. 0 to 5 parts vinyl monomer units; and
   v. 0 to 5 parts of a multifunctional (meth)acrylate monomer units;
   based on 100 parts by weight total monomers of the low Tg (meth)acrylate copolymer.

7. A method according to claim 1, wherein the high Tg (meth)acrylic acid ester monomer units are selected from the group consisting of t-butyl (meth)acrylate, methyl (meth)acrylate, ethyl (meth)acrylate, isopropyl (meth)acrylate, n-butyl (meth)acrylate, isobutyl (meth)acrylate, s-butyl (meth)acrylate, t-butyl (meth)acrylate, stearyl (meth)acrylate, phenyl (meth)acrylate, cyclohexyl (meth)acrylate, isobornyl (meth)acrylate, isobornyl (meth)acrylate, benzyl (meth)acrylate, 3,3,5 trimethylcyclohexyl (meth)acrylate, cyclohexyl (meth)acrylate, N-octyl acrylamide, propyl (meth)acrylate, and any combinations or mixtures thereof.

8. A method according to claim 1, wherein the $C_1$-$C_{32}$ (meth)acrylic acid ester monomer units of the low Tg (meth)acrylate copolymer are selected from the group consisting of (meth)acrylic esters of ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and any combinations or mixtures thereof.

9. A method according to claim 1, wherein the $C_1$-$C_{32}$ (meth)acrylic acid ester monomer units of the low Tg (meth)acrylate copolymer comprise 2-octyl(meth)acrylate.

10. A method according to claim 9, wherein at least 25 wt % of the chemical structure of the 2-octyl(meth)acrylate is derived from biological material.

11. A method according to claim 1, wherein the first curable liquid precursor of the first pressure sensitive adhesive polymer layer and/or the second curable liquid precursor of the second polymer layer is derived from biological material.

12. A method according to claim 1, wherein the first curable liquid precursor of the first pressure sensitive adhesive polymer layer further comprises a chlorinated polyolefinic (co)polymer, which is selected from the group consisting of chlorinated polypropylene, chlorinated polyethylene, chlorinated ethylene/vinyl acetate copolymer, and any combinations, mixtures or copolymers thereof.

13. A multilayer pressure sensitive adhesive assembly obtainable by the method according to claim 1.

14. A multilayer pressure sensitive adhesive assembly according to claim 13, exhibiting a decrease in peel strength of less than 40% after heat bond aging on polypropylene, when measured according to the heat bond aging test method described in the experimental section.

* * * * *

UNITED STATES PATENT AND TRADEMARK OFFICE
CERTIFICATE OF CORRECTION

| | |
|---|---|
| PATENT NO. | : 9,845,414 B2 |
| APPLICATION NO. | : 14/889289 |
| DATED | : December 19, 2017 |
| INVENTOR(S) | : Jan Wieneke |

It is certified that error appears in the above-identified patent and that said Letters Patent is hereby corrected as shown below:

Column 27
Line 54, delete "know" and insert -- known --, therefor.

Column 30
Lines 31-32 (approx.), delete "derivates" and insert -- derivatives --, therefor.

Column 32
Line 20, delete "2-methy-1-hexyl" and insert -- 2-methyl-1-hexyl --, therefor.

Column 37
Line 43, delete "pentaertythritol" and insert -- pentaerythritol --, therefor.

Column 38
Line 21, delete "KRISTLEX," and insert -- KRISTALEX, --, therefor.
Line 38, delete "Exxon Mobile" and insert -- ExxonMobil --, therefor.

Column 43
Line 22, delete "photoinitator" and insert -- photoinitiator --, therefor.

Column 44
Line 62, delete "tridecafluroro-" and insert -- tridecafluoro- --, therefor.
Line 64, delete "tridecafluroro-" and insert -- tridecafluoro- --, therefor.

Column 50
Line 28, delete "i." and insert -- i.) --, therefor.

Column 57
Lines 62-63, delete "Aglatershausen," and insert -- Aglasterhausen, --, therefor.
Line 63, after "Germany" insert -- . --.
Line 66, delete "Aglatershausen," and insert -- Aglasterhausen, --, therefor.

Signed and Sealed this
Thirteenth Day of March, 2018

Andrei Iancu
*Director of the United States Patent and Trademark Office*

Column 59
Line 45, delete "etheral" and insert -- ethereal --, therefor.

Column 60
Line 20, after "Waalwijk" insert -- , --.

Column 62
Line 49, delete "[mW(cm$^2$]" and insert -- [mW(cm$^2$)] --, therefor.

Column 63
Line 7, delete "uV-" and insert -- UV- --, therefor.

Column 66
Line 6, in Claim 7, delete "3,3,5 trimethylcyclohexyl" and insert -- 3,3,5-trimethylcyclohexyl --, therefor.